United States Patent
Suzuki et al.

(10) Patent No.: US 12,514,142 B2
(45) Date of Patent: Jan. 6, 2026

(54) AUTOMATIC TRAVELING METHOD, WORKING VEHICLE, AND AUTOMATIC TRAVELING SYSTEM

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 299 days.

(21) Appl. No.: 18/143,097

(22) Filed: May 4, 2023

(65) Prior Publication Data

US 2023/0380322 A1    Nov. 30, 2023

(30) Foreign Application Priority Data

May 27, 2022  (JP) ................................. 2022-086652
Apr. 13, 2023  (JP) ................................. 2023-065656

(51) Int. Cl.
*A01B 69/04* (2006.01)
*G05D 1/00* (2024.01)

(52) U.S. Cl.
CPC ......... *A01B 69/008* (2013.01); *G05D 1/0219* (2013.01)

(58) Field of Classification Search
CPC ............................ A01B 69/008; G05D 1/0219
USPC .......................................................... 701/23
See application file for complete search history.

(56) References Cited

U.S. PATENT DOCUMENTS

| | | | |
|---|---|---|---|
| 2019/0146513 A1* | 5/2019 | Tomita | B60W 30/10 701/50 |
| 2019/0227561 A1* | 7/2019 | Hiramatsu | G05D 1/6484 |
| 2020/0288622 A1* | 9/2020 | Nishii | A01B 69/00 |
| 2021/0191408 A1* | 6/2021 | Hayashida | G05D 1/648 |
| 2021/0294345 A1* | 9/2021 | Shinkai | G05D 1/0219 |
| 2022/0221877 A1 | 7/2022 | Goua-de-Baix et al. | |

FOREIGN PATENT DOCUMENTS

| | | |
|---|---|---|
| EP | 3508045 A1 | 7/2019 |
| JP | 2020080736 A | 6/2020 |
| JP | 2023039845 A * | 3/2023 |

OTHER PUBLICATIONS

Cernicchiaro, Carlo; Gaspar, Pedro D.; Aguiar, Martim L., "Fast Return Path Planning for Agricultural Autonomous Terrestrial Robot in a Known Field", 2019, World Academy of Science, Engineering and Technology International Journal of Mechanical and Mechatronics Engineering, vol. 13, No. 2, p. 79-87. (Year: 2019).*

* cited by examiner

*Primary Examiner* — Matthias S Weisfeld
*Assistant Examiner* — Hyang Ahn
(74) *Attorney, Agent, or Firm* — Chris Mizumoto

(57) ABSTRACT

A combine is a working vehicle that performs automatic traveling on a work route preset in an agricultural field, and includes a control device. The control device functions as a return traveling control part to make the combine automatically perform return traveling toward the work route in response to a return operation for the combine within the agricultural field during breakaway of the combine 1 from the work route.

12 Claims, 31 Drawing Sheets

AUTOMATIC TRAVELING METHOD, WORKING VEHICLE, AND AUTOMATIC TRAVELING SYSTEM

CROSS-REFERENCE

This application claims foreign priority of JP2022-086652 filed May 27, 2022 and JP2023-065656 filed Apr. 13, 2023, the disclosures of which are hereby incorporated by reference in their entirety.

TECHNICAL FIELD

The present invention relates to an automatic traveling method, a working vehicle, and an automatic traveling system that perform automatic traveling of a working vehicle in an agricultural field.

BACKGROUND ART

In conventional, a working vehicle such as a combine is configured to be capable of automatic traveling to automatically perform work, such as reaping, with automatically traveling along a work route preset in an agricultural field. For midway work such as discharging work of harvested grains or supplying work of materials and fuel, the working vehicle may also temporarily pause automatic traveling, break away from a work route, and move to a position for the midway work. The working vehicle needs to perform return traveling to travel to the work route for resuming the automatic traveling temporarily paused.

For example, Patent Document 1 discloses an automatic traveling control system that includes a route setting part to set a traveling route for automatic traveling, and an automatic traveling control part to control automatic traveling of a machine body based on a position of the machine body and the traveling route. After a pause of automatic traveling and then work at a midway work position preset in an agricultural field, the route setting part calculates a return position in the traveling route based on the midway work position and a state of harvesting in the agricultural field, and generates a return route to move to the return position based on the return position and a state of harvesting in the agricultural field.

PRIOR ART DOCUMENT

Patent Document

Patent Document 1: Japanese Unexamined Patent Application Publication No. 2020-22429

SUMMARY OF INVENTION

Technical Problem

Conventional technologies such as disclosed in Patent Document 1 sense completion of discharging work of grains as a trigger, and then perform return traveling of a working vehicle along a return route from a midway work position to a return position. However, such conventional working vehicles can neither create a return route nor perform return traveling at a timing intended by a worker, thus reducing workability. The conventional working vehicles cannot also start return traveling at an intended position within an agricultural field; therefore, if being away from a midway work position, a worker needs to move a working vehicle to the midway work position, thus reducing workability.

The present invention has an object to provide an automatic traveling method, a working vehicle, and an automatic traveling system that enable return traveling to a work route regardless of a position of a working vehicle breaking away from the work route and thus offer improved workability.

Solution to Problem

To solve the aforementioned problem, an automatic traveling method according to the present invention is an automatic traveling method of a working vehicle that performs automatic traveling on a work route preset in an agricultural field, wherein the method includes a return traveling step to make the working vehicle automatically perform return traveling toward the work route in response to a return operation for the working vehicle that is within the agricultural field during breakaway of the working vehicle from the work route.

Furthermore, to solve the aforementioned problem, a working vehicle according to the present invention is a working vehicle that performs automatic traveling on a preset work route in an agricultural field, wherein the vehicle includes a return traveling control part to make the working vehicle automatically perform return traveling toward the work route in response to a return operation for the working vehicle that is within the agricultural field during breakaway of the working vehicle from the work route.

Furthermore, to solve the aforementioned problem, an automatic traveling system according to the present invention is an automatic traveling system, that performs automatic traveling on a work route preset in an agricultural field, wherein the system includes a return traveling control part to make the working vehicle automatically perform return traveling toward the work route in response to a return operation for the working vehicle that is within the agricultural field during breakaway of the working vehicle from the work route.

Advantageous Effects of Invention

The present invention provides an automatic traveling method, a working vehicle, and an automatic traveling system that enable return traveling to a work route regardless of a position of a working vehicle breaking away from the work route and thus offer improved workability.

DESCRIPTION OF EMBODIMENTS

First Embodiment

Figure 1:
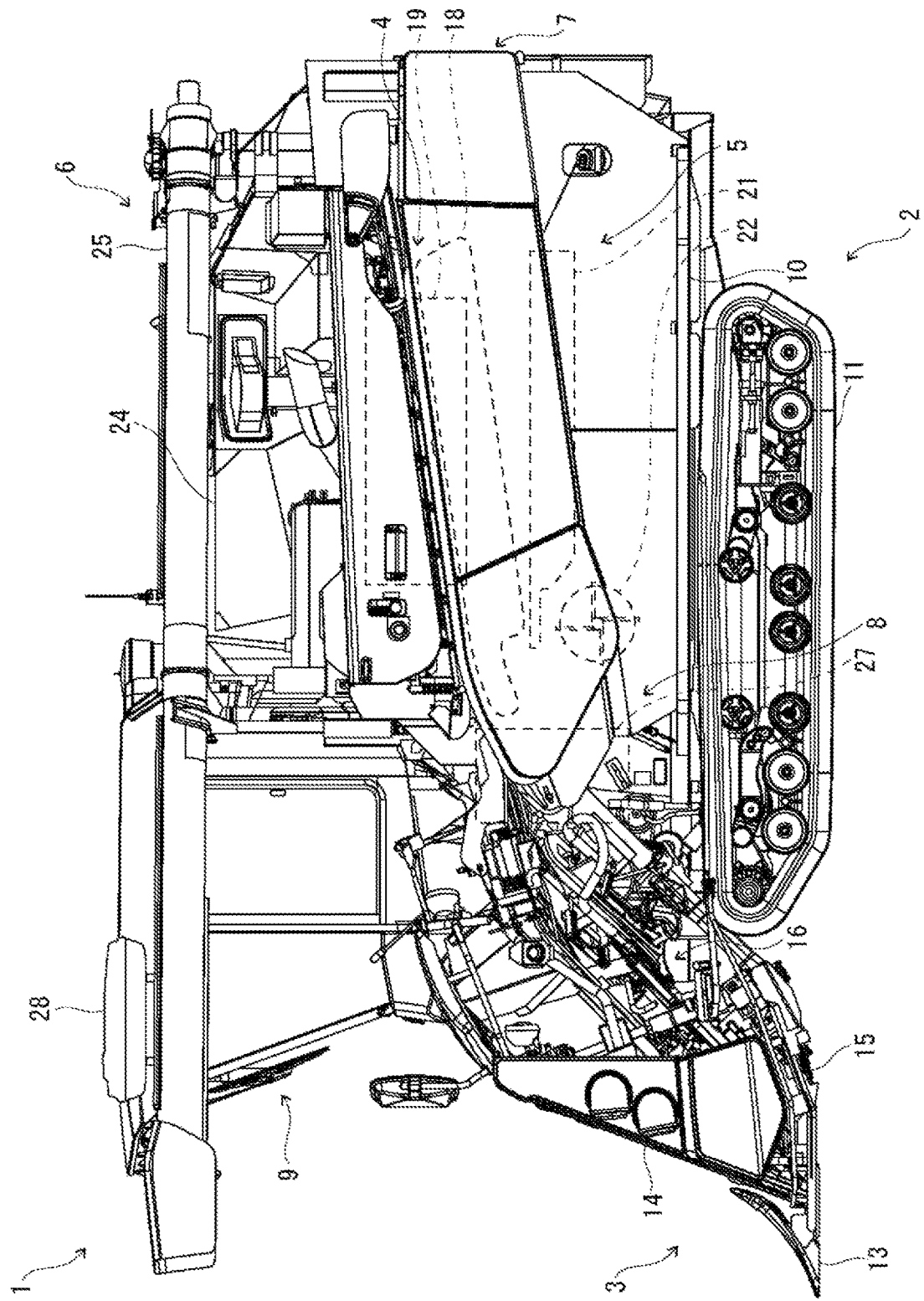
FIG. 1 is a side view of a combine according to a first embodiment of the present invention.

As a first embodiment of a working vehicle according to the present invention, a combine 1 will be described with reference to FIG. 1 and other drawings. The combine 1 is an exemplary working vehicle capable of automatic traveling to automatically perform work, such as reaping, with automatically traveling along a predetermined work route. The combine 1 travels in an agricultural field, which is a work subject by automatic driving or manual operation, as well as performs work, such as reaping, for harvesting work of crops from culms planted in an unworked area within the agricultural field. The combine 1 is a working vehicle that is restricted from traveling without work in an unworked area within an agricultural field, in other words, that is allowed to perform traveling without work in a worked area within an agricultural field. The combine 1 is configured to, for example, control steering by automatic driving, as well as perform automatic work that controls a traveling speed in response to a manual operation, unattended work that controls steering and a traveling speed by automatic driving, or another work, and can autonomously travel, turn, and work within an agricultural field.

The combine 1 performs reaping work for a plurality of rows of culms, with traveling on a straight raw having a reaping width including a predetermined number of rows within the number of rows capable of reaping. The combine 1 is set to a traveling mode of either a manual traveling mode or an automatic traveling mode. The combine 1 is configured to perform manual traveling in response to maneuver of a maneuver part 9 by a worker, under setting to a manual traveling mode.

Meanwhile, the combine 1 is configured to perform automatic traveling that automatically conducts reaping work with automatically traveling along a work route preset in an agricultural field, under setting to an automatic traveling mode. For example, the combine 1 performs automatic traveling with a traveling pattern such as shuttle reaping to shuttle on a plurality of straight routes in a region having unreaped culms within an agricultural field (hereinafter referred to as an unworked area) or revolving reaping to repeat a revolution on straight routes along the inner circumference of an unworked area with shifting toward the center. Note that the combine 1 performs outer circumferential traveling to conduct reaping work with traveling on a circuit along an outer circumferential shape of an agricultural field before automatic traveling, and thereby forms a headland in the agricultural field and defines the inside of the headland as a work zone for automatic traveling.

The combine 1 can temporarily pause automatic traveling in midway of a work route and break away from the work route at a predetermined breakaway position on the work route, and then can move to a midway work position for midway work such as discharging work of harvested grains or supplying work of materials and fuel.

For example, when the combine 1 reserves grains harvested from an agricultural field along with performing reaping traveling, the outside of the agricultural field includes a collection part, such as a truck or a container, to collect grains harvested by the combine 1. The combine 1 sets a discharge position to discharge grains from the combine 1 to the collection part at a position adjacent to the collection part within the agricultural field (midway work position). When discharging grains in midway of automatic traveling, the combine 1 pauses automatic traveling at a predetermined breakaway position on a work route, and performs discharge traveling (relocation traveling) to travel from the breakaway position to a discharge position by automatic driving or manual operation. The breakaway position may be set, e.g., based on timing to fill up reservoir capacity with grains, or may be capable of being freely set in response to an operation by a worker.

Furthermore, the combine 1 is configured to be capable of return traveling to travel to a return position by automatic driving, along a return route from a position of the combine 1 itself to a predetermined return position on a work route, in response to a predetermined return operation after breakaway from the work route. The return position may be set to a breakaway position where the combine 1 broke away from the work route during automatic traveling, and the return position may also be set to another position on the work route based on a position of the combine 1 itself, a traveling direction, or a state of work in an agricultural field, or be capable of being freely set in response to an operation by a worker.

As depicted in FIG. 1, the combine 1 includes a traveling part 2, a reaping part 3, a threshing part 4, a separating part 5, a reservoir part 6, a discharged straw disposal part 7, a power part 8, and a maneuver part 9, and is configured of so-called a head-feeding combine. Along with traveling by the traveling part 2, the combine 1 reaps culms by the reaping part 3 and then threshes them in the threshing part 4, separates grains in the separating part 5, and reserves them in the reservoir part 6. The combine 1 processes threshed, discharged straw in the discharged straw disposal part 7. The combine 1 drives the traveling part 2, the reaping part 3, the threshing part 4, the separating part 5, the reservoir part 6, and the discharged straw disposal part 7 by power supplied by the power part 8.

The traveling part 2 is disposed under a machine body frame 10, and includes a left-and-right-pair of crawler traveling devices 11, and a transmission (not depicted). The traveling part 2 rotates crawlers of the crawler traveling devices 11 by power (e.g., rotative power) transmitted from an engine 27 of the power part 8, and thereby makes the combine 1 travel in a front-back direction or turn in a left-right direction. The transmission is a unit that transmits power (rotative power) of the power part 8 to the crawler traveling devices 11, and also enables gearshift of rotative power.

The reaping part 3 is disposed in front of the traveling part 2, and performs reaping work for rows within the number of rows capable of reaping. The reaping part 3 includes a divider 13, a raise-up device 14, a cutting device 15, and a conveyor device 16. The divider 13 divides culms from an agricultural field by raw, and guides a predetermined number of rows of culms within the number of rows capable of reaping, to the raise-up device 14. The raise-up device 14 raises the culms guided by the divider 13. The cutting device 15 cuts the culms raised by the raise-up device 14. The conveyor device 16 conveys culms cut by the cutting device 15 to the threshing part 4. The reaping part 3 is configured to be lowered to a work position when reaping is performed and raised to a non-work position when reaping is not performed.

The threshing part 4 is disposed behind the reaping part 3. The threshing part 4 includes a feed chain 18 and a threshing drum 19. The feed chain 18 conveys, for threshing, culms conveyed from the conveyor device 16 in the reaping part 3, and further conveys threshed culms, i.e., discharged straw, to the discharged straw disposal part 7. The threshing drum 19 threshes culms conveyed by the feed chain 18.

The separating part 5 is disposed under the threshing part 4. The separating part 5 includes a shaking separator device 21, a wind separator device 22, a grain conveyor device (not depicted), and a straw debris discharger device (not depicted). The shaking separator device 21 sieves threshed materials dropped down from the threshing part 4 and separates them into grains and straw debris. The wind separator device 22 further separates the threshed materials separated by the shaking separator device 21, into grains, straw debris, and other components by air blast. The grain conveyor device conveys the grains separated by the shaking separator device 21 and the wind separator device 22, to the reservoir part 6. The straw debris discharger device discharges the straw debris or other components separated by the shaking separator device 21 and the wind separator device 22, to the outside.

The reservoir part 6 is disposed on the right side of the threshing part 4. The reservoir part 6 includes a grain tank 24 and a discharger device 25. The grain tank 24 reserves the grains conveyed from the separating part 5. The reservoir part 6 is set to have a maximum amount for the grain tank 24 to be capable of reserving grains (maximum reservoir capacity). The discharger device 25 is configured of an auger and other components, and discharges grains reserved in the grain tank 24 to an intended place.

The discharged straw disposal part 7 is disposed behind the threshing part 4. The discharged straw disposal part 7 includes a discharged straw conveyor device (not depicted) and a discharged straw cutting device (not depicted). The discharged straw conveyor device conveys the discharged straw conveyed from the feed chain 18 in the threshing part 4 to the discharged straw cutting device. The discharged straw cutting device cuts the discharged straw conveyed by the discharged straw conveyor device and discharges it to the outside.

The power part 8 is disposed above the traveling part 2, and in front of the reservoir part 6. The power part 8 includes an engine 27 that generates rotative power. The power part 8 transmits rotative power generated by the engine 27, to the traveling part 2, the reaping part 3, the threshing part 4, the separating part 5, the reservoir part 6, and the discharged straw disposal part 7.

The maneuver part 9 is disposed above the power part 8. The maneuver part 9 includes a handle to direct turn of the machine body of the combine 1, a main gearshift lever and a secondary gearshift lever to direct speed alteration for back and forth motion of the combine 1, and another appliance as operative tools for maneuvering traveling of the combine 1, around a driver seat, which is a seat to be sat by a worker. Manual traveling of the combine 1 is executed by the traveling part 2 that accepts operations of a handle, a main gearshift lever and a secondary gearshift lever, and another appliance in the maneuver part 9. The maneuver part 9 also includes a machinery to operate reaping work by the reaping part 3, threshing work by the threshing part 4, discharging work by the discharger device 25 in the reservoir part 6.

The combine 1 includes a positioning unit 28 that uses a satellite positioning system such as GNSS to acquire a position of the combine 1 itself. The positioning unit 28 receives a positioning signal from a positioning satellite via a positioning antenna, and acquires position information of the positioning unit 28, i.e., a position of the combine 1 itself, based on the positioning signal. The positioning unit 28 may be configured of a quantum compass instead of a positioning antenna.

Next, a control device 30 of the combine 1 will be described with reference to FIG. 2. The control device 30 is configured of a computer such as a CPU, and connected to a storage part 31 such as a ROM, a RAM, a hard disk drive, or a flash memory, a communication part 32 that communicates with an external instrument, and other components.

The storage part 31 stores program, data, and the like to control a variety of components and a variety of functionalities of the combine 1, and the control device 30 executes arithmetic processing based on the program, data, and the like stored in the storage part 31, and thereby controls a variety of components and a variety of functionalities. For example, the control device 30 acquires from the positioning unit 28 a position of the combine 1 itself.

The communication part 32 is capable of wireless communication with an external instrument, such as a mobile terminal 40, carried by a worker, via a wireless communication antenna. The control device 30 controls the communication part 32 to perform wireless communication with the mobile terminal 40, and sends and receives a variety of information to and from the mobile terminal 40.

The control device 30 receives agricultural field information, a work route 63, and the like set for an agricultural field 60, which is a work subject of the combine 1, as depicted in FIG. 3 to FIG. 12, via the communication part 32 from the mobile terminal 40, and stores them in the storage part 31. Note that the agricultural field 60 has an unworked area 61 remaining unworked, and a worked area 62 that previously finished reaping work of culms, and another area; the work route 63 is set within the unworked area 61. The agricultural field information includes information such as the shape, size, and position information (e.g., coordinates) of an agricultural field zone along the outer circumference of the agricultural field 60, and the shape, size, and position information (e.g., coordinates) of the unworked area 61, the worked area 62, or another area in the agricultural field 60. The agricultural field information may include a midway work position, such as a discharge position, within the agricultural field 60 and adjacent to a collection part outside the agricultural field 60.

The control device 30 also executes a program stored in the storage part 31, and thereby works as an automatic traveling control part a relocation traveling control part 36, and a return traveling control part 37. Note that the automatic traveling control part 35, the relocation traveling control part 36, and the return traveling control part 37 achieve an automatic traveling step, a relocation traveling step, and a return traveling step in the automatic traveling method according to the present invention.

The automatic traveling control part 35 is a unit that controls automatic traveling of the combine 1 under setting an automatic traveling mode. Upon start of automatic traveling, the automatic traveling control part 35 acquires from the positioning unit 28 a position of the combine 1 itself, and controls the power part 8, and the traveling part 2 and the reaping part 3 such that the combine 1 performs automatic traveling along the work route 63 based on a position of the combine 1 itself, agricultural field information, and the work route 63. When performing automatic traveling, the automatic traveling control part 35 starts operation of the reaping part 3 and lowers the reaping part 3 to the work position.

The automatic traveling control part 35 also temporarily pauses automatic traveling in midway of the work route 63, in response to a predetermined pause operation using the maneuver part 9, the mobile terminal 40, or another unit, or when meeting a predetermined pause condition based on a state of work of the combine 1. At that time, the automatic traveling control part 35 stops operation of the reaping part 3 and raises the reaping part 3 to the non-work position. When the combine 1 pausing automatic traveling breaks away from the work route 63 by automatic driving or manual operation, the automatic traveling control part 35 stores a breakaway position 64 in the storage part 31, and sends it to the mobile terminal 40 via the communication part 32. Furthermore, the automatic traveling control part 35 resumes automatic traveling temporarily paused, in response to a predetermined resume operation with the maneuver part 9, the mobile terminal 40, or another unit, or when meeting a predetermined resume condition based on a state of work of the combine 1.

The relocation traveling control part 36 is a unit that controls relocation traveling to move the combine 1 breaking away at the breakaway position 64 predetermined on the work route 63, to a midway work position away from the work route 63, and performs relocation traveling by automatic driving or manual operation. For example, when the combine 1 temporarily pauses automatic traveling by the automatic traveling control part 35, the relocation traveling control part 36 performs relocation traveling of the combine 1 in response to a predetermined relocation operation with the maneuver part 9, the mobile terminal 40, or another unit, or when meeting a predetermined relocation condition based on a state of work of the combine 1.

When the combine 1 can move to a midway work position such as a discharge position to perform discharging work of harvested grains or a supplying position to perform supplying work of materials and fuel, the relocation traveling control part 36 performs, as relocation traveling, discharge traveling in which the combine 1 arriving at the breakaway position 64 set on the work route 63 in the agricultural field 60 moves to the discharge position. For example, once the combine 1 during automatic traveling arrives at the breakaway position 64, the relocation traveling control part 36 pauses automatic traveling and stops operation of the reaping part 3 and raises the reaping part 3 to the non-work position, acquires from the mobile terminal 40, a discharge route from the breakaway position 64 to the discharge position, and controls the power part 8 and the traveling part 2 so as to perform discharge traveling along this discharge route by automatic driving.

The return traveling control part 37 is a unit that makes the combine 1 automatically perform return traveling toward the work route 63 in response to a return operation for the combine 1 within the agricultural field 60, when the combine 1 breaks away from the work route 63. For example, after the combine 1 breaks away from the work route 63, the return traveling control part 37 acquires from the mobile terminal 40, a return route 66 from a position of the combine 1 itself to a return position 65 predetermined on the work route 63 (see FIG. 3 to FIG. 12), in response to a predetermined return operation using the maneuver part 9, the mobile terminal 40, or another unit; and controls the power part 8 and the traveling part 2 so as to perform return traveling to travel to the return position 65 along the return route 66 by automatic driving, in a state where operation of the reaping part 3 is stopped and the reaping part 3 is raised to the non-work position. In a case where the return traveling control part 37 stops return traveling when the return position 65 is reached and then shifts to automatic traveling, the return traveling control part 37 starts deceleration before the return position 65 by a predetermined distance so that the vehicle speed becomes zero at the return position 65. At that time, in order to preparation for automatic traveling, the return traveling control part 37 may lower the reaping part 3 to the work position automatically or in response to manual operation when the return position 65 is reached, or may automatically lower the reaping part 3 to the work position with deceleration traveling. Alternatively, when continuously shifting from return traveling to automatic traveling, the return traveling control part 37 may start changing the vehicle speed before the return position 65 by a predetermined distance and set the vehicle speed to a set vehicle speed for automatic traveling at the return position 65 or right before the return position 65.

When the whole machine body of the combine 1 is within the agricultural field 60, the return traveling control part 37 enables return traveling by automatic driving. By contrast, when the combine 1 is out of the agricultural field 60, e.g., a part of the machine body of the combine 1 protrudes to the agricultural field 60, the return traveling control part 37 disables return traveling by automatic driving, because of incapability to ensure safety.

Furthermore, when the return position 65 is disposed at an end (starting end) of a straight route 67 included in the work route 63, and if a distance between a position of the combine 1 itself at return operation and the return position 65 is a predetermined spacing threshold or more, the return traveling control part 37 enables return traveling by automatic driving. By contrast, if a distance between a position of the combine 1 itself and the return position 65 is less than a predetermined spacing threshold, the return traveling control part 37 disables return traveling by automatic driving, because of capability to return to the work route 63 even without the return route 66. Alternatively, as another example, the return traveling control part 37 may enable return traveling by automatic driving in response to a return operation, regardless of a distance between a position of the combine 1 itself and the return position 65. In addition, when the breakaway position 64 is disposed in midway of the straight route 67 included in the work route 63, and if a distance between a position of the combine 1 itself at return operation and the breakaway position 64 is a predetermined spacing threshold or more, the return traveling control part 37 enables return traveling by automatic driving. By contrast, if a distance between a position of the combine 1 itself and the breakaway position 64 is less than the predetermined spacing threshold, the return traveling control part 37 disables return traveling by automatic driving. Alternatively, as another example, the return traveling control part 37 may enable return traveling by automatic driving in response to a return operation, regardless of a distance between a position of the combine 1 itself and the breakaway position 64.

The mobile terminal 40 is one of components of the combine 1, represents a terminal capable of remote operation of the combine 1, and is configured of, e.g., a tablet terminal including a touch panel or a laptop personal computer. An operation device similar to the mobile terminal 40 may be included in the maneuver part 9. In the present invention, the automatic traveling system includes the combine 1, the mobile terminal 40, and another device.

Figure 2:
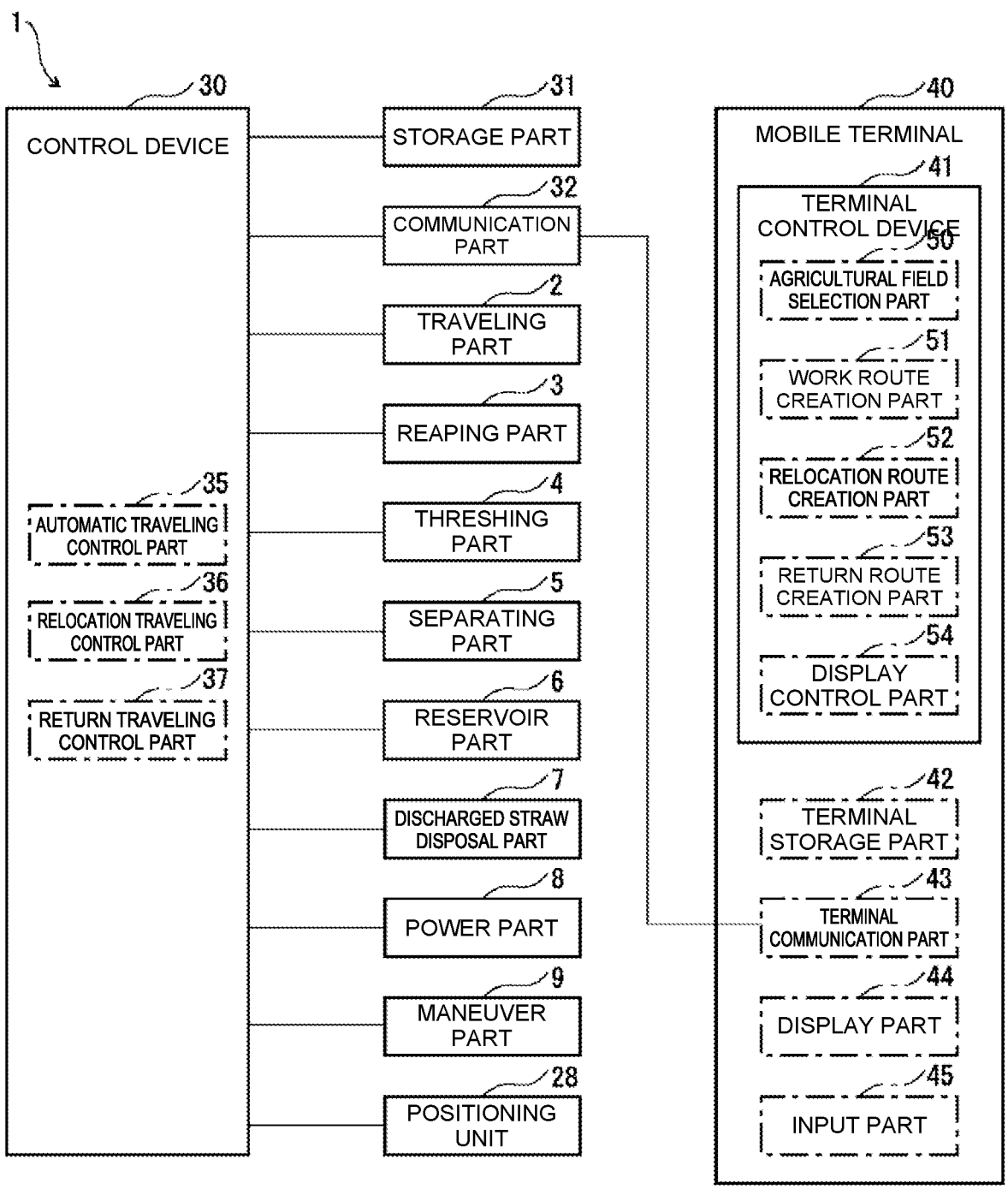
FIG. 2 is a block diagram of the combine according to the first embodiment of the present invention.

As depicted in FIG. 2, the mobile terminal 40 includes a terminal control device 41 configured of a computer such as a CPU, and the terminal control device 41 is connected to a terminal storage part 42 such as a ROM, a RAM, a hard disk drive, or a flash memory, a terminal communication part 43 that communicates with an external instrument, and another part. The mobile terminal 40 also includes a display part 44, such as a touch panel or a monitor, for displaying various information to output it to a worker, and further includes an input part 45, such as a touch panel or an operation key, for accepting an input operation of various information from a worker.

The terminal storage part 42 stores program, data, and the like to control a variety of components and a variety of functionalities of the mobile terminal 40, and the terminal control device 41 executes arithmetic processing based on the program, data, and the like stored in the terminal storage part 42, and thereby controls a variety of components and a variety of functionalities of the mobile terminal 40. The terminal storage part 42 stores agricultural field information, a work route 63, and the like of the agricultural field 60, which is a work subject of the combine 1.

The terminal communication part 43 is communicably connected to the communication part 32 in the combine 1 via a wireless communication antenna. The terminal control device 41 controls the terminal communication part 43 to perform wireless communication with the combine 1, and sends and receives a variety of information to and from the combine 1.

The terminal control device 41 of the mobile terminal 40 executes a program stored in the terminal storage part 42, and thereby works as an agricultural field selection part 50, a work route creation part 51, a relocation route creation part 52, a return route creation part 53, and a display control part 54. Note that the agricultural field selection part 50, the work route creation part 51, the relocation route creation part 52, and the return route creation part 53 achieve an agricultural field selection step, a work route creation step, a relocation route creation step, and a return route creation step in the automatic traveling method according to the present invention.

The agricultural field selection part 50 is a unit that selects manually or automatically the agricultural field 60 to be a work subject of automatic traveling. For example, the agricultural field selection part displays on the display part 44, an agricultural field selection screen (not depicted) that selectably displays the agricultural field 60 corresponding to agricultural field information stored in the terminal storage part 42. Once any of the agricultural fields 60 is selected on an agricultural field selection screen in response to manual operation, the agricultural field selection part 50 selects as a work subject, the agricultural field 60 having selection operation and retrieves agricultural field information from the terminal storage part 42.

Furthermore, when creation of a new agricultural field is operated in the agricultural field selection screen, the agricultural field selection part 50 selects as a work subject, a new agricultural field for a position of the combine 1 itself. When the combine 1 performs reaping traveling by travelling on a circuit along an outer circumferential shape of the new agricultural field, the agricultural field selection part 50 receives from the combine 1, a position of the combine 1 itself positioned by the positioning unit 28 in the combine 1, records position information of an outer circumferential shape, position information of a route of reaping traveling, and other information, and thereby creates agricultural field information of the new agricultural field and stores it in the terminal storage part 42.

The work route creation part 51 is a unit that creates the work route 63, where the combine 1 performs work with traveling; for example, the work route creation part 51 creates the work route 63 for automatic traveling in the agricultural field 60 selected by the agricultural field selection part 50 (see FIG. 3 to FIG. 12) and stores it in the terminal storage part 42, and sends it to the combine 1 via the terminal communication part 43. The work route 63 includes traveling information on traveling of automatic traveling and work information on work such as reaping. The traveling information includes a traveling direction, a set vehicle speed, and the like at each traveling position, in addition to a traveling position in the agricultural field 60. The work information includes information on work, such as operation or stop of reaping at each traveling position, a reaping speed, and a reaping height.

In particular, the work route creation part 51 creates for the agricultural field 60, one or more straight routes 67 to perform reaping with traveling in an advance direction corresponding to a traveling pattern selected by an operation on the mobile terminal 40 (shuttle reaping or revolving reaping), and then creates the work route 63 by combining a plurality of the straight routes 67 with a plurality of turning routes joining each of the straight route 67. For example, as depicted in FIG. 3 to FIG. 12, the work route creation part 51 defines the unworked area 61 formed inside the worked area 62, which is to be a headland along the outer circumference of the agricultural field 60, as a target of automatic traveling of the combine 1, and as depicted in FIG. 3 to FIG. 4, FIG. 6 to FIG. 12, and FIG. 22 to FIG. 25, the work route creation part 51 creates the work route 63 of shuttle reaping to shuttle on a plurality of the straight routes 67 in the unworked area 61, and as depicted in FIG. 5, FIG. 13 to FIG. 21, the work route creation part 51 creates the work route 63 of revolving reaping to spirally revolve on a plurality of the straight routes 67 in the unworked area 61. When recreating the work route 63 in the same agricultural field 60, the work route creation part 51 may utilize the work route 63 originally created. The straight route 67 may also be a curved curve route.

In addition, when the combine 1 performs automatic traveling as a manned working vehicle, the work route creation part 51 preferably creates the work route 63 so as to make the worked area 62 located on the right side of a machine body because of the maneuver part 9 disposed on the right part of the machine body. By contrast, when the combine 1 performs automatic traveling as an unattended working vehicle, the work route creation part 51 may create the work route 63 regardless of whether the worked area 62 is located on the right side of the machine body, because of lack of necessity to take into account a position of the maneuver part 9.

The relocation route creation part 52 creates a relocation route where the combine 1 performs relocation traveling from the breakaway position 64 to a midway work position. The relocation route includes traveling information on traveling, and the traveling information includes a traveling direction, a set vehicle speed, and the like at each traveling position, in addition to a traveling position in the agricultural field 60. The set vehicle speed for the relocation route may be set higher than a set vehicle speed for the work route 63 of automatic traveling. To move the combine 1 having reservoir capacity filled up with grains to a discharge position, the relocation route creation part 52 creates as a relocation route, a discharge route to perform discharge traveling by automatic driving from the breakaway position 64 to the discharge position, stores it in the terminal storage part 42, and sends it to the combine 1 via the terminal communication part 43.

The return route creation part 53 creates the return route 66 to return to the work route 63, the combine 1 pausing automatic traveling and breaking away from the work route 63 (see FIG. 3 to FIG. 12), stores that return route 66 in the terminal storage part 42, and then sends it to the combine 1 via the terminal communication part 43. The return route 66 includes traveling information on traveling, and the traveling information includes a traveling direction, a set vehicle speed, and the like at each traveling position, in addition to a traveling position in the agricultural field 60. The set vehicle speed for the return route 66 may be set higher than the set vehicle speed for the work route 63 of automatic traveling. The return route creation part 53 sets the return position 65 on the work route 63 in response to a predetermined creation operation using the maneuver part 9, the mobile terminal 40, or another unit, acquires a position of the combine 1 itself at the creation operation from the positioning unit 28 of the combine 1, and creates the return route 66 to perform return traveling by automatic driving from the position of the combine 1 itself to the return position 65. The return route creation part 53 may create the return route 66 such that the return position 65 is reached by traveling straight at least a predetermined distance in the same direction as the traveling direction of the work route 63, in other words, the return route creation part 53 may set a straight route of at least a predetermined distance at a terminal end of the return route 66.

The return route creation part 53 also creates the return route 66 by combining a straight route and a turning route e.g., such that the combine 1 moves from its own position at creation operation to the return position 65 in the shortest distance with keeping off the unworked area 61. In other words, the return route creation part 53 creates the return route 66 such that the combine 1 performs return traveling on the worked area 62. The return route creation part 53 may utilize the work route 63 when creating the return route 66.

First Example

Figure 3:
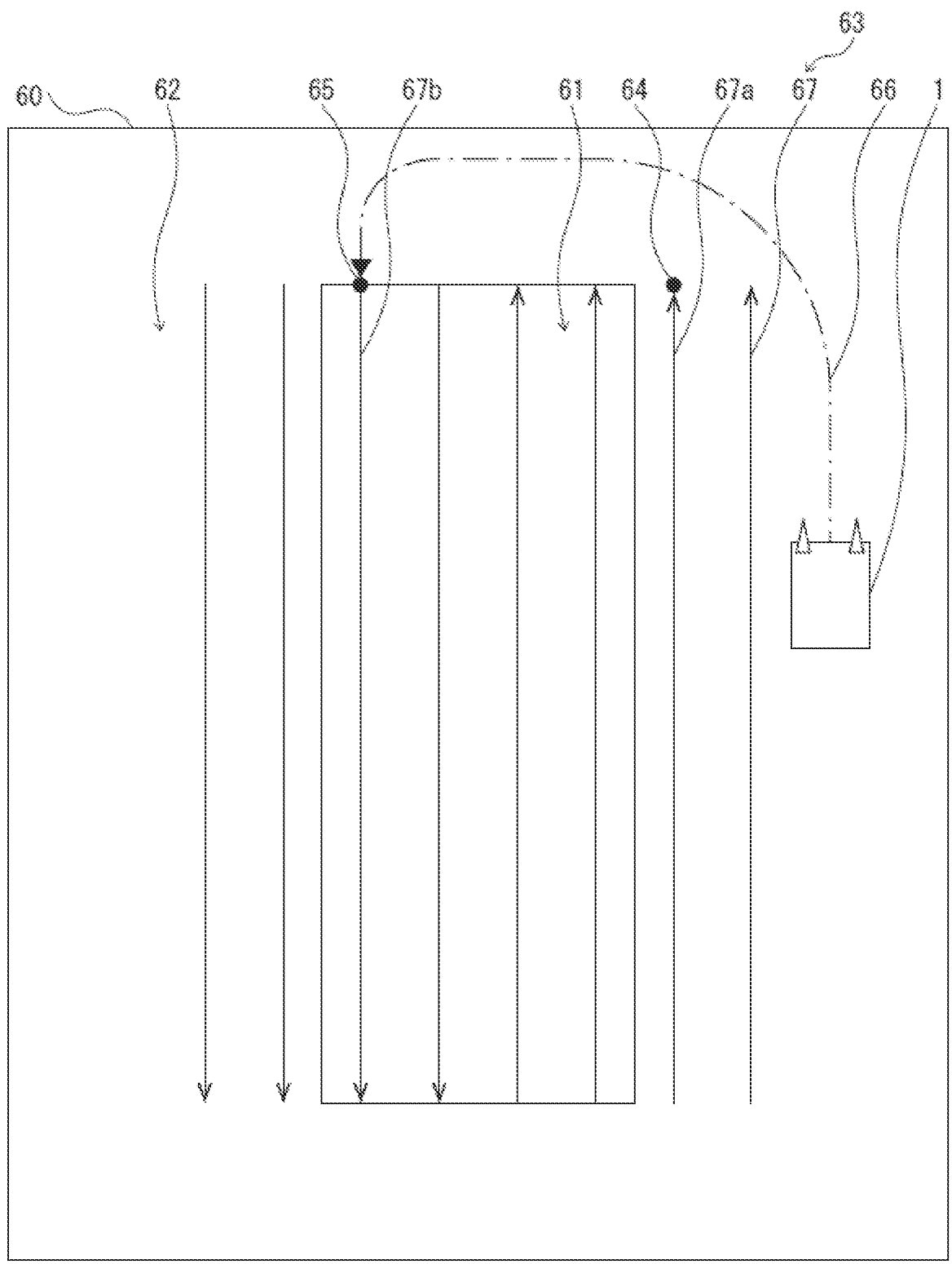
FIG. 3 is a plan view illustrating a first example of return traveling in the combine according to the first embodiment of the present invention.

For example, as depicted in FIG. 3, when the combine 1 defines as a breakaway route 67a, the straight route 67 predetermined and included in the work route 63, then pauses automatic traveling at the breakaway position 64 at a terminal end of this breakaway route 67a and breaks away from the work route 63, a first example is provided that the return route creation part 53 defines as a next route 67b, the straight route 67 connected next to that breakaway route 67a and sets the return position 65 at a starting end of that next route 67b. At that time, the return route creation part 53 creates the return route 66 such that the combine 1 moves from its own position at creation operation to the return position at a starting end of the next route 67b with keeping off the unworked area 61. In FIG. 3, an example is shown in which the work route 63 of shuttle reaping to shuttle on a plurality of the straight routes 67 is created for the unworked area 61 in the agricultural field 60. As another example of the first example, even when the work route 63 of revolving reaping is created, the return route creation part 53 may similarly define as the next route 67b, the straight route 67 connected next to the breakaway route 67a and set the return position 65 at a starting end of that next route 67b.

Second Example

Figure 4:
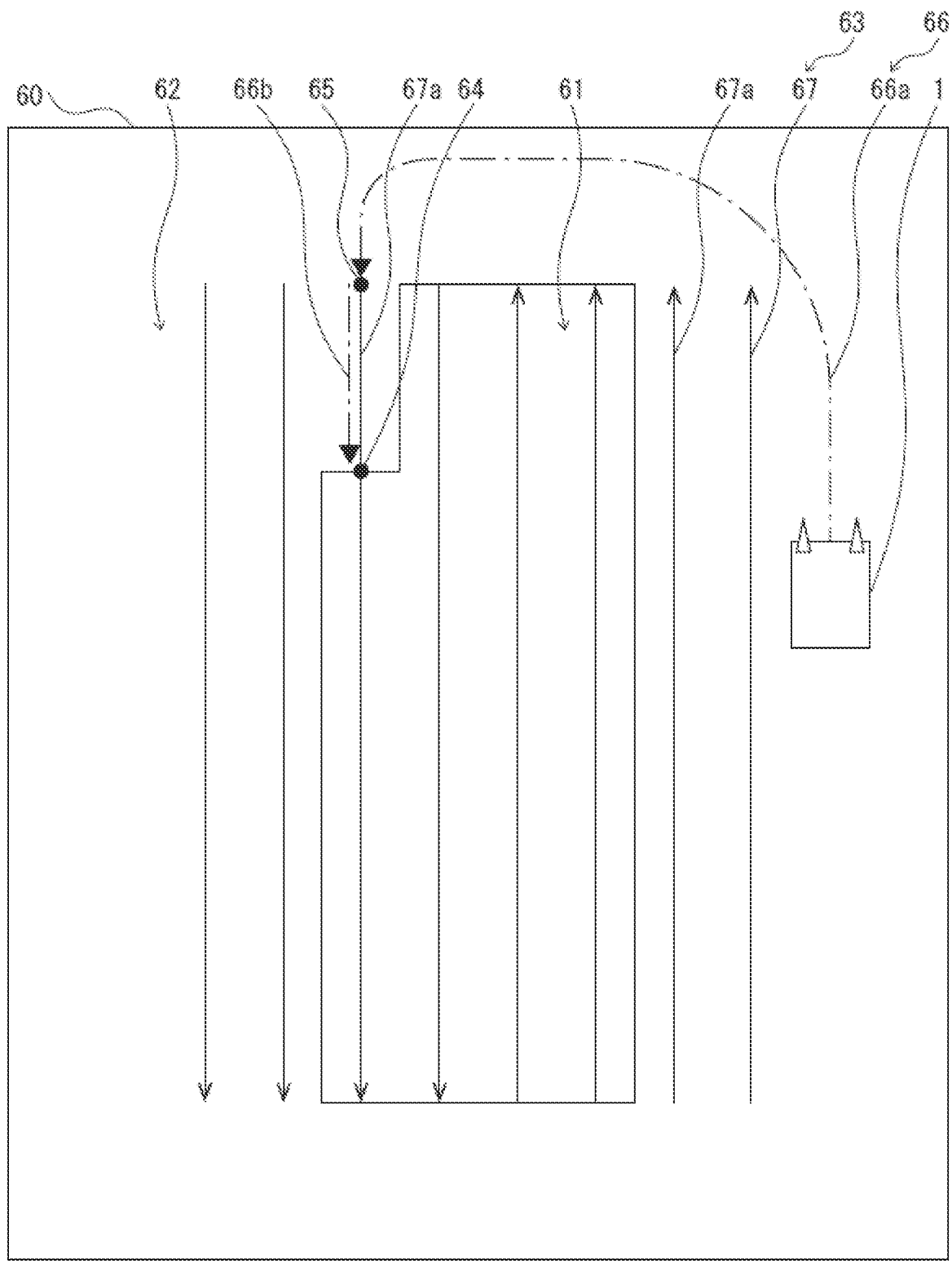
FIG. 4 is a plan view illustrating a second example of return traveling in the combine according to the first embodiment of the present invention.

Furthermore, as depicted in FIG. 4, when the combine 1 defines as a breakaway route 67a, the straight route 67 predetermined and included in the work route 63, then pauses automatic traveling at the breakaway position 64 in midway of this breakaway route 67a and breaks away from the work route 63, a second example is provided that the return route creation part 53 sets the return position 65 at a starting end of the breakaway route 67a. At that time, the return route creation part 53 creates a first return route 66a such that the combine 1 moves from its own position at creation operation to the return position 65 at a starting end of the breakaway route 67a with keeping off the unworked area 61. The return route creation part 53 also acquires as a second return route 66b, a partial route corresponding to an interval from the return position at a starting end of the breakaway route 67a to the breakaway position 64 within the work route 63. Then, the return route creation part 53 creates the return route 66 having the first return route 66a and the second return route 66b.

When the unworked area 61 is present between a position of the combine 1 itself at creation operation and the breakaway position 64, the return route creation part 53 may create the return route 66 having the first return route 66a and the second return route 66b as described above. By contrast, when the unworked area 61 is absent between the position of the combine 1 itself and the breakaway position 64, the return route creation part 53 may create the return route 66 to move in the shortest distance from the position of the combine 1 itself to the breakaway position 64 with keeping off the unworked area 61. In the second example, as depicted in FIG. 4, an example is shown in which the work route 63 of shuttle reaping to shuttle on a plurality of the straight routes 67 is created for the unworked area 61 in the agricultural field 60. As another example of the second example, even when the work route 63 of revolving reaping is created, the return route creation part 53 may similarly set the return position 65 at a starting end of the breakaway route 67a.

Third Example

The first example mentioned above has described an example that when the combine 1 pauses automatic traveling at the breakaway position 64 at a terminal end of the breakaway route 67a and breaks away from the work route 63, the return route creation part 53 sets the return position at a starting end of the next route 67b and creates the return route 66. However, the present invention is not limited to this example.

Figure 5:
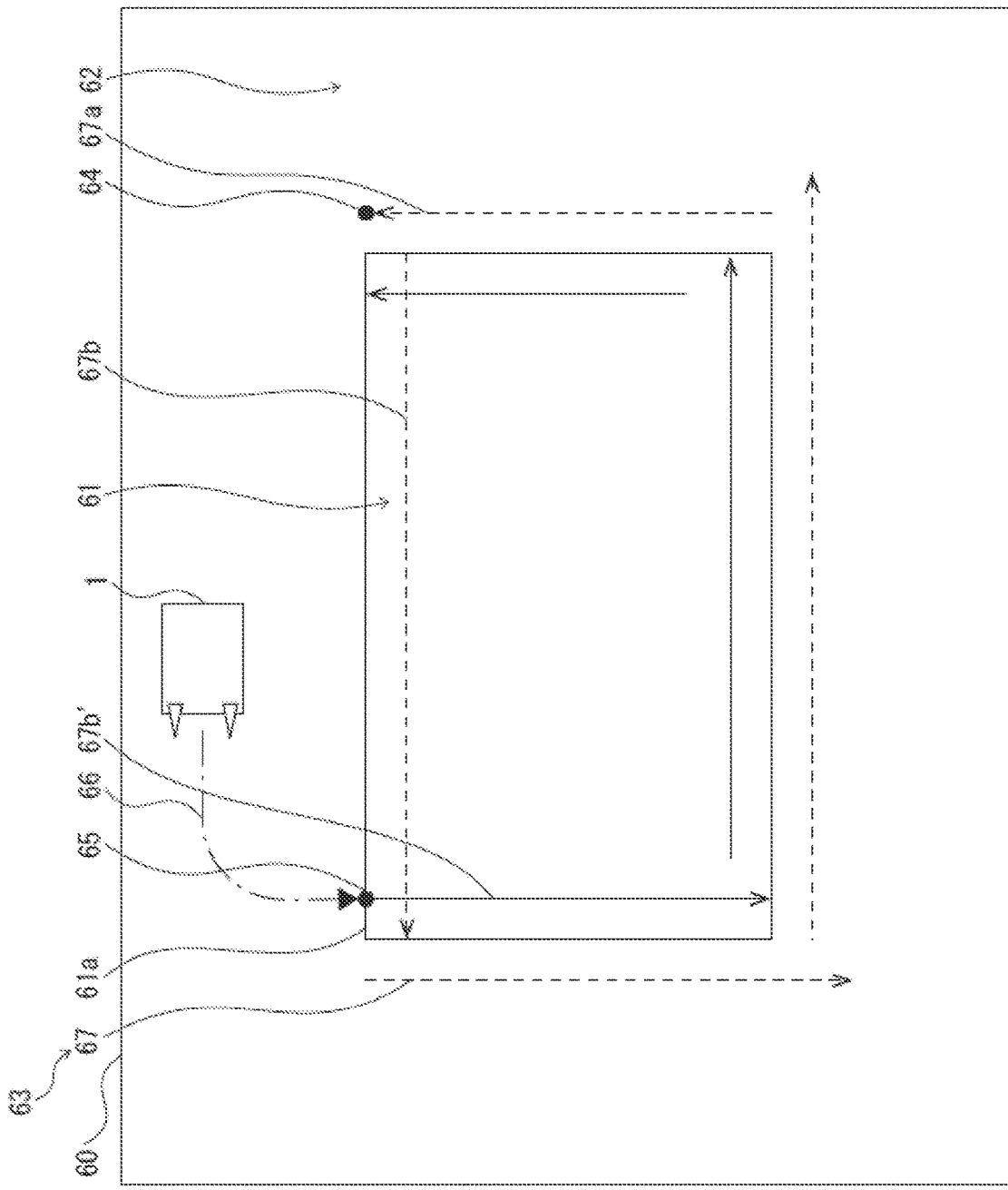
FIG. 5 is a plan view illustrating a third example of return traveling in the combine according to the first embodiment of the present invention.

For example, as depicted in FIG. 5, when the work route 63 of revolving reaping is created that repeats a revolution connecting a plurality of the straight routes 67 with shifting toward the center for the unworked area 61 in the agricultural field 60, the combine 1 breaking away from the work route 63 is sometimes located apart from a starting end of the next route 67b. For such a case, as a third example, given that the combine 1 defines a corner part of the unworked area 61 closest to a position of the combine 1 itself at creation operation as an entry corner part 61a, and enters the unworked area 61 from the entry corner part 61a and resumes automatic traveling from the work route 63 located at the entry corner part 61a, the return route creation part 53 may set the return position 65 at this entry corner part 61a and create the return route 66 to travel to the return position 65 at the entry corner part 61a. At that time, the return route creation part 53 preferably sets the entry corner part 61a as well as creates the return route 66, so as to take the shortest distance, based on a position and a traveling direction of the combine 1 itself and an entry direction of the combine 1 at each corner part of the unworked area 61. In addition, the return route creation part 53 preferably sets the entry corner part 61a as well as creates the return route 66 so as to provide traveling with advance only or traveling with less turning.

Additionally, in the third example mentioned above, the work route creation part 51 creates as a next route 67b' for the remaining unworked area 61, the straight route 67 having the entry corner part 61a as a starting end, and recreates the work route 63 of revolving reaping to repeat a revolution connecting a plurality of the straight routes 67 including this next route 67b' with shifting toward the center, as depicted in FIG. 5. In FIG. 5, the straight routes 67 of the work route 63 originally created are represented by dashed lines, and the straight routes 67 of the work route 63 then recreated are represented by solid lines.

Fourth Example

Figure 6:
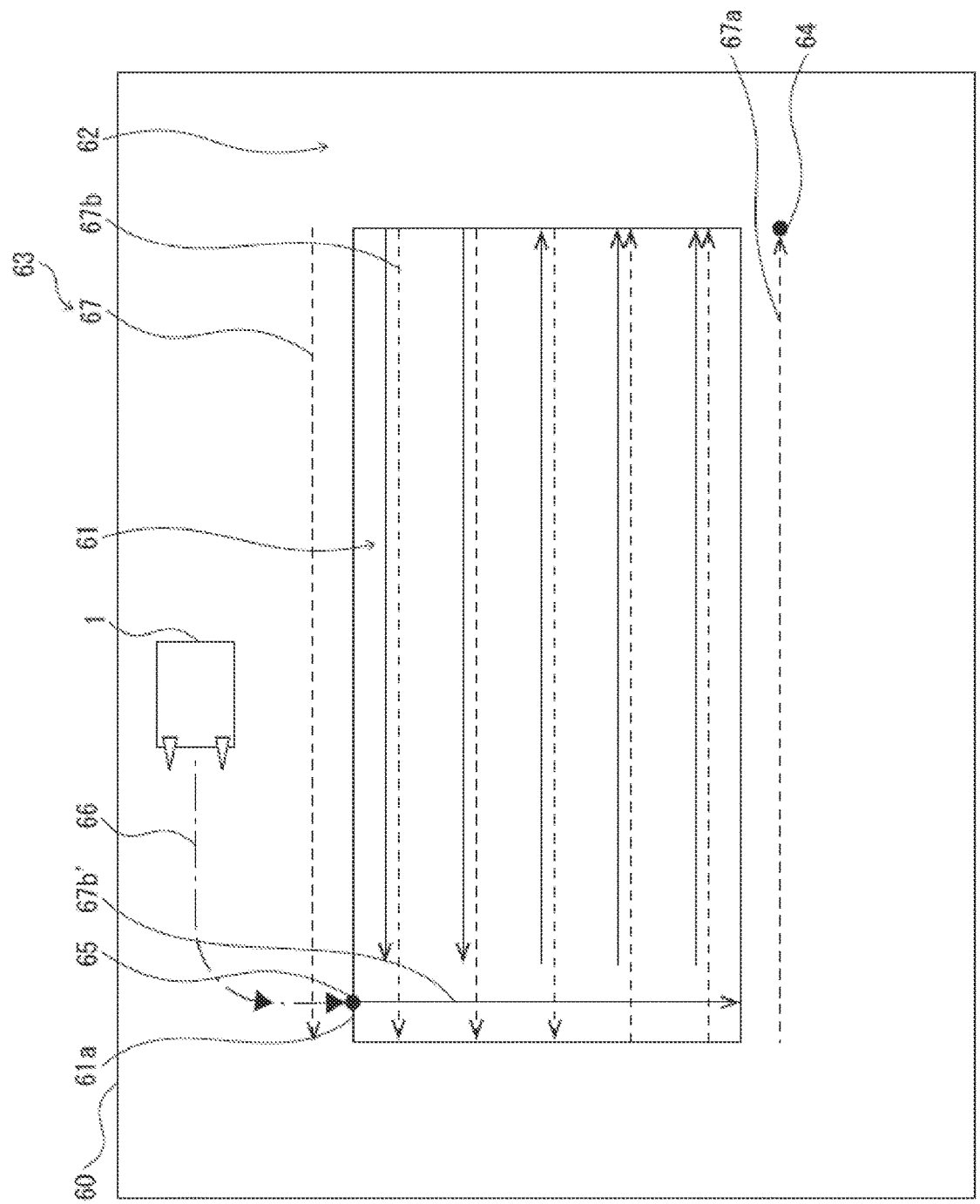
FIG. 6 is a plan view illustrating a fourth example of return traveling in the combine according to the first embodiment of the present invention.

Furthermore, as depicted in FIG. 6, when the work route 63 of shuttle reaping to shuttle on a plurality of the straight routes 67 is created for the unworked area 61 in the agricultural field 60, the combine 1 breaking away from the work route 63 may be located in a direction perpendicular to the next route 67b for the unworked area 61. For such a case, as a fourth example, given that the combine 1 defines a corner part of the unworked area 61 closest to a position of the combine 1 itself at creation operation as an entry corner part 61a, and enters the unworked area 61 from the entry corner part 61a in a direction perpendicular to the next route 67b and resumes automatic traveling from the work route 63 located at the entry corner part 61a, the return route creation part 53 may set the return position 65 at this entry corner part 61a and create the return route 66 to travel to the return position 65 at the entry corner part 61a such that the combine 1 faces the entry corner part 61a in a direction perpendicular to the next route 67b. The return route creation part 53 may add a condition that the combine 1 not only be apart in a direction perpendicular to the next route 67b, but also be in the range between both ends of the next route 67b in a traveling direction of the next route 67b, as depicted in FIG. 6.

Additionally, in the fourth example mentioned above, the work route creation part 51 recreates the work route 63 so as to include as the next route 67b', the straight route 67 to travel from the entry corner part 61a of the unworked area 61 in a direction perpendicular to the next route 67b. For example, as depicted in FIG. 6, the work route creation part 51 newly creates the next route 67b' to enter the unworked area 61 from the entry corner part 61a in a direction perpendicular to a plurality of the straight routes 67 originally created in the work route 63, and to travel straight to an end on an opposite side of the entry corner part 61a. The work route creation part 51 also modifies to shorten the straight routes 67 of residue by a working width of the combine 1 on a side including the entry corner part 61a. Then, the work route creation part 51 defines as a starting end of the straight route 67 of residue, an end closest to a terminal end of the next route 67b' among the shortened ends of the straight routes 67, and recreates the work route 63 so as to connect the terminal end of the next route 67b' to the starting end of the straight route 67 of residue and perform shuttle reaping to start from the starting end and shuttle on the straight routes 67 of residue. At that time, the straight routes 67 of residue may be changed in a traveling direction. In FIG. 6, the straight routes 67 of the work route 63 originally created are represented by dashed lines, and the straight routes 67 of the work route 63 then recreated are represented by solid lines.

Fifth Example

The first embodiment mentioned above has described an example that when the combine 1 pauses automatic traveling at the breakaway position 64 in midway of the breakaway route 67a and breaks away from the work route 63, the return route creation part 53 sets the return position 65 at a starting end of the breakaway route 67a and creates the return route 66. However, the present invention is not limited to this example.

Figure 7:
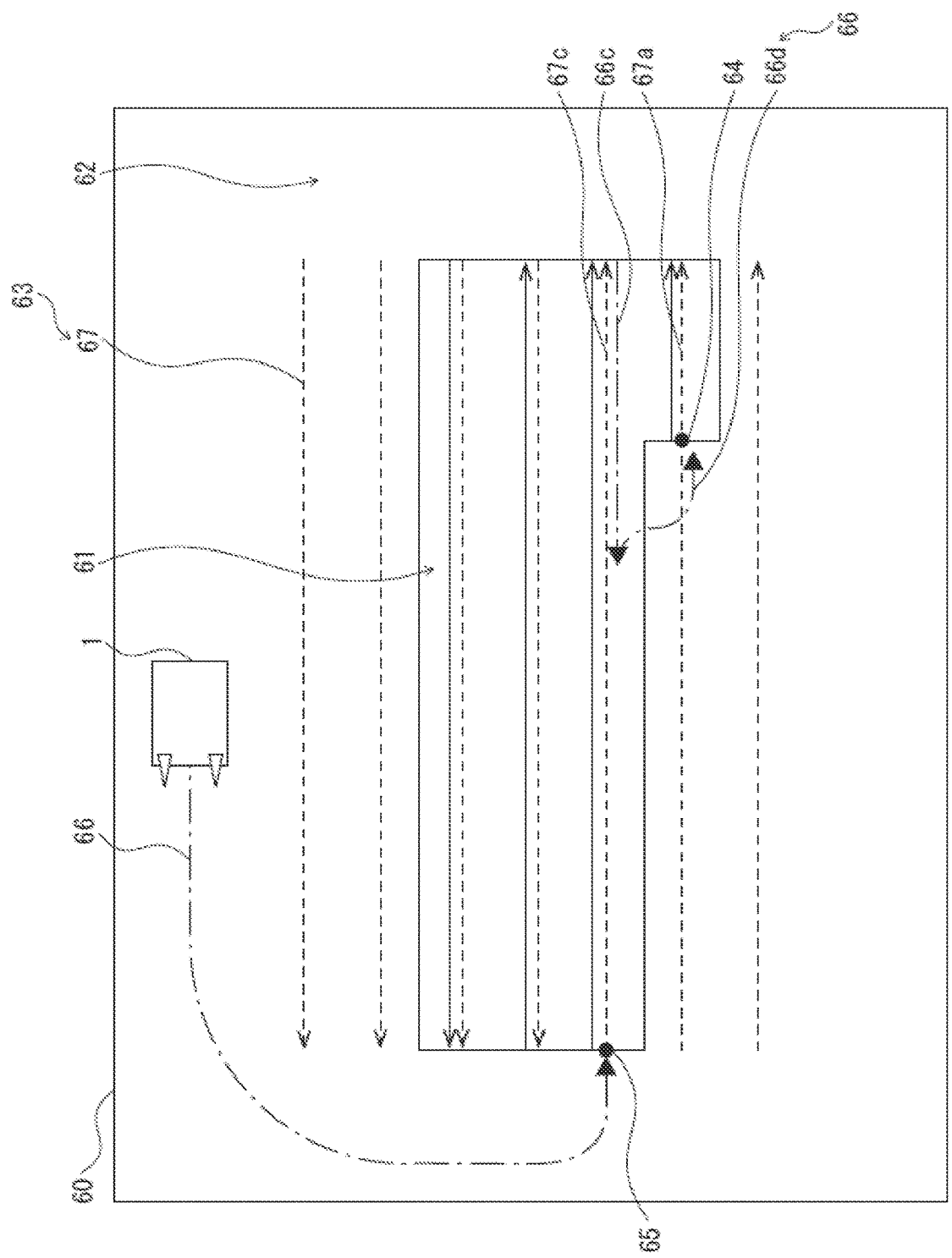
FIG. 7 is a plan view illustrating a fifth example of return traveling in the combine according to the first embodiment of the present invention.
Figure 8:
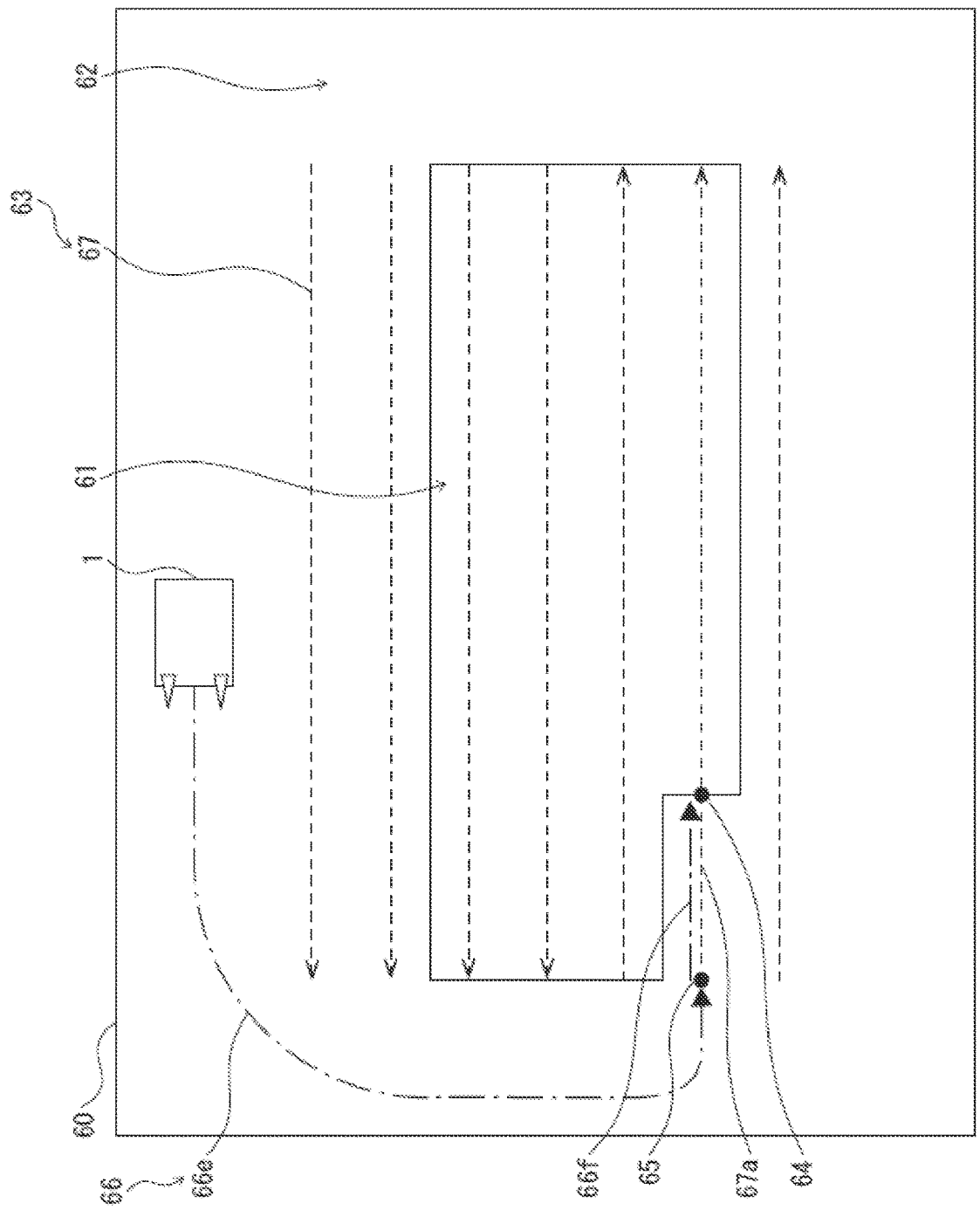
FIG. 8 is a plan view illustrating a sixth example of return traveling in the combine according to the first embodiment of the present invention.

For example, as depicted in FIG. 7 and FIG. 8, when the work route 63 of shuttle reaping to shuttle on a plurality of the straight routes 67 for the unworked area 61 in the agricultural field 60 is created, a first situation is defined where the combine 1 breaking away from the work route 63 is located on an opposite side of the breakaway position 64 across the unworked area 61, and in a direction perpendicular to the straight route 67 relative to the unworked area 61. For such a first situation, as a fifth example, when a distance from a starting end of the breakaway route 67a to the breakaway position 64 is a predetermined spacing threshold or more, the straight route 67 adjacent to the breakaway route 67a is defined as an adjacent route 67c, and an end of the adjacent route 67c close to a starting end of the breakaway route 67a is defined as a starting end of that adjacent route 67c; then given that automatic traveling is resumed from the starting end, the return route creation part 53 sets the return position 65 at a starting end of the adjacent route 67c and creates the return route 66 to travel from a position of the combine 1 itself at creation operation to the return position 65, as depicted in FIG. 7. Here, the predetermined spacing threshold is set corresponding to the length of the breakaway route 67a, and may be set to e.g., a half-length of the breakaway route 67a, or may be set in response to an operation intended by a worker.

Furthermore, in the fifth example, the return route creation part 53 creates the return route 66 to travel from a terminal end of the adjacent route 67c to the breakaway position 64 in order to resume automatic traveling on the breakaway route 67a from the breakaway position 64 after automatic traveling on the adjacent route 67c. For example, the return route creation part 53 creates the return route 66 having a first return route 66c to travel backward along the adjacent route 67c, which is now the worked area 62, from a terminal end of the adjacent route 67c to pass through the breakaway position 64, and a second return route 66d turning from a terminal end of the first return route 66c to the breakaway position 64.

Additionally, in the fifth example mentioned above, the work route creation part 51 recreates the work route 63 so as to perform automatic traveling from a starting end to a terminal end of the adjacent route 67c, then perform automatic traveling from the breakaway position 64 to a terminal end on the breakaway route 67a, and subsequently perform shuttle reaping to shuttle on the straight routes 67 of residue. In FIG. 7, the straight routes 67 of the work route 63 originally created are represented by dashed lines, and the straight routes 67 of the work route 63 then recreated are represented by solid lines. The above has described an example in which the fifth example is applied when a distance from a starting end of the breakaway route 67a to the breakaway position 64 is a predetermined spacing threshold or more (i.e., when the length of the worked area 62 on the breakaway route 67a is a predetermined reaping distance or more). However, the present invention is not limited to this example. For example, the fifth example may be applied when a distance from the breakaway position 64 to a terminal end of the breakaway route 67a is less than a predetermined spacing threshold (i.e., when the length of the remaining unworked area 61 on the breakaway route 67a is less than a predetermined unreaped distance).

Sixth Example

Meanwhile, for the first situation, as a sixth example, when a distance from a starting end of the breakaway route 67a to the breakaway position 64 is less than a predetermined spacing threshold, given that the combine 1 relocates from a starting end of the breakaway route 67a toward the breakaway position 64 and resumes automatic traveling from the breakaway position 64, the return route creation part 53 sets the return position 65 at a starting end of the breakaway route 67a and creates the return route 66, in a similar manner to the second example, as depicted in FIG. 8. In other words, the return route creation part 53 creates the return route 66 having a first return route 66e from a position of the combine 1 itself at creation operation to the return position 65 at a starting end of the breakaway route 67a, and a second return route 66f corresponding to an interval from the return position 65 at a starting end of the breakaway route 67a to the breakaway position 64. In this case, the work route creation part 51 does not require recreation of the work route 63. The above has described an example in which the sixth example is applied when a distance from a starting end of the breakaway route 67a to the breakaway position 64 is less than a predetermined spacing threshold (i.e., when the length of the worked area 62 on the breakaway route 67a is less than a predetermined reaping distance). However, the present invention is not limited to this example. For example, the sixth example may be applied when a distance from the breakaway position 64 to a terminal end of the breakaway route 67a is a predetermined spacing threshold or more (i.e., when the length of the remaining unworked area 61 on the breakaway route 67a is a predetermined unreaped distance or more).

The fifth example and the sixth example mentioned above have described an example that the return route creation part 53 sets the return position 65 and creates the return route 66, corresponding to whether a distance from a starting end of the breakaway route 67a to the breakaway position 64 is a predetermined spacing threshold or more. However, the present invention in not limited to this example. For example, in another example, the return route creation part 53 may set the return position 65 and creates the return route 66 so as to take the shortest distance among each of the return routes 66 in the fifth example and the sixth example. Alternatively, the return route creation part 53 may set the return position 65 and creates the return route 66 in response to a selection operation intended by a worker among each of the return routes 66 in the fifth example and the sixth example.

Seventh Example and Eighth Example

Figure 9:
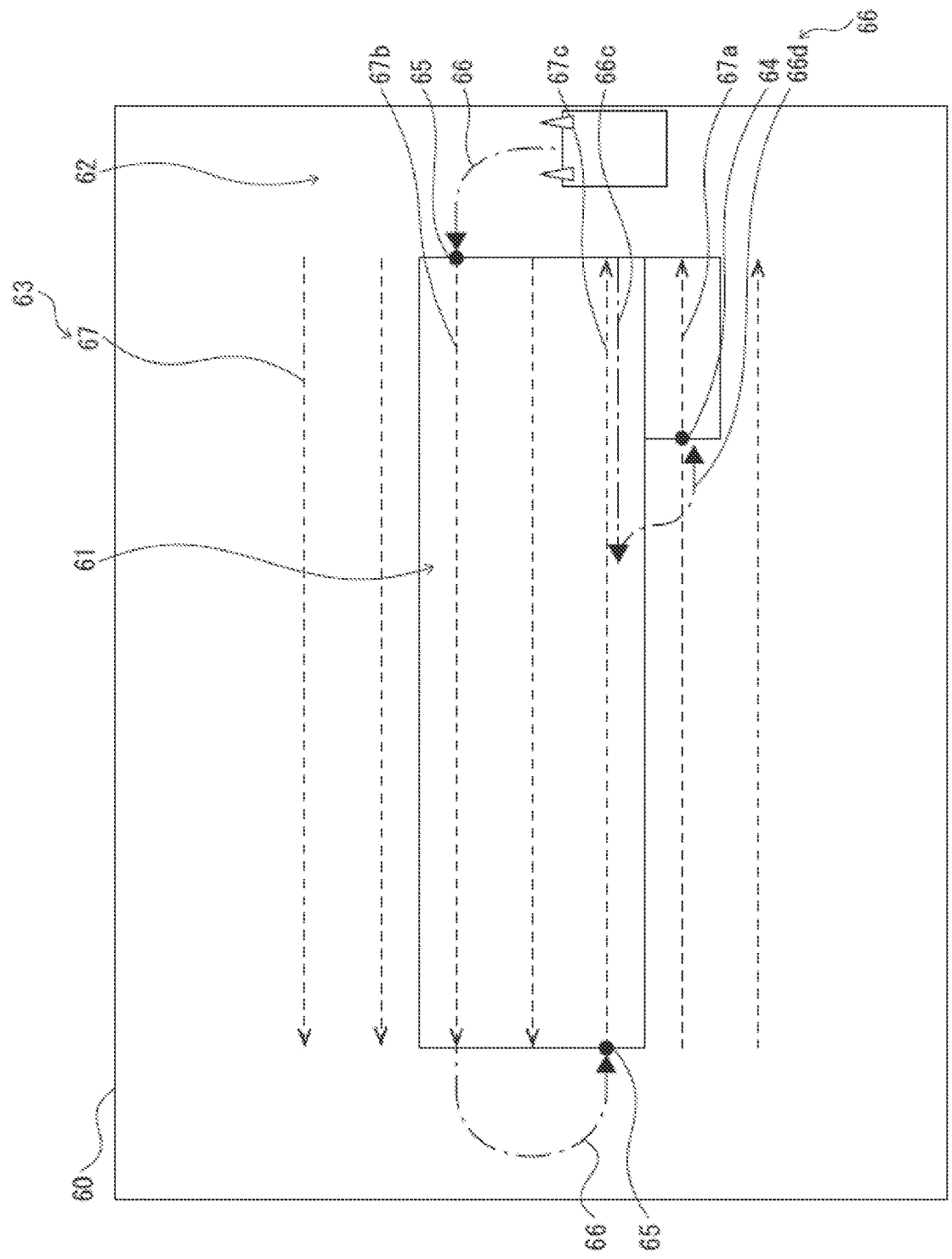
FIG. 9 is a plan view illustrating a seventh example of return traveling in the combine according to the first embodiment of the present invention.
Figure 10:
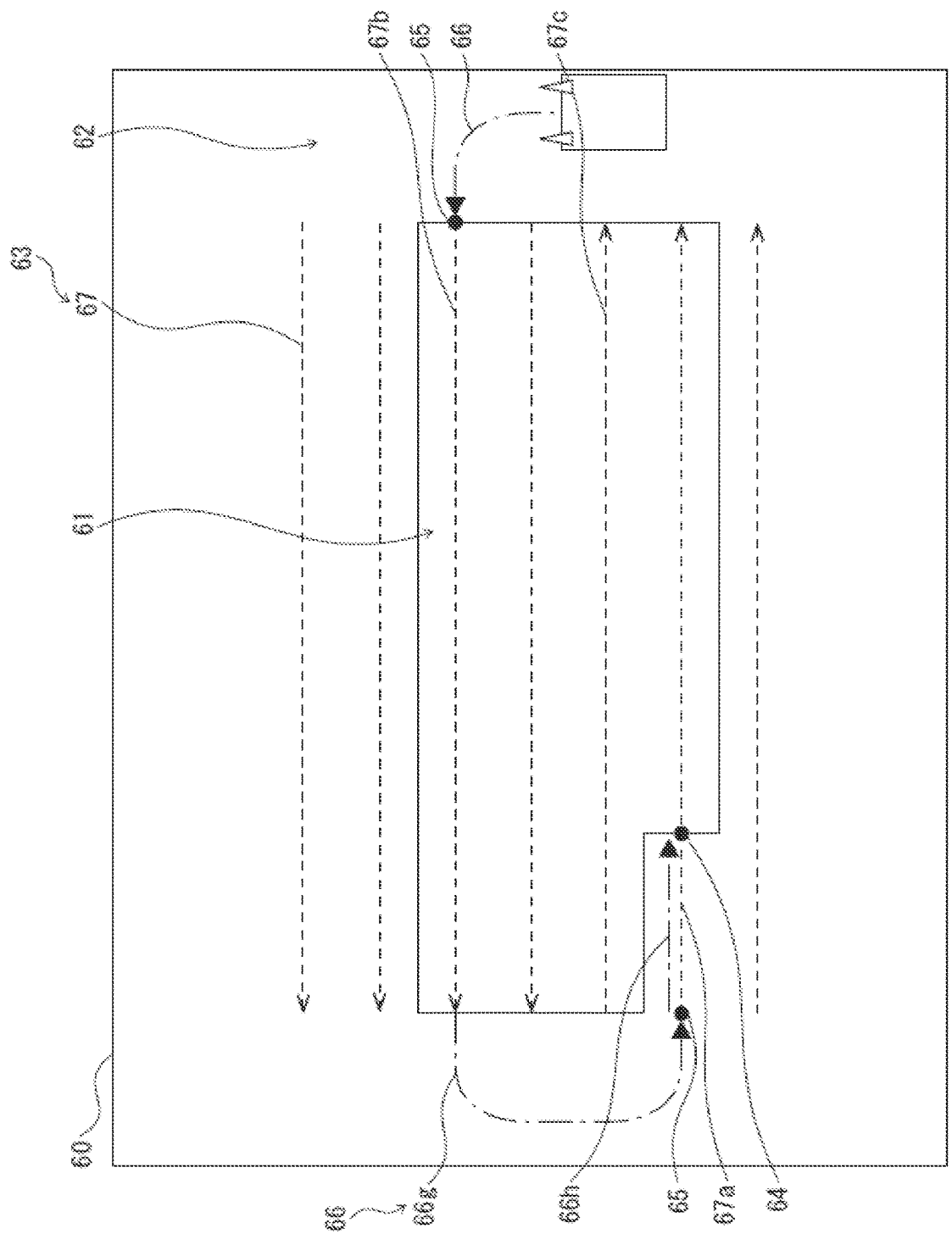
FIG. 10 is a plan view illustrating an eighth example of return traveling in the combine according to the first embodiment of the present invention.

Furthermore, for example, as depicted in FIG. 9 to FIG. 12, a second situation is defined where when the work route 63 of shuttle reaping to shuttle on a plurality of the straight routes 67 for the unworked area 61 in the agricultural field 60 is created, the combine 1 pausing automatic traveling at the breakaway position 64 in midway of the breakaway route 67a and breaking away from the work route 63 is located close to the breakaway position 64 relative to the unworked area 61 in a direction perpendicular to the straight route 67, or is located at an outer side than an end of the straight route 67 relative to the unworked area 61 in a traveling direction of the straight route 67 (out of the range between both ends of the straight route 67). For such a second situation, as the seventh example and the eighth example, the straight route 67 connected next to the breakaway route 67a is defined as the next route 67b, and an end of the next route 67b close to a position of the combine 1 itself at creation operation is defined as a starting end of this next route 67b; then given that automatic traveling is resumed from the starting end, the return route creation part 53 sets the return position 65 at a starting end of the next route 67b and creates the return route 66 to travel from a position of the combine 1 itself at creation operation to the return position 65, as depicted in FIG. 9 and FIG. 10.

Additionally, in the seventh example and the eighth example, after automatic traveling on the next route 67b, the return route creation part 53 may set the return position 65 and create the return route 66, corresponding to whether a distance from a starting end of the breakaway route 67a to the breakaway position 64 is a predetermined spacing threshold or more, in a similar manner to the fifth example and the sixth example.

In other words, in the seventh example, when a distance from a starting end of the breakaway route 67a to the breakaway position 64 is a predetermined spacing threshold or more, the return route creation part 53 creates the return route 66 to travel from a terminal end of the next route 67b to the return position 65 at a starting end of the adjacent route 67c adjacent to the breakaway route 67a, as depicted in FIG. 9. In this case, the return route creation part 53 creates the return route 66 having the first return route 66c and the second return route 66d to travel from a terminal end of the adjacent route 67c to the breakaway position 64 in order to resume automatic traveling on the breakaway route 67a from the breakaway position 64 after automatic traveling on the adjacent route 67c, in a similar manner to the fifth example. The above has described an example in which the seventh example is applied when a distance from a starting end of the breakaway route 67a to the breakaway position 64 is a predetermined spacing threshold or more (i.e., when the length of the worked area 62 on the breakaway route 67a is a predetermined reaping distance or more). However, the present invention is not limited to this example. For example, the seventh example may be applied when a distance from the breakaway position 64 to a terminal end of the breakaway route 67a is less than a predetermined spacing threshold (i.e., when the length of the remaining unworked area 61 on the breakaway route 67a is less than a predetermined unreaped distance).

Meanwhile, in the eighth example, when a distance from a starting end of the breakaway route 67a to the breakaway position 64 is less than a predetermined spacing threshold, the return route creation part 53 creates the return route 66 having a first return route 66g from a terminal end of the next route 67b to the return position 65 at a starting end of the breakaway route 67a, and a second return route 66h corresponding to an interval from the return position 65 at a starting end of the breakaway route 67a to the breakaway position 64, as depicted in FIG. 10. The above has described an example in which the eighth example is applied when a distance from a starting end of the breakaway route 67a to the breakaway position 64 is less than a predetermined spacing threshold (i.e., when the length of the worked area 62 on the breakaway route 67a is less than a predetermined reaping distance). However, the present invention is not limited to this example. For example, the eighth example may be applied when a distance from the breakaway position 64 to a terminal end of the breakaway route 67a is a predetermined spacing threshold or more (i.e., when the length of the remaining unworked area 61 on the breakaway route 67a is a predetermined unreaped distance or more).

The seventh example and the eighth example mentioned above have described an example that the return route creation part 53 sets the return position 65 and creates the return route 66, corresponding to whether a distance from a starting end of the breakaway route 67a to the breakaway position 64 is a predetermined spacing threshold or more. However, the present invention in not limited to this example. For example, in another example, the return route creation part 53 may set the return position 65 and creates the return route 66 so as to take the shortest distance among each of the return routes 66 in the seventh example and the eighth example. Alternatively, the return route creation part 53 may set the return position 65 and creates the return route 66 in response to a selection operation intended by a worker among each of the return routes 66 in the seventh example and the eighth example.

Ninth Example and Tenth Example

Figure 11:
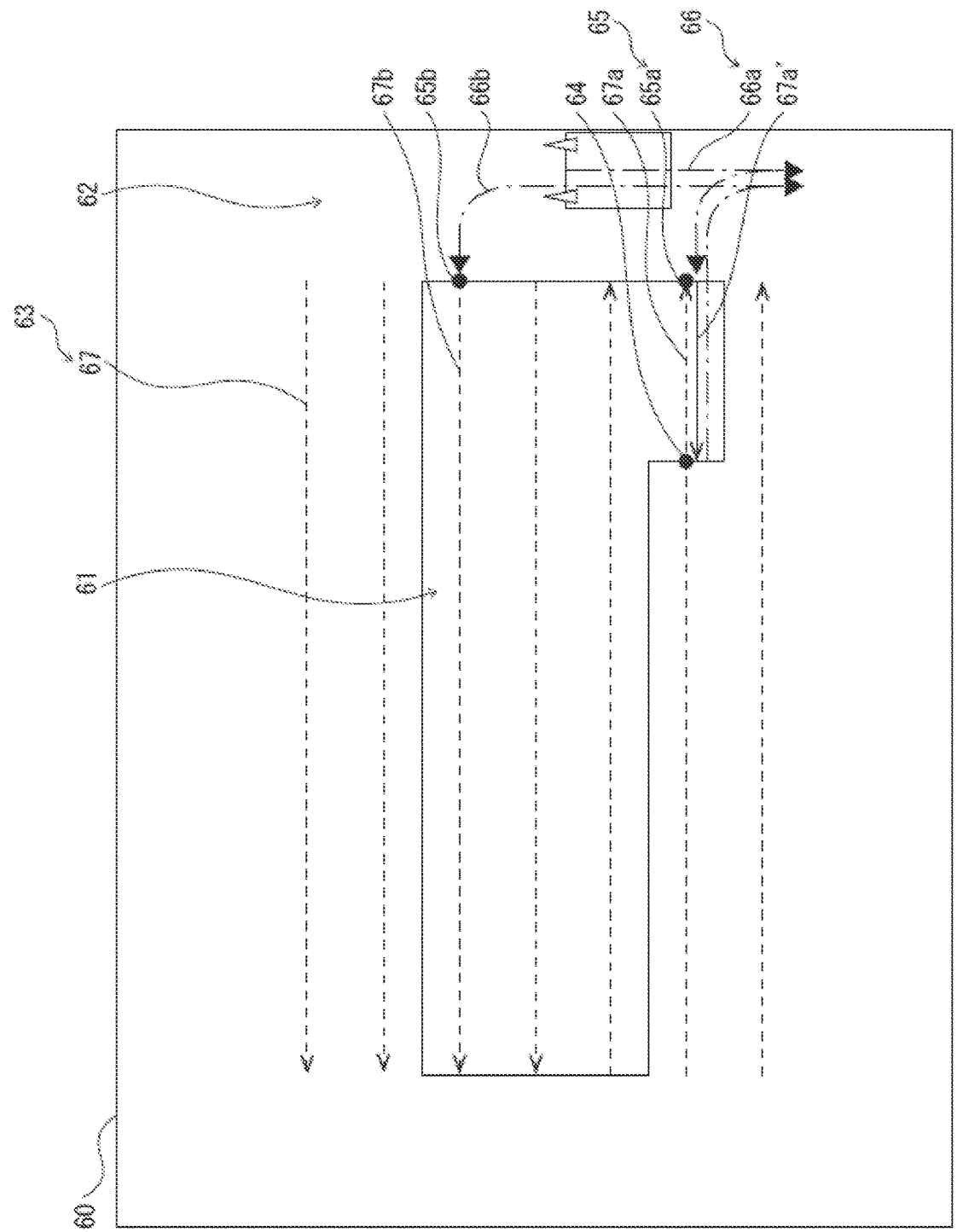
FIG. 11 is a plan view illustrating a ninth example of return traveling in the combine according to the first embodiment of the present invention.
Figure 12:
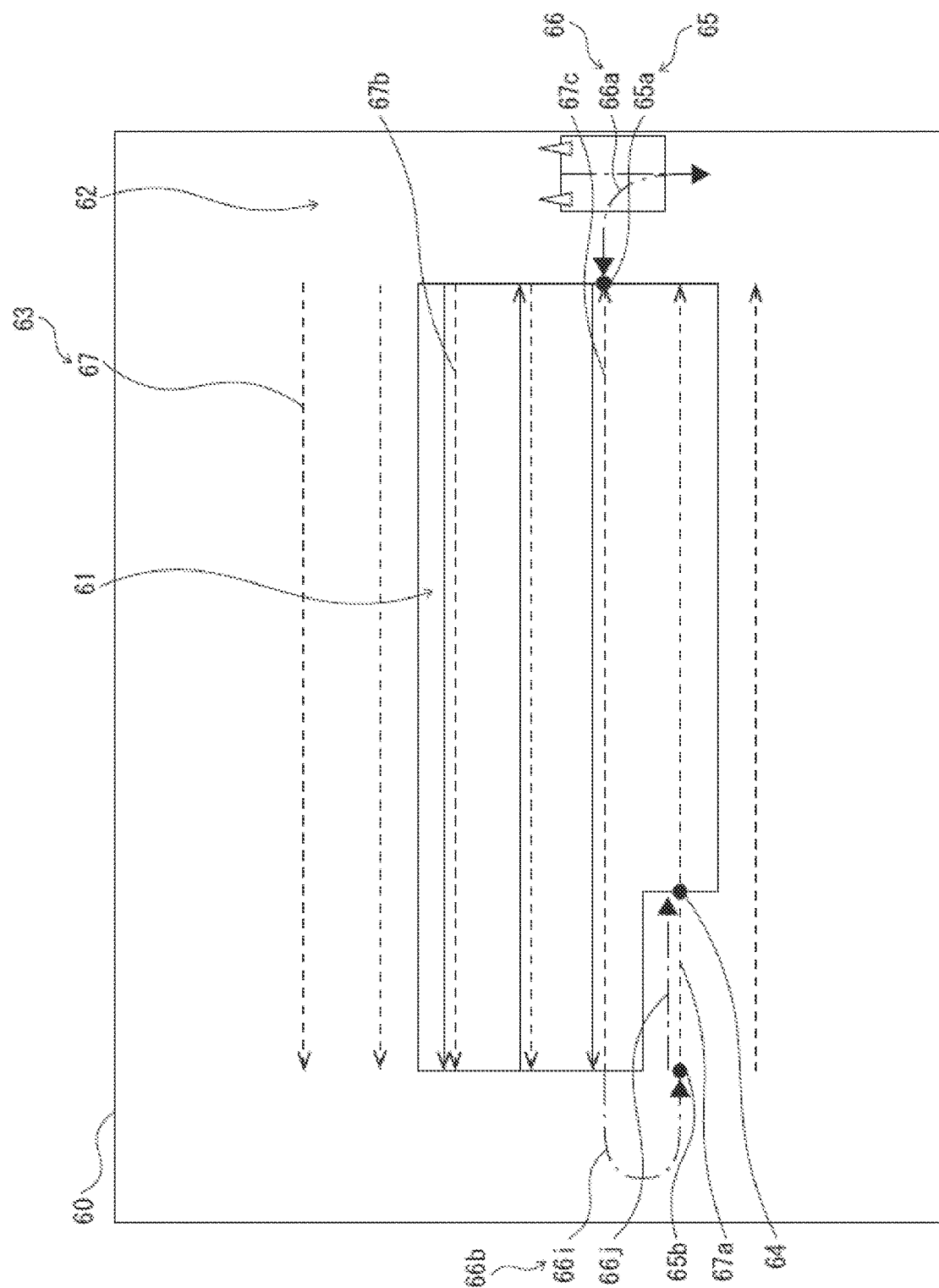
FIG. 12 is a plan view illustrating a tenth example of return traveling in the combine according to the first embodiment of the present invention.

Alternatively, for the second situation mentioned above, as a ninth example and a tenth example, the return route creation part 53 may set the return position 65 on the breakaway route 67a or the adjacent route 67c and create the return route 66 corresponding to whether a distance from a starting end of the breakaway route 67a to the breakaway position 64 is a predetermined spacing threshold or more, as depicted in FIG. 11 and FIG. 12, in a similar manner to the fifth example and the sixth example, before moving to automatic traveling on the next route 67b as in the seventh example and the eighth example. For example, in the ninth example, when a distance from a starting end of the breakaway route 67a to the breakaway position 64 is a predetermined spacing threshold or more, given that automatic traveling on the breakaway route 67a of residue is resumed from the breakaway position 64 or a terminal end of the breakaway route 67a, the return route creation part 53 sets the return position 65 at the breakaway position 64 or a terminal end of the breakaway route 67a, and creates the return route 66 to travel from a position of the combine 1 itself at creation operation to the return position 65.

FIG. 11 illustrates an example where given that automatic traveling on the straight route 67a' is resumed from a terminal end of the breakaway route 67a, the return route creation part 53 sets the return position 65a at a terminal end of the breakaway route 67a, and creates the return route 66a to travel backward from a position of the combine 1 itself to pass through the return position 65a and then perform turning traveling to the return position 65a at a terminal end of the breakaway route 67a.

Moreover, in the ninth example, in order to resume automatic traveling on a plurality of the remaining straight routes 67 from the next route 67b after automatic traveling on the straight route 67a' from a terminal end of the breakaway route 67a, the return route creation part 53 sets the return position 65b at a starting end of the next route 67b, and creates the return route 66b to travel from a terminal end of the breakaway route 67a or the breakaway position 64 for completion of automatic traveling on the straight route 67a', to the return position 65b at a starting end of the next route 67b. FIG. 11 illustrates an example that the return route creation part 53 creates the return route 66b to travel from the breakaway position 64 to the return position 65b at a starting end of the next route 67b.

In the ninth example mentioned above, the work route creation part 51 recreates the work route 63 so as to perform automatic traveling from the breakaway position 64 to a terminal end of the breakaway route 67a, or from a terminal end of the breakaway route 67a to the breakaway position 64, and this case does not require recreation of the work route 63 for a plurality of the straight routes 67 after the next route 67b. In FIG. 11, the straight routes 67 of the work route 63 originally created are represented by dashed lines, and the straight route 67a' of the work route 63 then recreated is represented by a solid line. The above has described an example in which the ninth example is applied when a distance from a starting end of the breakaway route 67a to the breakaway position 64 is a predetermined spacing threshold or more (i.e., when the length of the worked area 62 on the breakaway route 67a is a predetermined reaping distance or more). However, the present invention is not limited to this example. For example, the ninth example may be applied when a distance from the breakaway position 64 to a terminal end of the breakaway route 67a is less than a predetermined spacing threshold (i.e., when the length of the remaining unworked area 61 on the breakaway route 67a is less than a predetermined unreaped distance).

Meanwhile, in the tenth example, when a distance from a starting end of the breakaway route 67a to the breakaway position 64 is less than a predetermined spacing threshold, given that in the adjacent route 67c adjacent to the breakaway route 67a, a traveling direction of the adjacent route 67c is changed so as to define an end closer to a position of the combine 1 itself at creation operation as a starting end of this adjacent route 67c, and then that automatic traveling is resumed from the starting end, the return route creation part 53 sets the return position 65a at a starting end of the adjacent route 67c and creates the return route 66a to travel from a position of the combine 1 itself to the return position 65a, as depicted in FIG. 12.

Additionally, in the tenth example, in order to resume automatic traveling on the breakaway route 67a from the breakaway position 64 after automatic traveling on the adjacent route 67c, the return route creation part 53 creates the return route 66b to travel from a terminal end of the adjacent route 67c to the breakaway position 64. For example, the return route creation part 53 sets the return position 65b at a starting end of the breakaway route 67a, and creates the return route 66b having a first return route 66i from a terminal end of the adjacent route 67c to this return position 65b, and a second return route 66j corresponding to an interval from this return position 65b to the breakaway position 64.

In the tenth example mentioned above, the work route creation part 51 recreates the work route 63 so as to perform automatic traveling from a starting end to a terminal end of the adjacent route 67c, and also recreates the work route 63 so as to perform automatic traveling from the breakaway position 64 on the breakaway route 67a to a terminal end, and then perform shuttle reaping to shuttle on the straight routes 67 of residue. In FIG. 12, the straight routes 67 of the work route 63 originally created are represented by dashed lines, and the straight routes 67 of the work route 63 then recreated are represented by solid lines. The above has described an example in which the tenth example is applied when a distance from a starting end of the breakaway route 67a to the breakaway position 64 is less than a predetermined spacing threshold (i.e., when the length of the worked area 62 on the breakaway route 67a is less than a predetermined reaping distance). However, the present invention is not limited to this example. For example, the tenth example may be applied when a distance from the breakaway position 64 to a terminal end of the breakaway route 67a is a predetermined spacing threshold or more (i.e., when the length of the remaining unworked area 61 on the breakaway route 67a is a predetermined unreaped distance or more).

The ninth example and the tenth example mentioned above have described an example that the return route creation part 53 sets the return position 65 and creates the return route 66, corresponding to whether a distance from a starting end of the breakaway route 67a to the breakaway position 64 is a predetermined spacing threshold or more. However, the present invention in not limited to this example. For example, in another example, the return route creation part 53 may set the return position 65 and creates the return route 66 so as to take the shortest distance among each of the return routes 66 in the ninth example and the tenth example. Alternatively, the return route creation part 53 may set the return position 65 and creates the return route 66 in response to a selection operation intended by a worker among each of the return routes 66 in the ninth example and the tenth example.

Eleventh Example

Figure 13:
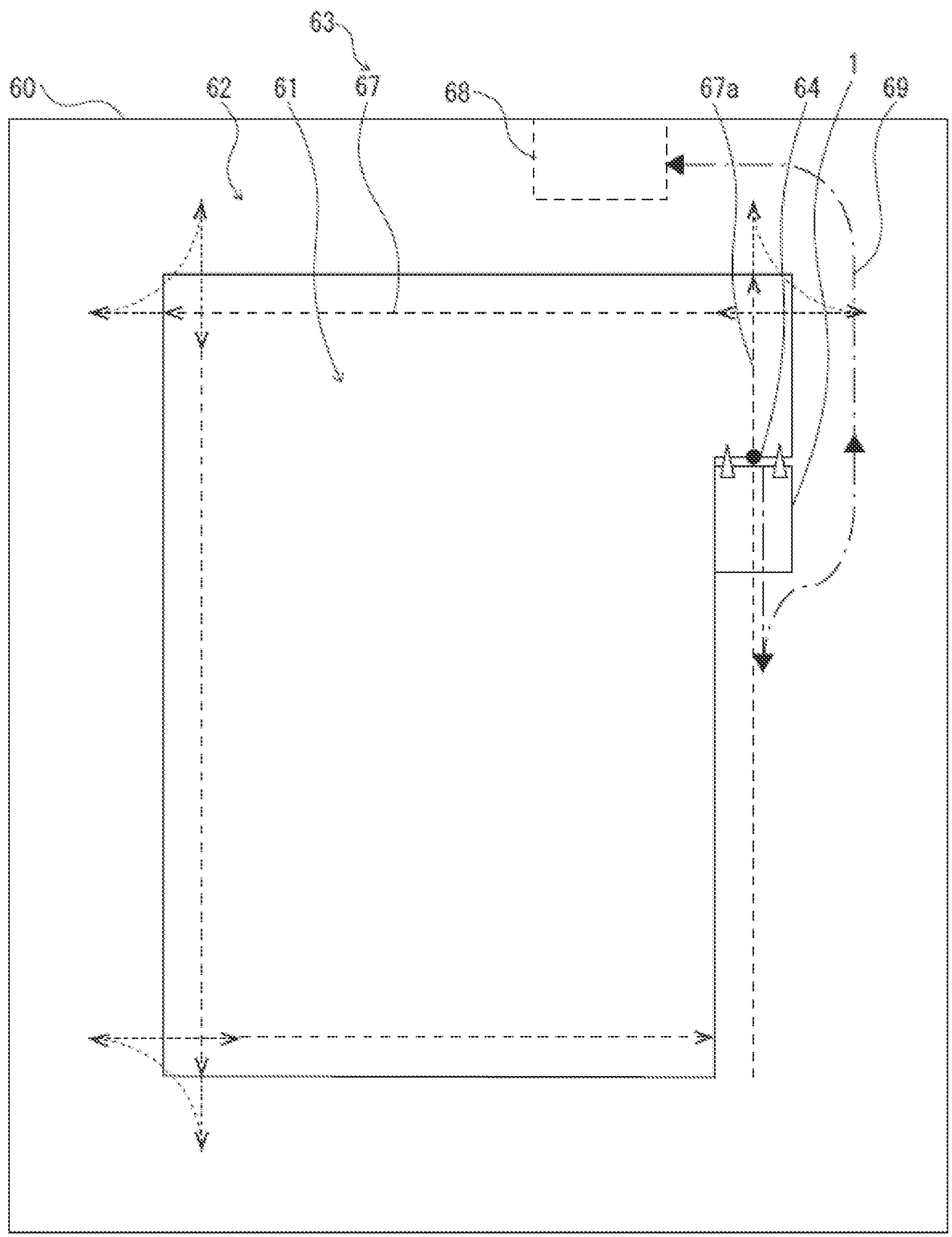
FIG. 13 is a plan view illustrating an eleventh example of discharge traveling in the combine according to the first embodiment of the present invention.
Figure 14:
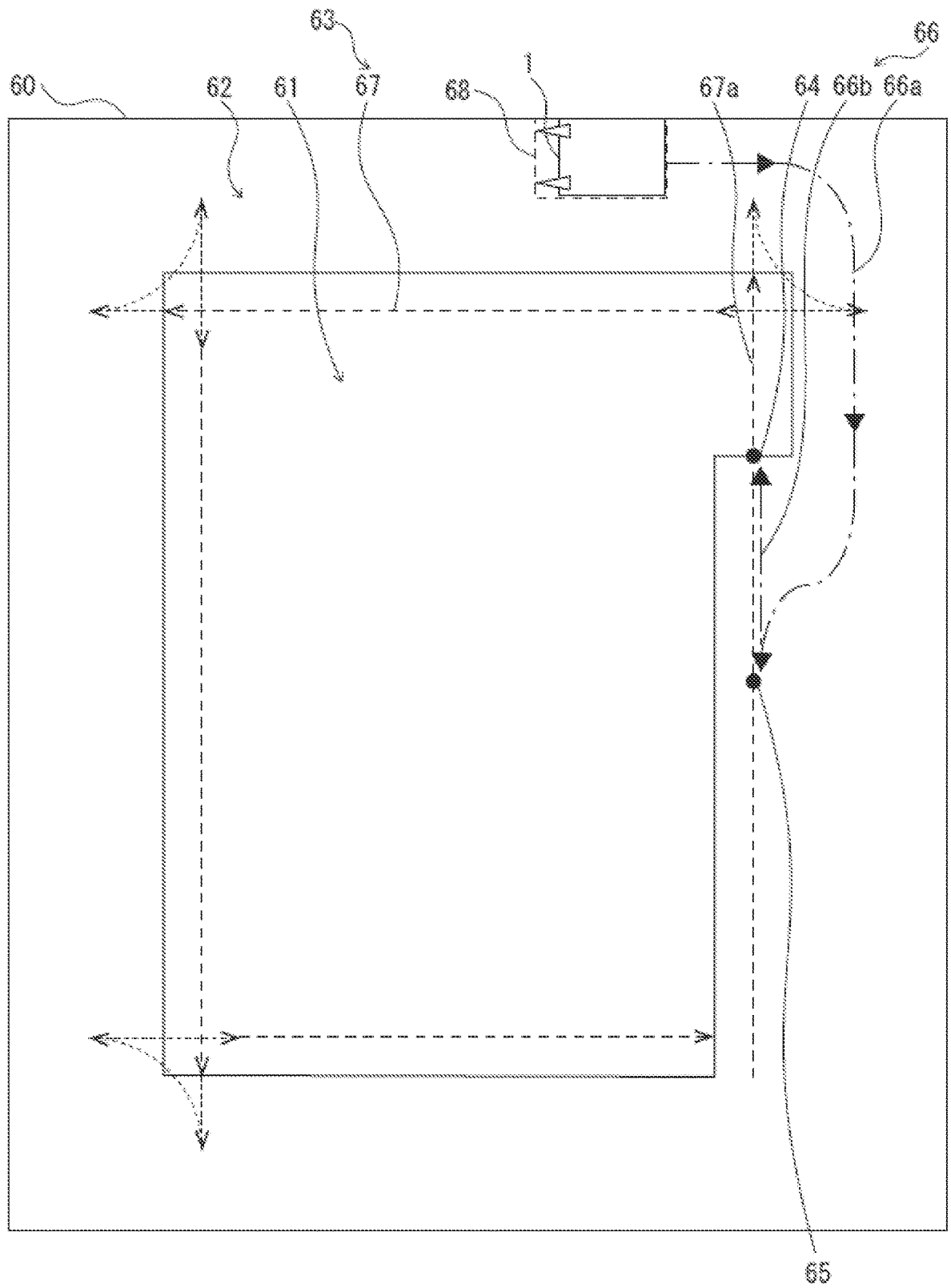
FIG. 14 is a plan view illustrating the eleventh example of return traveling in the combine according to the first embodiment of the present invention.

In the eleventh example, as depicted in FIGS. 13 and 14, the work route 63 of revolving reaping is created that repeats a revolution connecting a plurality of the straight routes 67 with shifting toward the center for the unworked area 61 in the agricultural field 60. In the eleventh example, when the combine 1 defines as a breakaway route 67a, the straight route 67 predetermined and included in the work route 63, then pauses automatic traveling at the breakaway position 64 in midway of this breakaway route 67a and breaks away from the work route 63, the return route creation part 53 sets the return position 65 in midway of the breakaway route 67a.

For example, in the eleventh example, as depicted in FIGS. 13 and 14, the discharge position 68 (midway work position) is set across the unworked area 61 in front of the combine 1 at the breakaway position 64. In this case, the relocation route creation part 52 creates a discharge route 69 (relocation route) such that the combine 1 performs discharge traveling (relocation traveling) from the breakaway position 64 to the discharge position 68 with keeping off the unworked area 61, as depicted in FIG. 13. For example, in order to keep off the remaining unworked area 61 on the breakaway route 67a, the relocation route creation part 52 creates the discharge route 69 so as to move backward from the breakaway position 64 along the breakaway route 67a, then turn diagonally forward and move to a side of the remaining unworked area 61, and further go around the remaining unworked area 61 and advance to the discharge position 68.

Alternatively, the relocation route creation part 52 may create the discharge route 69 so as to perform reaping traveling diagonally forward from the breakaway position 64, reap through the remaining unworked area 61 on the breakaway route 67a, move to a side of the remaining unworked area 61, and further go around the remaining unworked area 61 and advance up to the discharge position 68. In this case, the relocation traveling control part 36 may maintain the reaping part 3 at the work position and continue operation of the reaping part 3 even after reaching the breakaway position 64, and may stop operation of the reaping part 3 and raise the reaping part 3 to the non-work position after reaping through the remaining unworked area 61.

The return route creation part 53 also creates the return route 66 such that the combine 1 moves from its own position (e.g., discharge position 68) at creation operation to the return position 65 in midway of the breakaway route 67a with keeping off the unworked area 61, as depicted in FIG. 14. At that time, the return route creation part 53 may create the return route 66 that reverses the discharge route 69. For example, the return route creation part 53 create the first return route 66a so as to move backward from the discharge position 68, go around the remaining unworked area 61 on the breakaway route 67a to move to a side of the remaining unworked area 61, and then turn diagonally backward to move to the return position 65 on the breakaway route 67a. The return route creation part 53 also acquires as the second return route 66b, a partial route corresponding to an interval from the return position in midway of the breakaway route 67a to the breakaway position 64 within the work route 63. Then, the return route creation part 53 creates the return route 66 having the first return route 66a and the second return route 66b.

By the way, in the eleventh example, since a distance between the breakaway position 64 on the breakaway route 67a and the discharge position 68 is less than a predetermined spacing distance and is relatively close, the return route creation part 53 creates the return route 66 by setting the return position 65 in midway of the breakaway route 67a, but a terminal end of the breakaway route 67a is also relatively close to the discharge position 68. As another example, the return route creation part 53 may extend a starting end of the straight route 67 connected next to the breakaway route 67a to the end of the unworked area 61 in order to resume revolving reaping from a terminal end of the breakaway route 67a, and set the return position 65 at the starting end of that straight route 67. In this case, the return route creation part 53 creates the return route 66 that moves from the discharge position 68 to the return position 65 at the starting end of the extended straight route 67.

Twelfth Example

The eleventh example has described an example in which the return route creation part 53 creates the return route 66 by setting the return position in midway of the breakaway route 67a when the work route 63 of revolving reaping is created. However, the present invention in not limited to this example.

Figure 15:
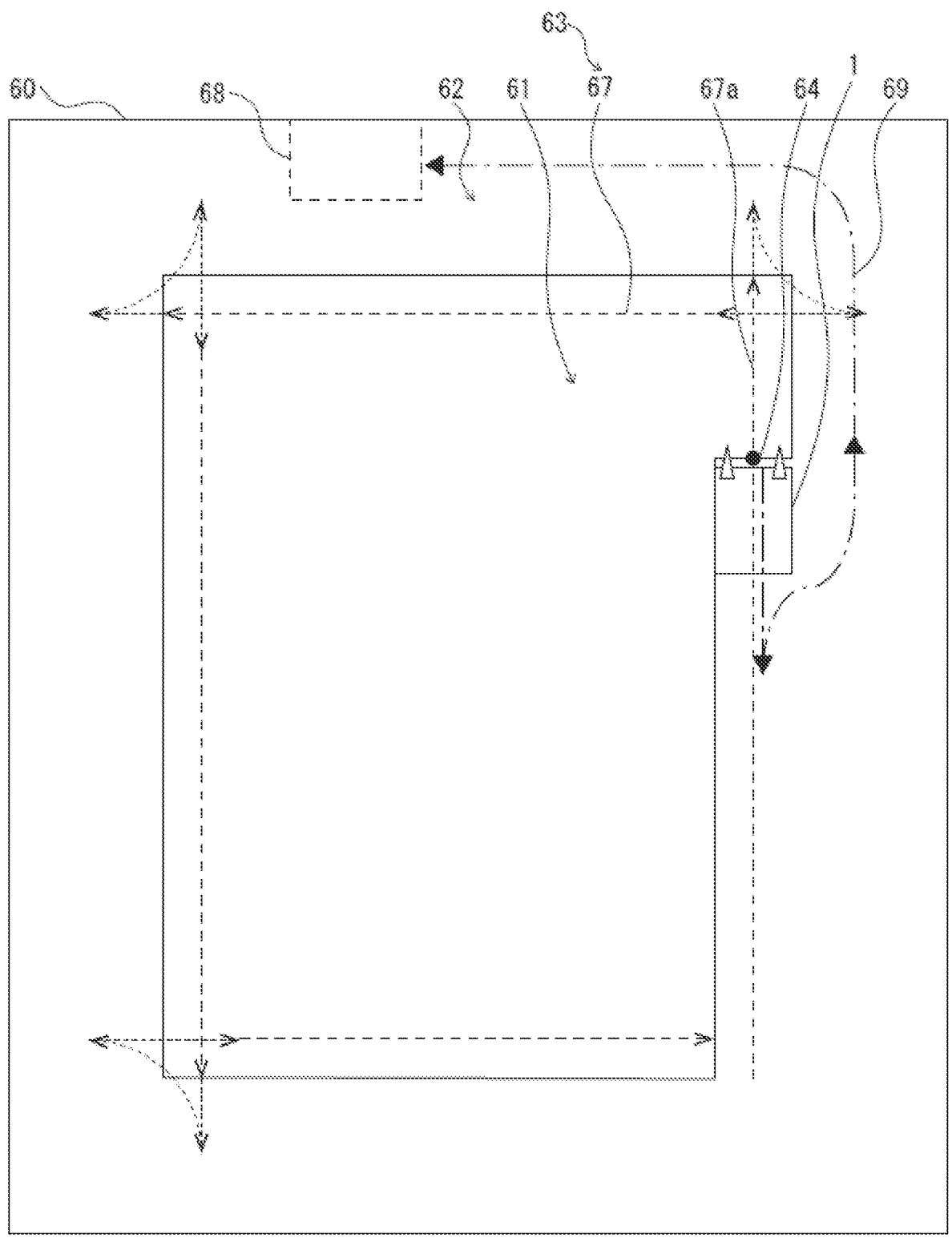
FIG. 15 is a plan view illustrating a twelfth example of discharge traveling in the combine according to the first embodiment of the present invention.
Figure 16:
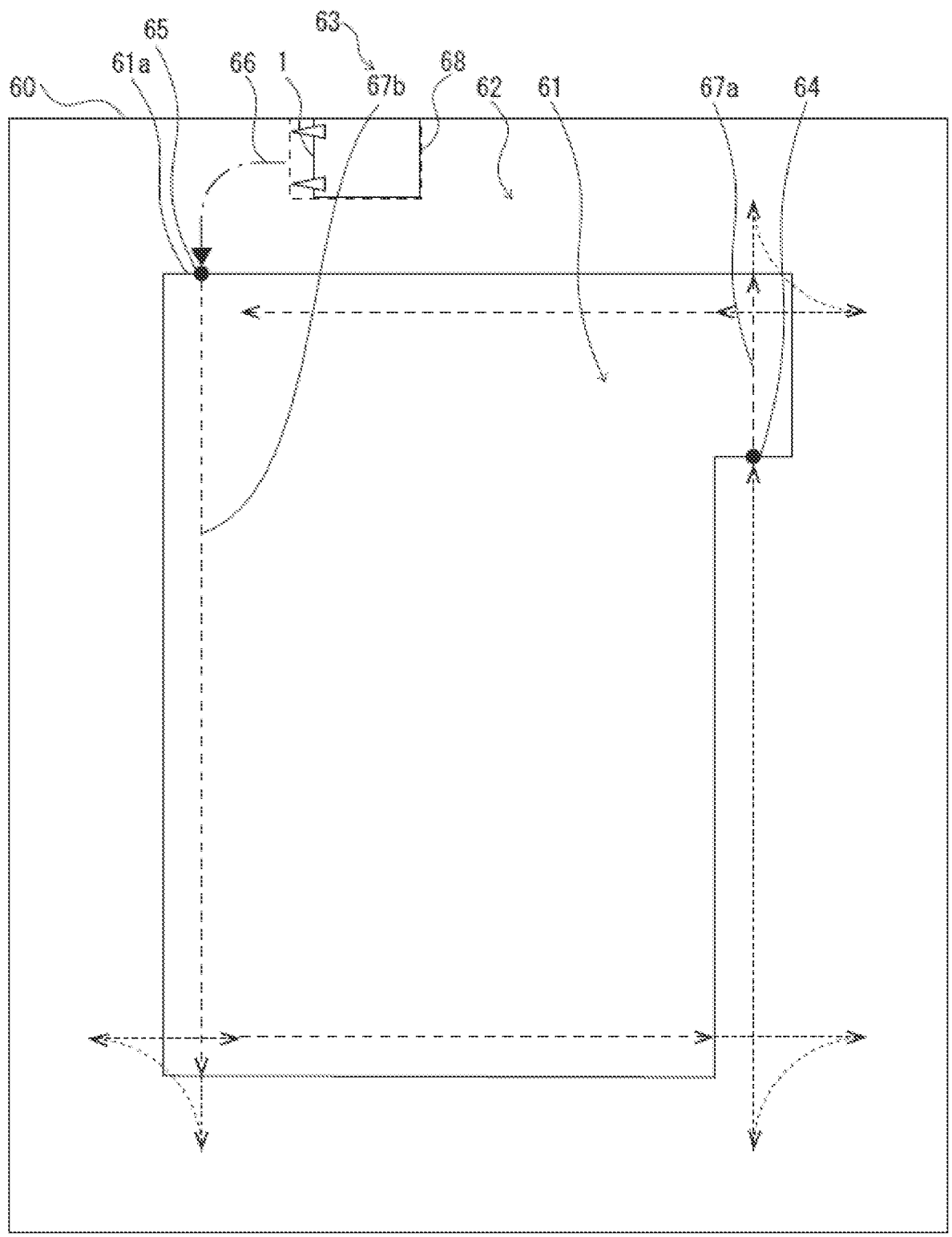
FIG. 16 is a plan view illustrating the twelfth example of return traveling in the combine according to the first embodiment of the present invention.

For example, in the twelfth example, as depicted in FIGS. 15 and 16, the discharge position 68 (midway work position) is set across the unworked area 61 in front of the combine 1 at the breakaway position 64, and a position of the combine 1 itself breaking away from the work route 63 (for example, discharge position 68) is away from the breakaway route 67a. In this case, as in the eleventh example, the relocation route creation part 52 creates the discharge route 69 (relocation route) such that the combine 1 performs discharge traveling (relocation traveling) from the breakaway position 64 to the discharge position 68 with keeping off the unworked area 61, as depicted in FIG. For example, in order to keep off the remaining unworked area 61 on the breakaway route 67a, the relocation route creation part 52 creates the discharge route 69 so as to move backward from the breakaway position 64 along the breakaway route 67a, then turn diagonally forward and move to a side of the remaining unworked area 61, and further go around the remaining unworked area 61 and advance to the discharge position 68.

As depicted in FIG. 16, the return route creation part 53 detects, from the unworked area 61, a corner part of the unworked area 61 closest to a position of the combine 1 itself at creation operation (discharge position 68), i.e., the entry corner part 61a that can be entered by advancing from the discharge position 68. Then, given that the combine 1 enters the unworked area 61 from the entry corner part 61a and resume automatic traveling from the work route 63 located at the entry corner part 61a, the return route creation part 53 sets the return position 65 at the entry corner part 61a and creates the return route 66 that travels to the return position 65 at the entry corner part 61a. For example, the return route creation part 53 creates the return route 66 so as to advance toward the entry corner part 61a side and then turn so that the traveling direction is toward the entry corner part 61a, and further advance a predetermined distance up to the entry corner part 61a.

Additionally, in the twelfth example mentioned above, the work route creation part 51 creates as the next route 67b for the remaining unworked area 61, the straight route 67 having the entry corner part 61a as a starting end, and recreates the work route 63 of revolving reaping to repeat a revolution connecting a plurality of the straight routes 67 including this next route 67b with shifting toward the center, as depicted in FIG. 16. At that time, the work route creation part 51 recreates, for the breakaway route 67a, the work route 63 so as to perform relocation traveling to the breakaway position 64 and then perform automatic traveling from the breakaway position 64. In FIG. 15, the straight routes 67 of the work route 63 originally created are illustrated, and in FIG. 16, the straight routes 67 of the work route 63 then recreated are illustrated. Additionally, when a distance from a starting end of the breakaway route 67a to the breakaway position 64 is a predetermined spacing threshold or more, in order to resume automatic traveling of the breakaway route 67a from the breakaway position 64 after automatically traveling while performing reaping work to a terminal end of an adjacent straight route created in the unworked area 61 at a position adjacent to the breakaway route 67a, the return route creation part 53 may create a return route for automatic traveling from the terminal end of the adjacent straight route to the breakaway position 64. Additionally, when a distance from a starting end of the breakaway route 67a to the breakaway position 64 is less than a predetermined spacing threshold, the work route 63 may be recreated to perform automatically traveling from the breakaway position 64 after performing relocation traveling to the breakaway position 64 as described above. Additionally, instead of the above case where a distance from a starting end of the breakaway route 67a to the breakaway position 64 is a predetermined spacing threshold or more, when a distance from the breakaway position 64 to a terminal end of the breakaway route 67a is less than a predetermined spacing threshold, a return route for automatic traveling from the terminal end of the adjacent straight route to the breakaway position 64 may be created. Additionally, instead of the above case where a distance from a starting end of the breakaway route 67a to the breakaway position 64 is less than a predetermined spacing threshold, when a distance from the breakaway position 64 to a terminal end of the breakaway route 67a is a predetermined spacing threshold or more, the work route 63 may be recreated to perform automatically traveling from the breakaway position 64 after performing relocation traveling to the breakaway position 64 as described above.

When the discharge position 68 is set across the unworked area 61 in front of the combine 1 at the breakaway position 64, the return route creation part 53 may determine whether to apply any of the eleventh and twelfth examples according to a distance between the breakaway position 64 (breakaway route 67a) and the discharge position 68. For example, the return route creation part 53 may apply the eleventh example when the distance between the breakaway position 64 and the discharge position 68 is less than a predetermined spacing distance and is relatively close, while the twelfth example may be applied when the distance between the breakaway position 64 and the discharge position 68 is a predetermined spacing distance or more and is relatively far.

The return route creation part 53 may also determine whether to apply any of the eleventh and twelfth examples according to whether automatic traveling is manned traveling or unmanned traveling. For example, when the automatic traveling is manned traveling, the return route creation part 53 may apply the twelfth example regardless of the distance between the breakaway position 64 and the discharge position 68. On the other hand, when the automatic traveling is unmanned traveling, in a case where the distance between the breakaway position 64 and the discharge position 68 is less than a predetermined spacing distance and is relatively close, the eleventh example may be applied, while in a case where the distance between the breakaway position 64 and the discharge position 68 is a predetermined spacing distance or more and is relatively far, the twelfth example may be applied.

Thirteenth Example

The twelfth example has described an example in which the return route creation part 53 creates the return route 66 by setting the return position at the entry corner part 61a that can be entered by moving forward from the discharge position 68 when the work route 63 of revolving reaping is created. However, the present invention in not limited to this example.

Figure 17:
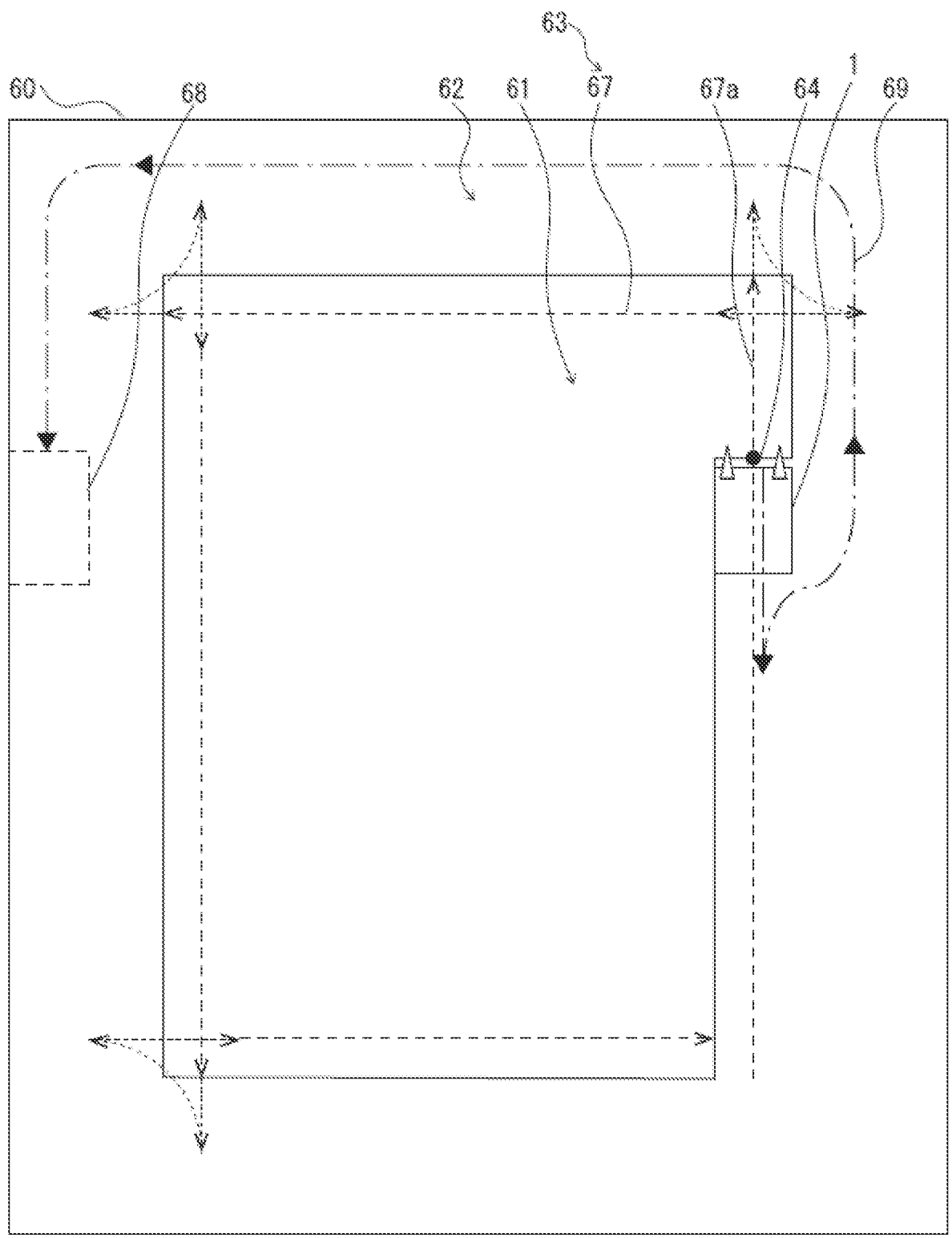
FIG. 17 is a plan view illustrating a thirteenth example of discharge traveling in the combine according to the first embodiment of the present invention.
Figure 18:
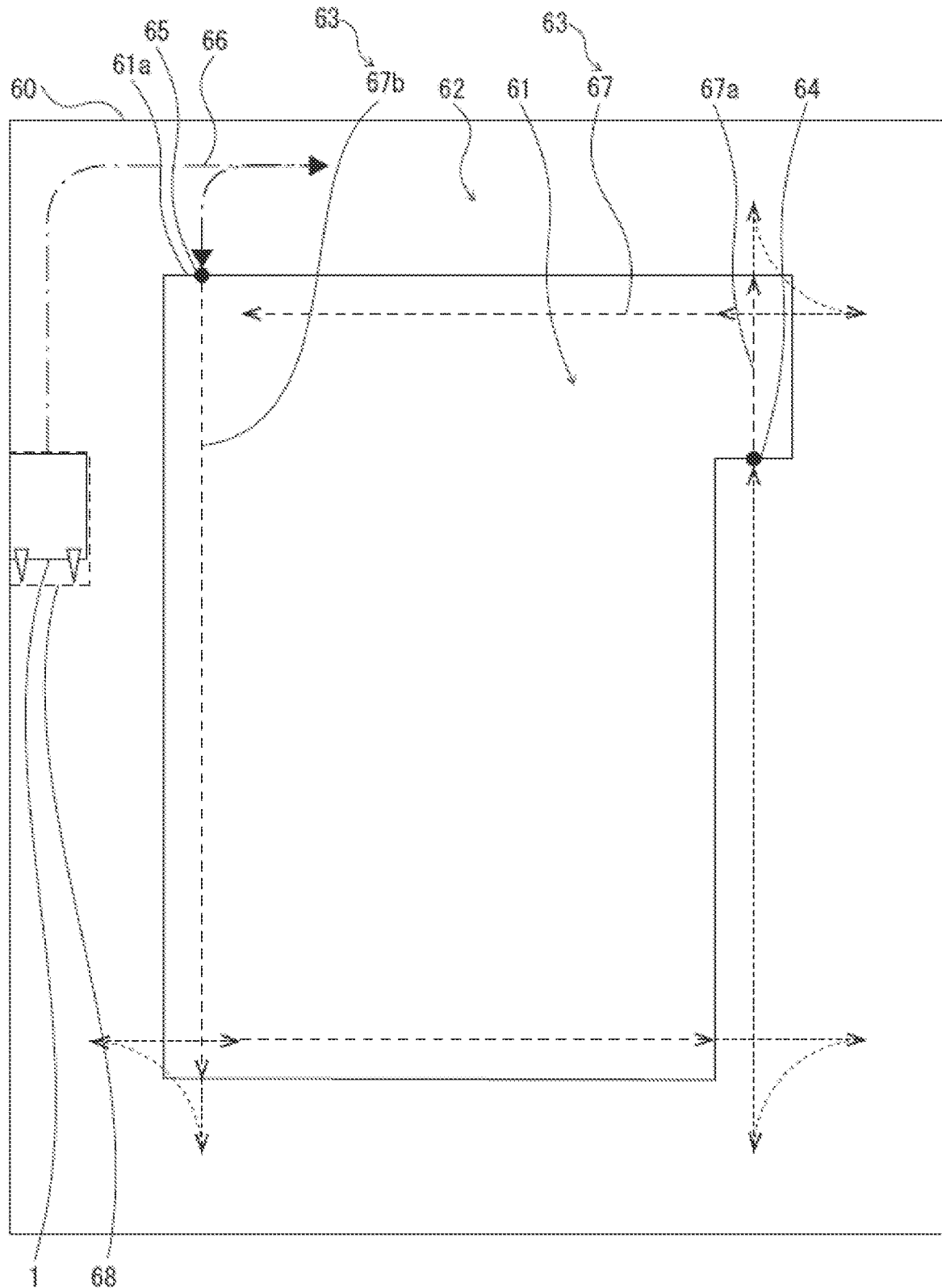
FIG. 18 is a plan view illustrating the thirteenth example of return traveling in the combine according to the first embodiment of the present invention.

For example, in the thirteenth example, as depicted in FIGS. 17 and 18, the discharge position 68 (midway work position) is set across the unworked area 61 on a side of the combine 1 at the breakaway position 64. In this case, as in the eleventh example or twelfth example, the relocation route creation part 52 creates the discharge route 69 (relocation route) such that the combine 1 performs discharge traveling (relocation traveling) from the breakaway position 64 to the discharge position 68 with keeping off the unworked area 61, as depicted in FIG. 17. For example, in order to keep off the remaining unworked area 61 on the breakaway route 67a, the relocation route creation part 52 creates the discharge route 69 so as to move backward from the breakaway position 64 along the breakaway route 67a, then turn diagonally forward and move to a side of the remaining unworked area 61, and further go around the remaining unworked area 61 and advance to the discharge position 68.

As depicted in FIG. 18, the return route creation part 53 detects, from the unworked area 61, the closest entry corner part 61a from a position of the combine 1 itself (discharge position 68), regardless of the traveling direction of the combine 1 at creation operation. Then, given that the combine 1 enters the unworked area 61 from the entry corner part 61a and resume automatic traveling from the work route 63 located at the entry corner part 61a, the return route creation part 53 sets the return position 65 at the entry corner part 61a and creates the return route 66 that travels to the return position 65 at the entry corner part 61a. For example, the return route creation part 53 creates the return route 66 so as to move backward along the outer circumference of the agricultural field 60 from the discharge position 68 to a position where the entry corner part 61a is in front of the combine 1, then turn so that the traveling direction is toward the entry corner part 61a, and further advance a predetermined distance up to the entry corner part 61a.

Additionally, in the thirteenth example mentioned above, as in the twelfth example, the work route creation part 51 creates as the next route 67b for the remaining unworked area 61, the straight route 67 having the entry corner part 61a as a starting end, and recreates the work route 63 of revolving reaping to repeat a revolution connecting a plurality of the straight routes 67 including this next route 67b with shifting toward the center, as depicted in FIG. 18. At that time, the work route creation part 51 recreates, for the breakaway route 67a, the work route 63 so as to perform relocation traveling to the breakaway position 64 and then perform automatic traveling from the breakaway position 64. In FIG. 17, the straight routes 67 of the work route 63 originally created are illustrated, and in FIG. 18, the straight routes 67 of the work route 63 then recreated are illustrated. Additionally, when a distance from a starting end of the breakaway route 67a to the breakaway position 64 is a predetermined spacing threshold or more, in order to resume automatic traveling of the breakaway route 67a from the breakaway position 64 after automatically traveling while performing reaping work to a terminal end of an adjacent straight route created in the unworked area 61 at a position adjacent to the breakaway route 67a, the return route creation part 53 may create a return route for automatic traveling from the terminal end of the adjacent straight route to the breakaway position 64. Additionally, when a distance from a starting end of the breakaway route 67a to the breakaway position 64 is less than a predetermined spacing threshold, the work route 63 may be recreated to perform automatically traveling from the breakaway position 64 after performing relocation traveling to the breakaway position 64 as described above. Additionally, instead of the above case where a distance from a starting end of the breakaway route 67a to the breakaway position 64 is a predetermined spacing threshold or more, when a distance from the breakaway position 64 to a terminal end of the breakaway route 67a is less than a predetermined spacing threshold, a return route for automatic traveling from the terminal end of the adjacent straight route to the breakaway position 64 may be created. Additionally, instead of the above case where a distance from a starting end of the breakaway route 67a to the breakaway position 64 is less than a predetermined spacing threshold, when a distance from the breakaway position 64 to a terminal end of the breakaway route 67a is a predetermined spacing threshold or more, the work route 63 may be recreated to perform automatically traveling from the breakaway position 64 after performing relocation traveling to the breakaway position 64 as described above.

Fourteenth Example

Figure 19:
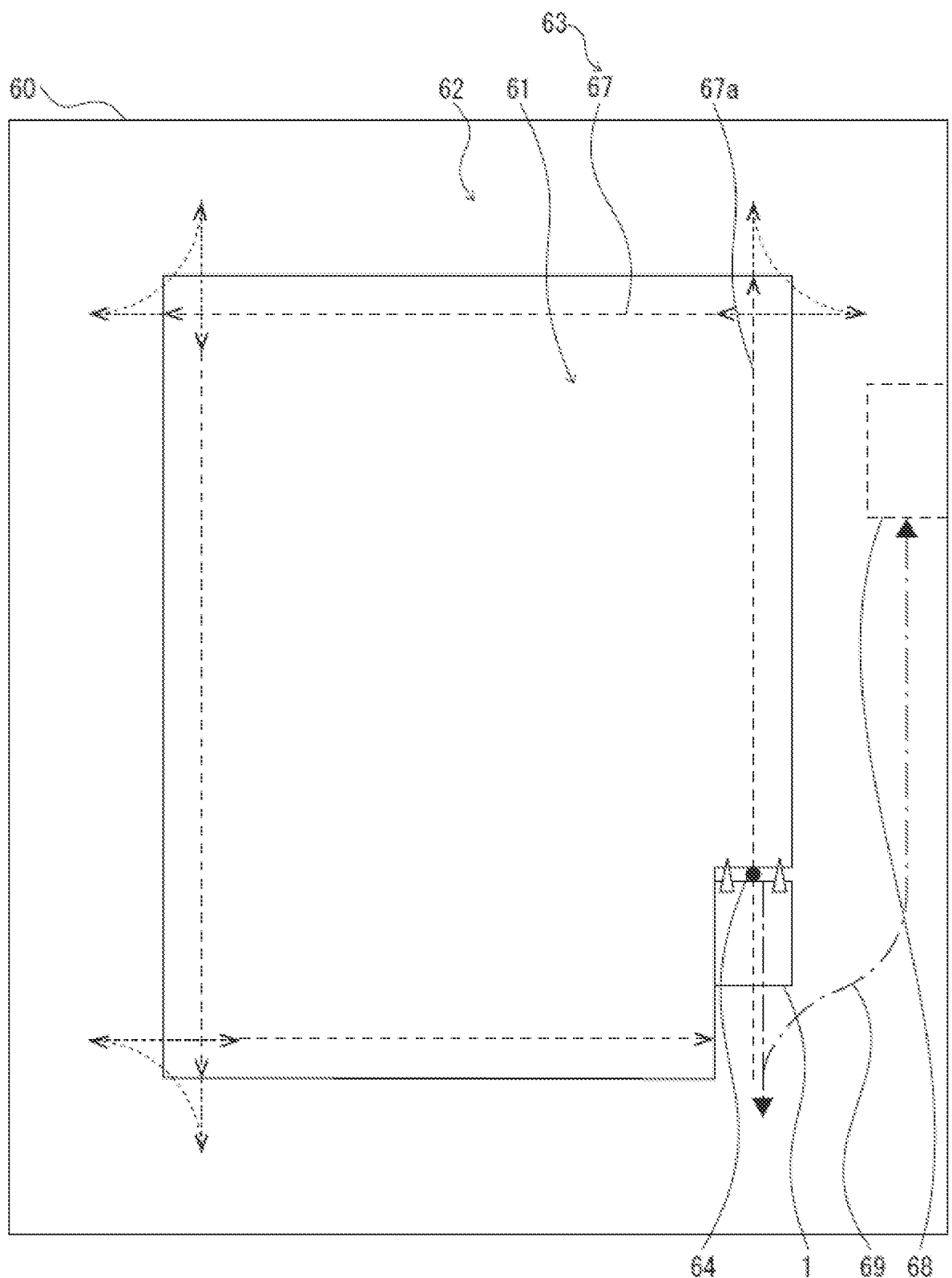
FIG. 19 is a plan view illustrating a fourteenth example of discharge traveling in the combine according to the first embodiment of the present invention.
Figure 20:
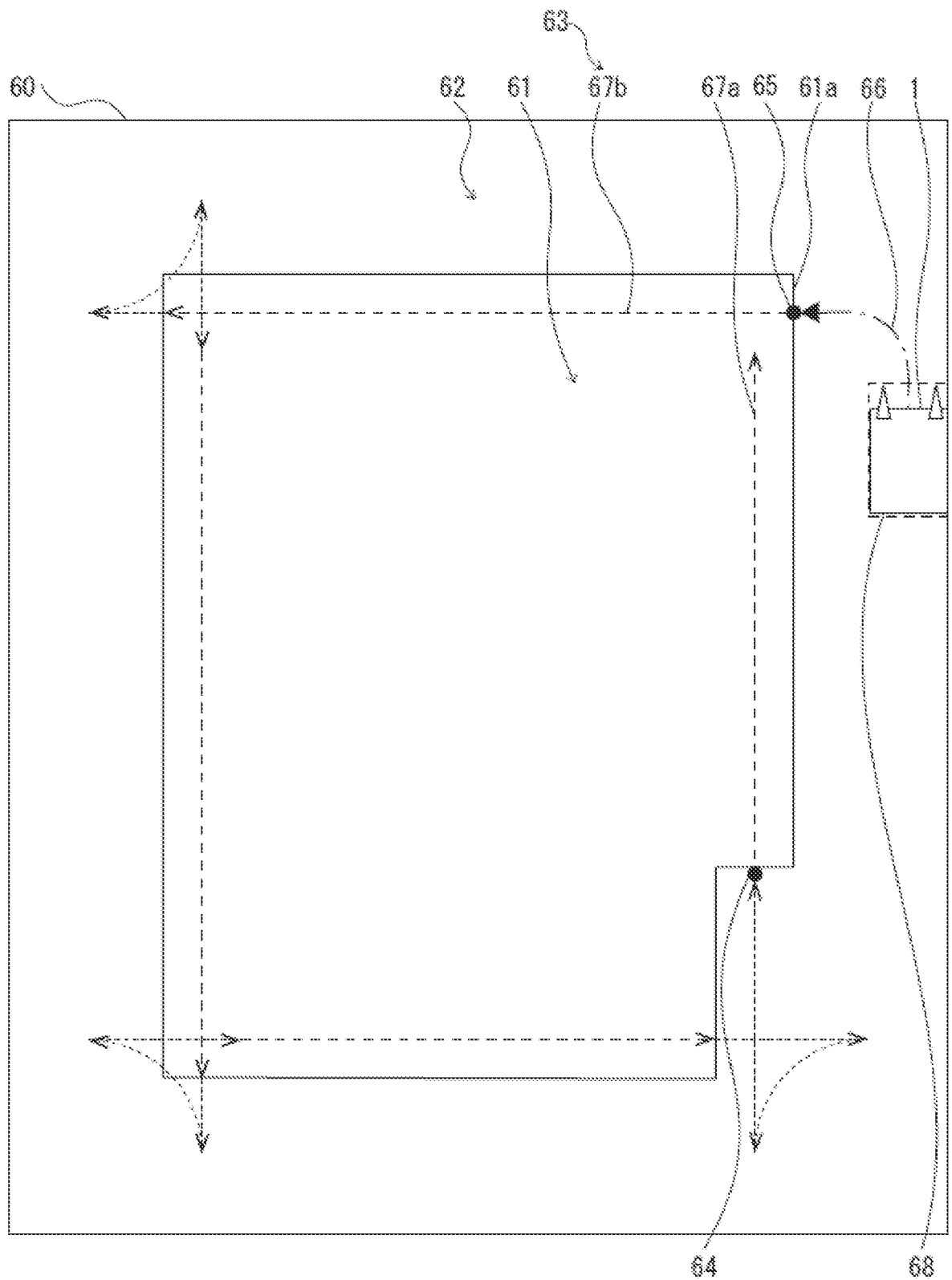
FIG. 20 is a plan view illustrating the fourteenth example of return traveling in the combine according to the first embodiment of the present invention.

In the fourteenth example, for example, as depicted in FIGS. 19 and 20, when the work route 63 of revolving reaping is created, the discharge position 68 (midway work position) is set on a side of the combine 1 at the breakaway position 64 and opposite the unworked area 61. In this case, as in the eleventh example or twelfth example, the relocation route creation part 52 creates the discharge route 69 (relocation route) such that the combine 1 performs discharge traveling (relocation traveling) from the breakaway position 64 to the discharge position 68 with keeping off the unworked area 61, as depicted in FIG. 19. For example, in order to keep off the remaining unworked area 61 on the breakaway route 67a, the relocation route creation part 52 creates the discharge route 69 so as to move backward from the breakaway position 64 along the breakaway route 67a, then turn diagonally forward and move to a side of the remaining unworked area 61, and further advance up to the discharge position 68.

As depicted in FIG. 20, the return route creation part 53 detects, from the unworked area 61, a corner part of the unworked area 61 closest to a position of the combine 1 itself at creation operation (discharge position 68), i.e., the entry corner part 61a that can be entered by advancing from the discharge position 68. Then, given that the combine 1 enters the unworked area 61 from the entry corner part 61a and resume automatic traveling from the work route 63 located at the entry corner part 61a, the return route creation part 53 sets the return position 65 at the entry corner part 61a and creates the return route 66 that travels to the return position 65 at the entry corner part 61a. For example, the return route creation part 53 creates the return route 66 so as to advance toward the entry corner part 61a side and then turn so that the traveling direction is toward the entry corner part 61a, and further advance a predetermined distance up to the entry corner part 61a.

Additionally, in the fourteenth example mentioned above, as in the thirteenth example, the work route creation part 51 creates as the next route 67b for the remaining unworked area 61, the straight route 67 having the entry corner part 61a as a starting end, and recreates the work route 63 of revolving reaping to repeat a revolution connecting a plurality of the straight routes 67 including this next route 67b with shifting toward the center, as depicted in FIG. 20. At that time, the work route creation part 51 recreates, for the breakaway route 67a, the work route 63 so as to perform relocation traveling to the breakaway position 64 and then perform automatic traveling from the breakaway position 64. In FIG. 19, the straight routes 67 of the work route 63 originally created are illustrated, and in FIG. 20, the straight routes 67 of the work route 63 then recreated are illustrated. Additionally, when a distance from a starting end of the breakaway route 67a to the breakaway position 64 is a predetermined spacing threshold or more, in order to resume automatic traveling of the breakaway route 67a from the breakaway position 64 after automatically traveling while performing reaping work to a terminal end of an adjacent straight route created in the unworked area 61 at a position adjacent to the breakaway route 67a, the return route creation part 53 may create a return route for automatic traveling from the terminal end of the adjacent straight route to the breakaway position 64. Additionally, when a distance from a starting end of the breakaway route 67a to the breakaway position 64 is less than a predetermined spacing threshold, the work route 63 may be recreated to perform automatically traveling from the breakaway position 64 after performing relocation traveling to the breakaway position 64 as described above. Additionally, instead of the above case where a distance from a starting end of the breakaway route 67a to the breakaway position 64 is a predetermined spacing threshold or more, when a distance from the breakaway position 64 to a terminal end of the breakaway route 67a is less than a predetermined spacing threshold, a return route for automatic traveling from the terminal end of the adjacent straight route to the breakaway position 64 may be created. Additionally, instead of the above case where a distance from a starting end of the breakaway route 67a to the breakaway position 64 is less than a predetermined spacing threshold, when a distance from the breakaway position 64 to a terminal end of the breakaway route 67a is a predetermined spacing threshold or more, the work route 63 may be recreated to perform automatically traveling from the breakaway position 64 after performing relocation traveling to the breakaway position 64 as described above.

Figure 21:
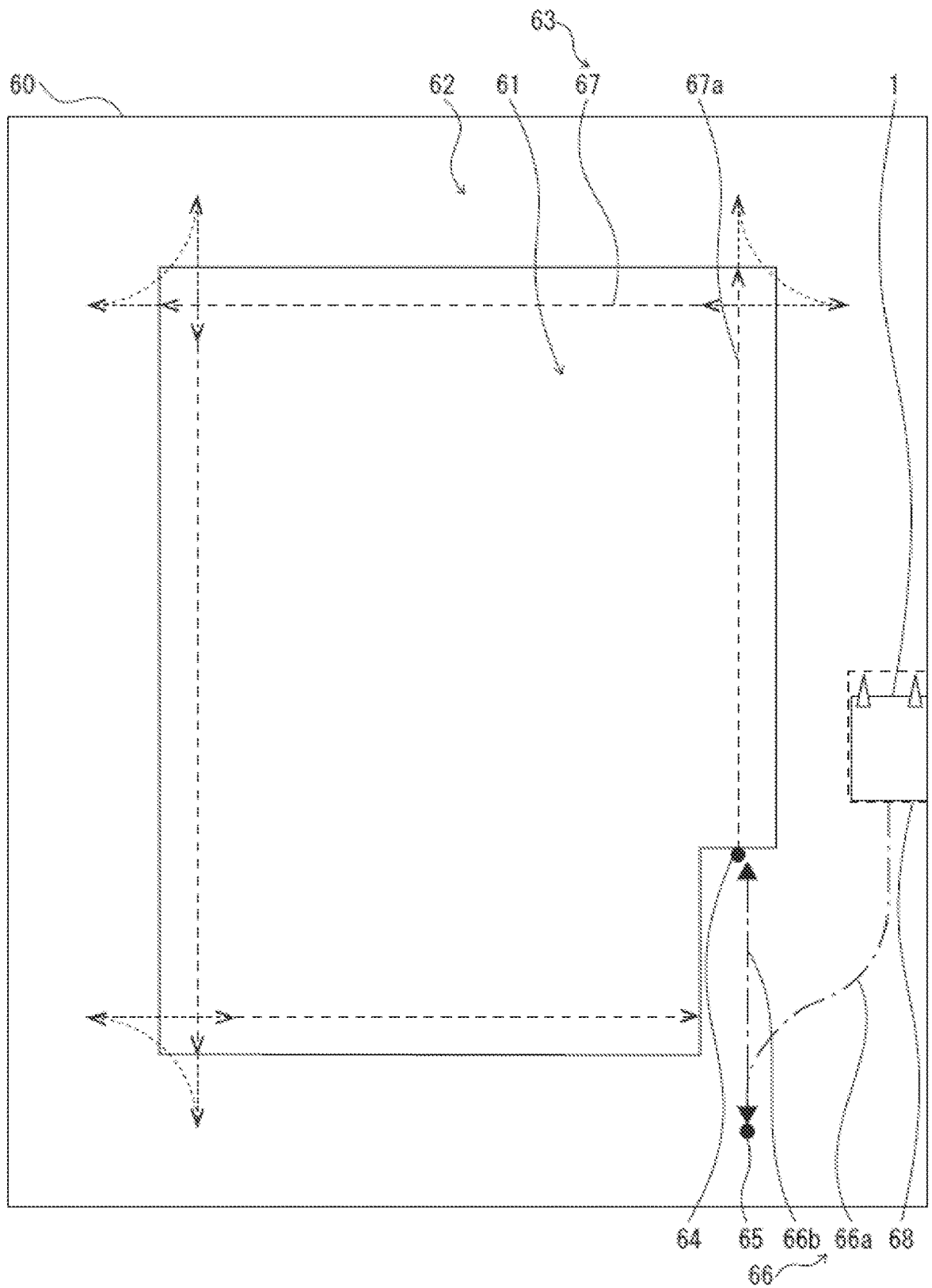
FIG. 21 is a plan view illustrating the fourteenth example of return traveling's another example in the combine according to the first embodiment of the present invention.

The return route creation part 53 may determine whether or not to apply the fourteenth example according to a distance from the discharge position 68 to the closest entry corner part 61a of the unworked area 61 and a distance from the discharge position 68 to the breakaway position 64. For example, as depicted in FIG. 20, when the discharge position 68 is closer to the entry corner part 61a than the breakaway position 64, the return route creation part 53 applies the fourteenth example to create the return route 66 from the discharge position 68 by setting the return position 65 to the entry corner part 61a. On the other hand, as depicted in FIG. 21, when the discharge position 68 is closer to the breakaway position 64 than the entry corner part 61a, the return route creation part 53 may create the return route 66 by setting the return position 65 in midway of the breakaway route 67a or on an extension line of the breakaway route 67a, without applying the fourteenth example. For example, the return route creation part 53 creates the first return route 66a so as to move backward from the discharge position 68 to move to a side of the remaining unworked area 61, then turn diagonally backward to move to the return position 65 on the breakaway route 67a. Furthermore, the return route creation part 53 acquires the second return route 66b that is from the return position 65, which is in midway of the breakaway route 67a or on an extension line of the breakaway route 67a, to the breakaway position 64. Then, the return route creation part 53 creates the return route 66 having the first return route 66a and the second return route 66b.

Fifteenth Example

Figure 22:
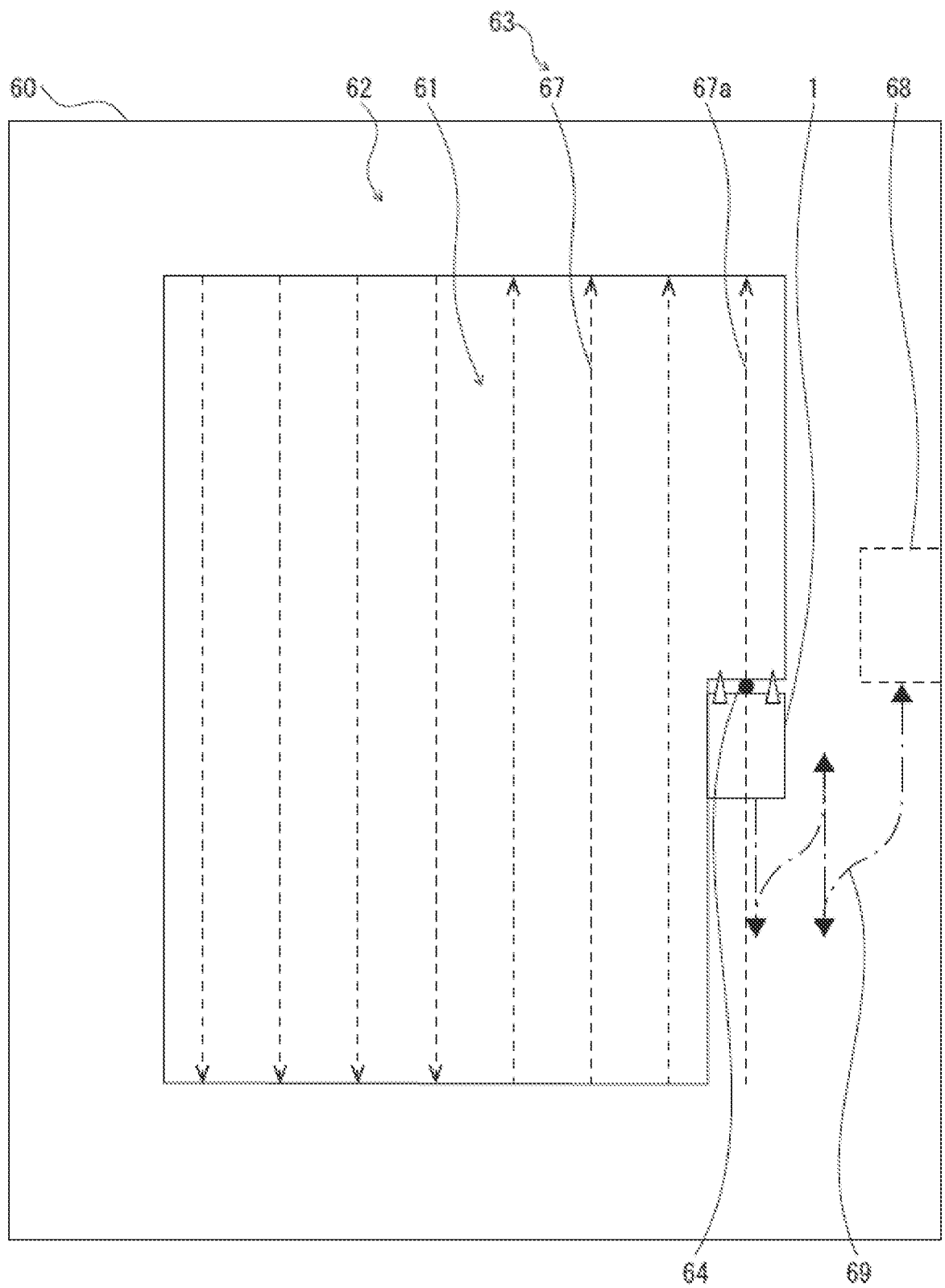
FIG. 22 is a plan view illustrating a fifteenth example of discharge traveling in the combine according to the first embodiment of the present invention.
Figure 23:
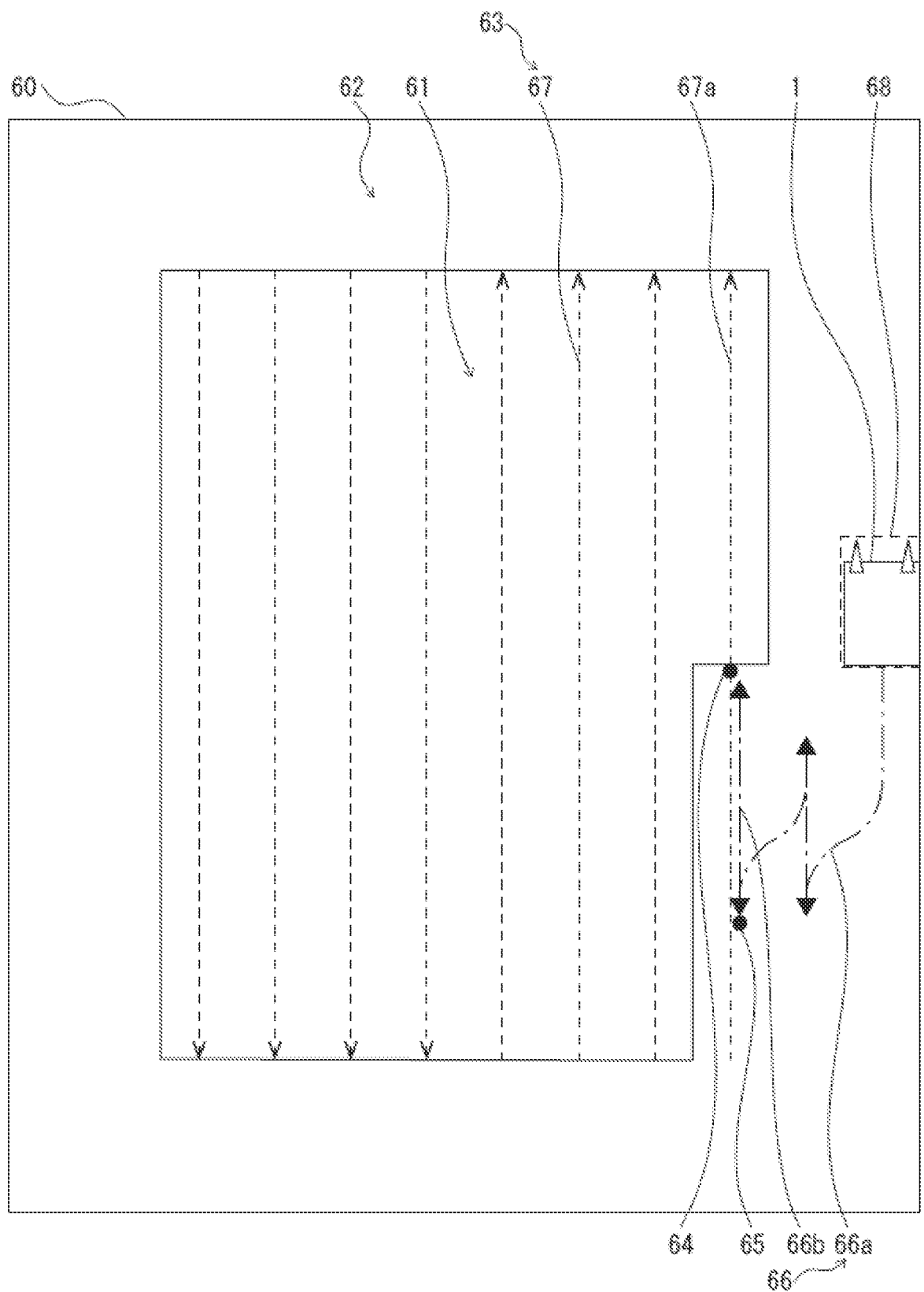
FIG. 23 is a plan view illustrating the fifteenth example of return traveling in the combine according to the first embodiment of the present invention.

In the fifteenth example, as depicted in FIGS. 22 and 23, when the work route 63 of shuttle reaping is created, the discharge position 68 is set on a side of the combine 1 at the breakaway position 64 and opposite the unworked area 61. At that time, when the distance between the breakaway position 64 and the discharge position 68 is a predetermined spacing distance or more and is relatively far, the relocation route creation part 52, as in the example in FIG. 19, creates the discharge route 69 so as to move backward from the breakaway position 64 along the breakaway route 67a, then turn diagonally forward and move to a side of the remaining unworked area 61, and further advance up to the discharge position 68. On the other hand, when the distance between the breakaway position 64 and the discharge position 68 is less than a predetermined spacing distance and is relatively close, the relocation route creation part 52 may, as depicted in FIG. 22, create the discharge route 69 so as to repeat backward traveling and diagonally forward turning traveling multiple times (e.g., twice) to move to the discharge position 68 side, and then advance up to the discharge position 68.

When the distance between the breakaway position 64 and the discharge position 68 is a predetermined spacing distance or more and is relatively far, the return route creation part 53 may, as in the example in FIG. 21, set the return position 65 in midway of the breakaway route 67a or on an extension line of the breakaway route 67a, and create the first return route 66a so as to move backward from the discharge position 68 to move to a side of the remaining unworked area 61, then turn diagonally backward to move to the return position 65 on the breakaway route 67a. On the other hand, when the distance between the breakaway position 64 and the discharge position 68 is less than a predetermined spacing distance and is relatively close, the return route creation part 53, as depicted in FIG. 23, set the return position 65 in midway of the breakaway route 67a or on an extension line of the breakaway route 67a, and create the first return route 66a so as to move backward from the discharge position 68, and then repeat diagonally backward turning traveling and forward traveling multiple times (e.g., twice) to move to the return position 65 on the breakaway route 67a. Furthermore, the return route creation part 53 acquires the second return route 66b from the return position 65 in midway of the breakaway route 67a to the breakaway position 64. Then, the return route creation part 53 creates the return route 66 having the first return route 66a and the second return route 66b.

The relocation route creation part 52 and the return route creation part 53 may apply the fifteenth example not only when the distance between the breakaway position 64 and the discharge position 68 is close, but also when the length of the worked area 62 on the breakaway route 67a is less than a predetermined reaping distance and is relatively short (in other words, when the length of the remaining unworked area 61 on the breakaway route 67a is a predetermined unreaped distance or more and is relatively long).

In the fifteenth example, as depicted in FIGS. 22 and 23, an example is shown in which the work route 63 of shuttle reaping is created. As another example of the fifteenth example, even when the work route 63 of revolving reaping is created, similarly, the relocation route creation part 52 may create the discharge route 69 that repeats backward traveling and diagonally forward turning traveling multiple times, and the return route creation part 53 may create the first return route 66a that repeats diagonally backward turning traveling and forward traveling multiple times.

Sixteenth Example

The seventh and eighth examples have described examples in which when the work route 63 of shuttle reaping is created, and in a case where the combine 1 breaks away from the work route 63 at the breakaway position 64 in midway of the breakaway route 67a, the return route creation part 53 sets the return position 65 at a starting end of the next route 67b connected next to the breakaway route 67a, and creates the return route 66 from a position of the combine 1 itself at creation operation (discharge position 68) to the return position 65. However, the present invention in not limited to these examples.

Figure 24:
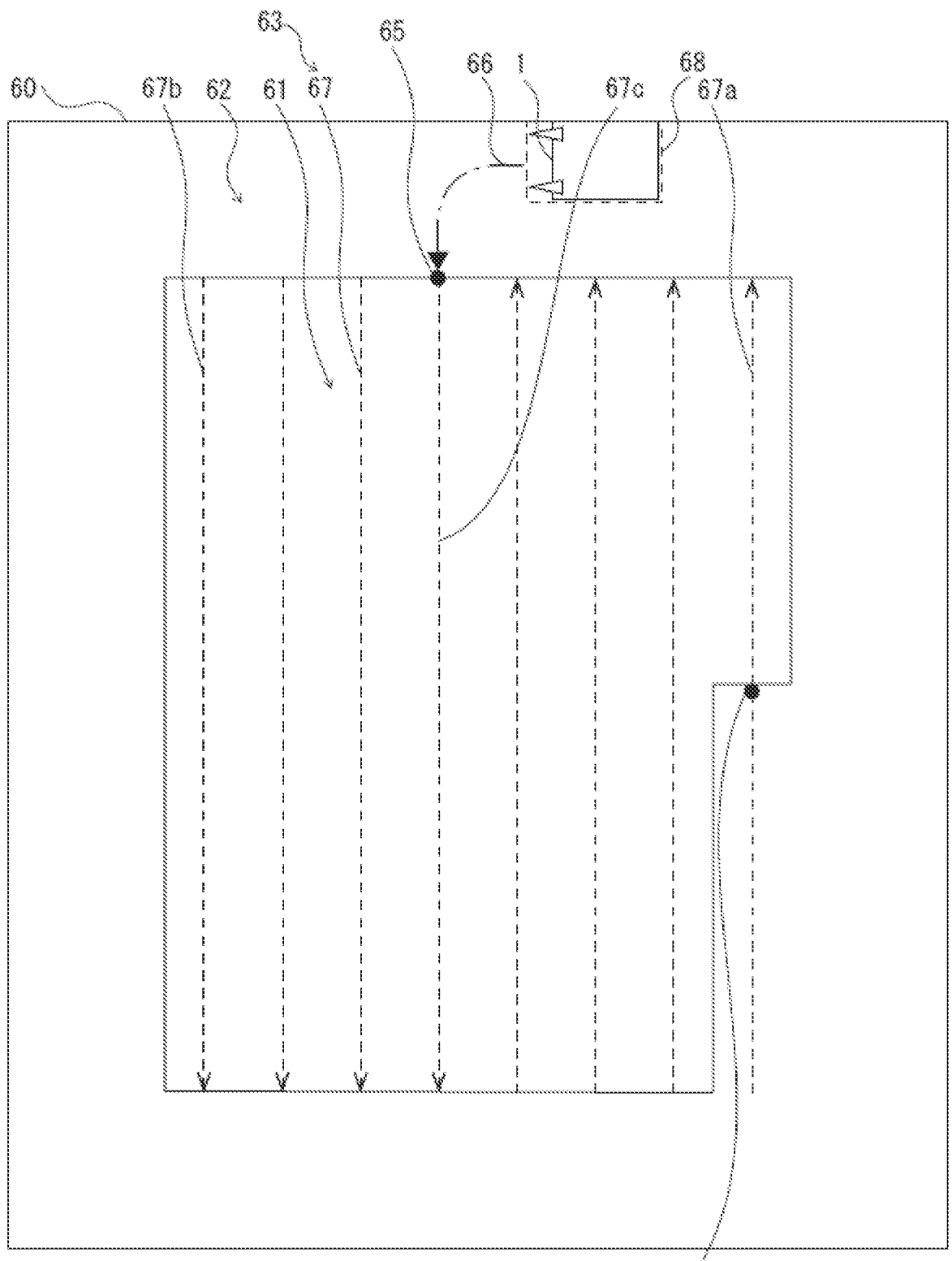
FIG. 24 is a plan view illustrating a sixteenth example of return traveling in the combine according to the first embodiment of the present invention.

In the sixteenth example, an unworked width of the unworked area 61 in an orthogonal direction to the work route 63 is a predetermined width threshold or more and is relatively long. At that time, when the distance between the discharge position 68 and the next route 67b is less than a predetermined spacing distance and is relatively close, the return route creation part 53 applies the seventh and eighth examples to create the return route 66 by setting the return position 65 at a starting end of the next route 67b. On the other hand, when the distance between the discharge position 68 and a starting end of the next route 67b is a predetermined spacing distance or more and is relatively far, the return route creation part 53 creates, as depicted in FIG. 24, the return route 66 by setting the return position 65 at a starting end of the straight route 67 corresponding to a middle division within the work route 63 to create the middle division for the unworked area 61.

Seventeenth Example

Figure 25:
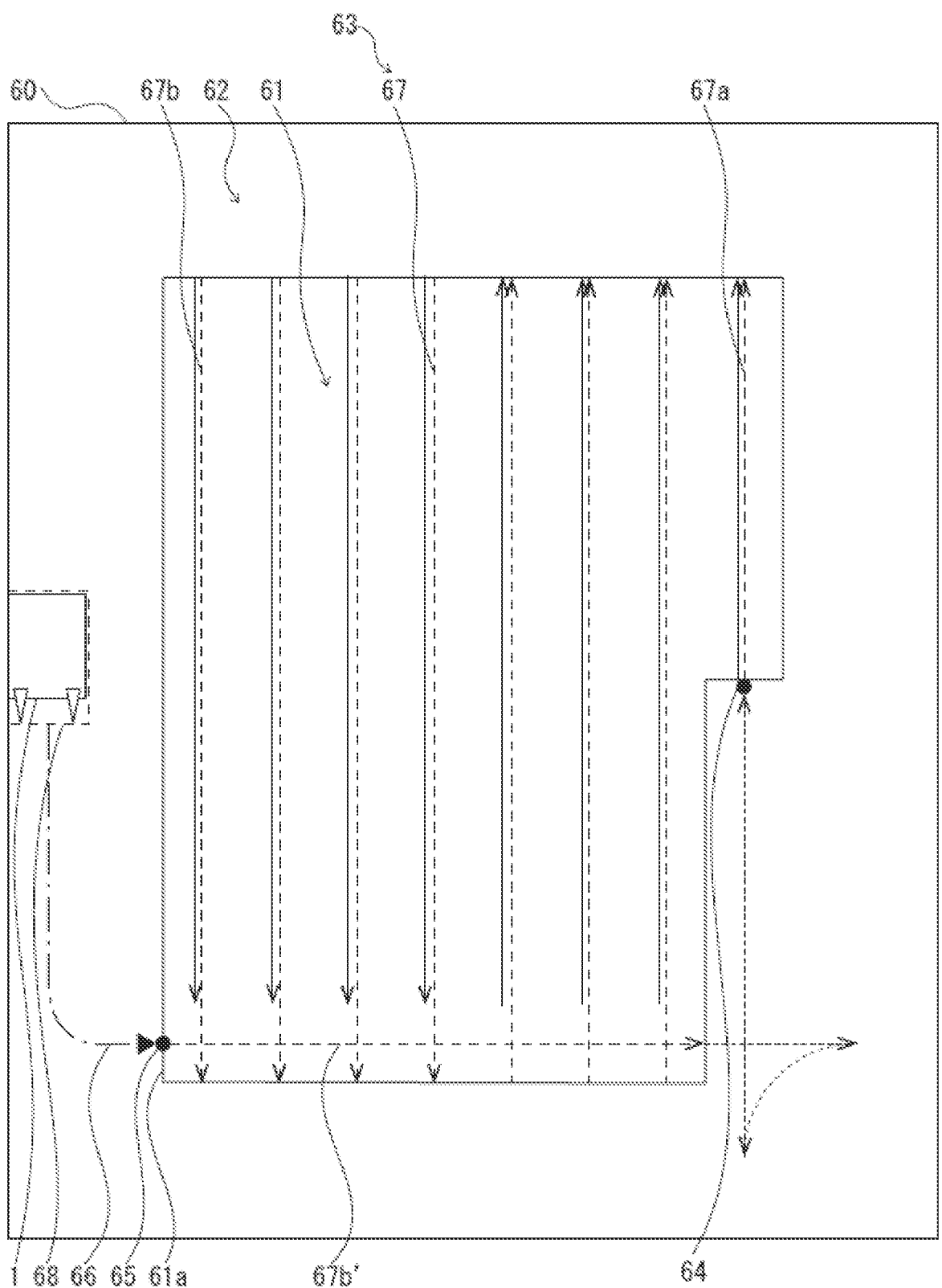
FIG. 25 is a plan view illustrating a seventeenth example of return traveling in the combine according to the first embodiment of the present invention.

In the fourth example described above, when the work route 63 of shuttle reaping is created, the combine 1 breaking away from the work route 63 at the breakaway position 64 at a terminal end of the breakaway route 67a is located in a direction perpendicular to the next route 67b for the unworked area 61, whereas in the seventeenth example, as depicted in FIG. 25, the combine 1 breaking away from the work route 63 at the breakaway position 64 in midway of the breakaway route 67a is located at the discharge position 68 in a direction perpendicular to the next route 67b for the unworked area 61. In the seventeenth example, as in the fourth example, given that the combine 1 defines a corner part of the unworked area 61 closest to the discharge position 68 as an entry corner part 61a, and enters the unworked area 61 from the entry corner part 61a in a direction perpendicular to the next route 67b and resumes automatic traveling from the work route 63 located at the entry corner part 61a, the return route creation part 53 sets the return position 65 at this entry corner part 61a and creates the return route 66 to travel to the return position 65 at the entry corner part 61a such that the combine 1 faces the entry corner part 61a in a direction perpendicular to the next route 67b.

Additionally, in the seventeenth example, as in the fourth example, the work route creation part 51 recreates the work route 63 so as to include as the next route 67b', the straight route 67 to travel from the entry corner part 61a of the unworked area 61 in a direction perpendicular to the next route 67b. The work route creation part 51 modifies to shorten the straight routes 67 of residue including the breakaway route 67a by a working width of the combine 1 on a side of the entry corner part 61a, and also recreates the work route 63 so as to perform shuttle reaping to shuttle on the straight routes 67 of residue. At that time, for the breakaway route 67a, the work route creation part 51 and the return route creation part 53 recreate the work route 63 and create the return route 66 according to the distance from a starting end of the breakaway route 67a to the breakaway position 64 or the distance from the breakaway position 64 to a terminal end of the breakaway route 67a, as in the examples in FIGS. 7 and 8. In FIG. 25, the work route 63 and the return route 66 are illustrated, which apply the example of FIG. 8. In FIG. 25, the straight routes 67 of the work route 63 originally created are represented by dashed lines, and the straight routes 67 of the work route 63 then recreated are represented by solid lines.

Figure 26:
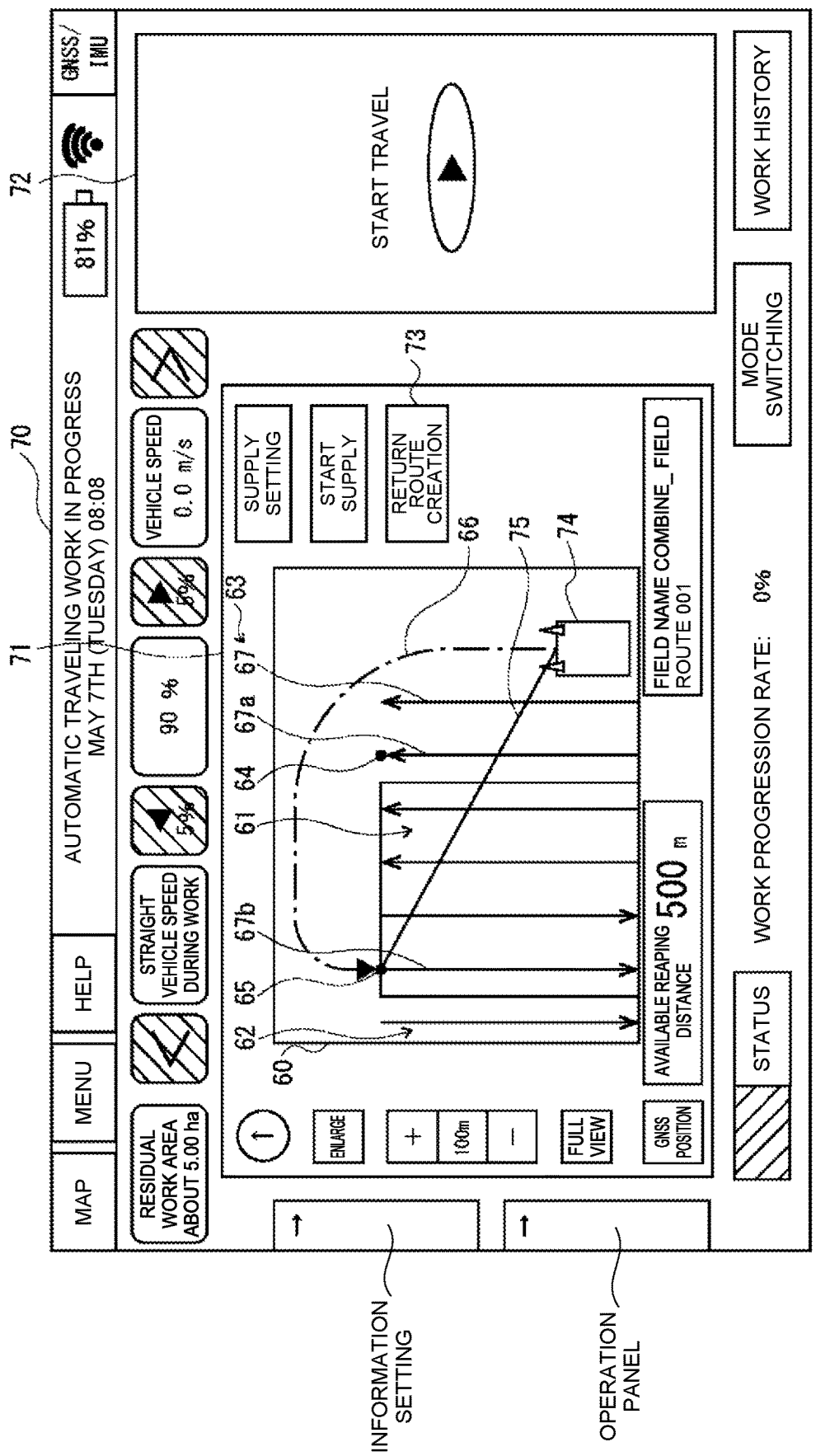
FIG. 26 is a plan view illustrating an exemplary work screen displayed on a mobile terminal in the combine according to the first embodiment of the present invention.

The display control part 54 performs control so as to display on the display part 44, a work screen 70 for automatic traveling, return traveling, or another action of the agricultural field 60, which is a work subject, as depicted in FIG. 26. The display control part 54 displays at least a map field 71, a traveling start button 72, and a return route creation button 73 on the work screen 70.

The display control part 54 displays, in the map field 71, an outer shape of the agricultural field 60 on a map based on agricultural field information of the agricultural field 60 selected by the agricultural field selection part 50, and further displays an indication 74 of the combine 1 itself at a position of the combine 1 itself positioned by the positioning unit 28 in the combine 1. The display control part 54 may discriminably display the unworked area 61 and the worked area 62 in the range of the agricultural field 60, by varying a display method such as a line type, a line color, or a background color. In the map field 71, the display control part 54 superimposes and displays the work route 63 created in the work route creation part 51, with the agricultural field 60. The display control part 54 updates a position of the indication 74 of the combine 1 itself corresponding to traveling of the combine 1, and updates ranges of the unworked area 61 and the worked area 62 corresponding to progress in reaping work by the combine 1.

When a start condition of automatic traveling is satisfied, the display control part 54 makes the traveling start button 72 capable of selection operation, in order to start automatic traveling. By contrast, when the start condition is not satisfied, the display control part 54 makes the traveling start button 72 incapable of selection operation. Once the traveling start button 72 receives selection operation, the display control part 54 sends an instruction for starting automatic traveling as well as agricultural field information, information on the work route 63, and the like to the combine 1. The combine 1 starts automatic traveling along the work route 63 in response to the instruction for start.

While the combine 1 performs automatic traveling, the display control part 54 displays a traveling stop button (not depicted) so as to be capable of selection operation, in order to stop automatic traveling, instead of the traveling start button 72. Once the traveling stop button receives selection operation, the display control part 54 sends a stop instruction to the combine 1. In response to the stop instruction, the combine 1 stops automatic traveling. Then, once the combine 1 stops automatic traveling, the display control part 54 displays the traveling start button 72 instead of a traveling stop button. When the combine 1 stops automatic traveling and breaks away from the work route 63, the display control part 54 may display the breakaway position 64 on the work route 63 in the map field 71.

Furthermore, when a start condition of return traveling is satisfied, the display control part 54 makes the return route creation button 73 capable of selection operation, in order to create the return route 66. By contrast, when the start condition is not satisfied, the display control part 54 makes the return route creation button 73 incapable of selection operation. The display control part 54 determines that a start condition of return traveling is not satisfied, e.g., when the combine 1 is outside the agricultural field 60, when a distance between a position of the combine 1 itself and the return position 65 is less than a predetermined spacing threshold, and when a distance between a position of the combine 1 itself and the breakaway position 64 is less than a predetermined spacing threshold.

In addition, the display control part 54 may display and notify an unsatisfied start condition of return traveling on the work screen 70 or another screen. When a distance between a position of the combine 1 itself and the return position 65 is less than a predetermined spacing threshold, or when a distance between a position of the combine 1 itself and the breakaway position 64 is less than a predetermined spacing threshold, the work screen 70 or another screen may display and notify that automatic traveling can be resumed along the work route 63 from a position of the combine 1 itself without return traveling.

Alternatively, the display control part 54 may continuously display the return route creation button 73 so as to be capable of selection operation, and if a start condition of return traveling is unsatisfied, the display control part 54 may reject selection operation and then display and notify an unsatisfied start condition of return traveling on the work screen 70 or another screen.

Every time the return route creation button 73 receives selection operation, the display control part 54 preferably accepts it as creation operation of the return route 66, and directs the return route creation part 53 to create the return route 66. Alternatively, every time the return route creation button 73 receives selection operation, the display control part 54 may switch on or off of a state of selection operation; when a state of selection operation is on, the display control part 54 may direct continuously (e.g., at a predetermined time interval) the return route creation part 53 to create the return route 66.

The first embodiment has described an example that selection operation of the return route creation button 73 is a trigger for creation of the return route 66, but the present invention is not limited to this example. For example, completion of discharging work of harvested grain, completion of supplying work of materials or fuel, or another event may be a trigger for creation of the return route 66.

Moreover, when the return route creation part 53 sets the return position 65 as well as creates the return route 66, the display control part 54 displays the return position 65 and the return route 66 that are superimposed on the agricultural field 60, and also displays a direction line 75 connecting the return position 65 to the indication 74 of the vehicle by a straight line, in the map field 71.

When a start condition of return traveling is satisfied and the return route 66 is created, the display control part 54 displays the traveling start button 72 so as to capable of selection operation, in order to start return traveling. By contrast, when the start condition is not satisfied or the return route 66 is not created, the display control part 54 makes the traveling start button 72 incapable of selection operation. Once the traveling start button 72 receives selection operation, the display control part 54 accepts it as return operation and sends a start instruction of return traveling and information on the return route 66 to the combine 1. The combine 1 starts return traveling along the return route 66 corresponding to the start instruction. The display control part 54 preferably displays and notifies on the work screen 70 or another screen that the combine 1 starts return traveling, performs return traveling, or completes return traveling, and the terminal control device 41 may also provide notification by a voice or another way.

The first embodiment has described an example that selection operation of the traveling start button 72 is a trigger for start of the return traveling, but the present invention is not limited to this example. For example, completion of discharging work of harvested grain, completion of supplying work of materials or fuel, or another event may be a trigger for start of return traveling, or creation of the return route 66 may be a trigger for start of return traveling.

As described so far, according to the embodiment, the combine 1 is a working vehicle that performs automatic traveling on a work route 63 preset in the agricultural field 60, and includes the control device 30. The control device 30 functions as a return traveling control part 37 to make the combine 1 automatically perform return traveling toward the work route 63 in response to a return operation for the combine 1 within the agricultural field 60 during breakaway of the combine 1 from the work route 63.

In other words, in the present invention, disclosed is an automatic traveling method of a working vehicle, such as the combine 1, that performs automatic traveling of the work route 63 preset in the agricultural field 60, wherein the method includes a return traveling step to make the combine 1 automatically perform return traveling toward the work route 63, in response to a return operation for the combine 1 within the agricultural field 60, when the combine 1 breaks away from the work route 63.

Accordingly, return traveling is performed from a position of the combine 1 itself at return operation regardless of a position of the combine 1 breaking away from the work route 63, thus allowing return traveling even when the combine 1 is apart from a midway work position such as a discharge position, eliminating needs of relocation of the combine 1 to a midway work position, and thereby providing improved workability.

According to the embodiment, the combine 1 includes the mobile terminal 40, and the mobile terminal 40 includes the terminal control device 41. The terminal control device 41 functions as the return route creation part 53 that creates the return route 66 to the work route 63 based on a position of the combine 1 itself, in response to a creation operation for the combine 1. The return traveling control part 37 makes the combine 1 automatically perform return traveling based on the return route 66.

Accordingly, the return route 66 is created from a position of the combine 1 itself at return operation regardless of a position of the combine 1 breaking away from the work route 63, thus allowing return traveling based on the return route 66 even when the combine 1 is apart from a midway work position such as a discharge position, eliminating needs of relocation of the combine 1 to a midway work position, and thereby providing improved workability.

According to the embodiment, the return traveling control part 37 makes the combine 1 automatically perform return traveling toward the work route 63, when a distance between the return position 65 disposed at an end of the straight route 67 included in the work route 63, and a position of the combine 1 itself at return operation is a predetermined spacing threshold or more.

Accordingly, when automatic driving is not required, such as when a position of the combine 1 itself is close to the return position 65, unnecessary return traveling is not to be performed, thus providing improved workability.

According to the embodiment, the return traveling control part 37 makes the combine 1 automatically perform return traveling toward the breakaway position 64, when a distance between the breakaway position 64 of the combine 1 at breakaway in midway of the straight route 67 included in the work route 63, and a position of the combine 1 itself at return operation is a predetermined spacing threshold or more.

Accordingly, when automatic driving is not required, such as when a position of the combine 1 itself is close to the breakaway position 64, unnecessary return traveling is not to be performed, thus providing improved workability.

According to the embodiment, when the combine 1 is a working vehicle that is restricted from traveling without work in the unworked area 61 within the agricultural field 60 and the combine 1 breaks away at the breakaway position 64 in midway of the straight route 67 included in the work route 63, the return route creation part 53 creates the return route 66 having the first return route 66a to travel to a starting end of the straight route 67, and the second return route 66b to travel from a starting end to the breakaway position 64 on the straight route 67.

Accordingly, the work route 63 previously created can be used for the second return route 66b to create the return route 66, thus enabling smooth return traveling.

According to the embodiment, the terminal control device 41 functions as the work route creation part 51 that creates the work route 63 including one or more straight routes 67, and the control device 30 functions as the automatic traveling control part 35 that makes the combine 1 perform automatic traveling along the work route 63. When the straight route 67 predetermined is defined as the breakaway route 67a and the combine 1 breaks away at a terminal end of this breakaway route 67a, and when the straight route 67 next to the breakaway route 67a is defined as the next route 67b and the combine 1 is apart in a direction perpendicular to this next route 67b, the return route creation part 53 defines as the entry corner part 61a, a corner part of the unworked area 61 in the agricultural field 60 closest to a position of the combine 1 itself, and creates the return route 66 to travel to the entry corner part 61a so as to face the entry corner part 61a in a perpendicular direction. When the return route creation part 53 creates the return route 66 to face the entry corner part 61a in a perpendicular direction, the work route creation part 51 recreates the work route 63 so as to include the straight route 67 to travel in a perpendicular direction from the entry corner part 61a.

Accordingly, even when a position of the combine 1 itself is away from the next route 67b, return traveling can be performed to smoothly return to the work route 63, and correspondingly, automatic traveling of the unworked area 61 can be smoothly resumed.

According to the embodiment, when the straight route 67 predetermined is defined as the breakaway route 67a among one or more of the straight routes 67 included in the work route 63 and the combine 1 breaks away at the breakaway position 64 predetermined in midway of the breakaway route 67a, the return route creation part 53 creates the return route 66 to travel to a starting end of the next route 67b, which is the straight route 67 next to the breakaway route 67a, or of the straight route 67 adjacent to the breakaway route 67a.

Accordingly, even when the combine 1 breaks away in midway of the breakaway route 67a, return traveling can be performed to smoothly return to the work route 63, and correspondingly, automatic traveling of the unworked area 61 can be smoothly resumed, thus providing improved workability.

According to the embodiment, when the straight route 67 predetermined is defined as the breakaway route 67a among one or more of the straight routes 67 included in the work route 63 and the combine 1 breaks away at the breakaway position 64 predetermined in midway of the breakaway route 67a, the return traveling control part 37 makes the combine 1 perform return traveling to a starting end of the straight route 67 adjacent to the breakaway route 67a, further allows the combine 1 to perform traveling and work up to a terminal end of the straight route 67 adjacent to the breakaway route 67a, and then makes the combine 1 perform return traveling to the breakaway position 64.

Accordingly, even when the combine 1 breaks away in midway of the breakaway route 67a, return traveling can be performed to smoothly return to the work route 63, and correspondingly, automatic traveling of the unworked area 61 can be smoothly resumed, thus providing improved workability.

The first embodiment mentioned above has described an example of the combine 1 configured of a head-feeding combine, but the present invention is not limited to this example. The combine 1 may be configured of a normal combine.

The first embodiment mentioned above has also described an example that the working vehicle is configured of the combine 1, but the present invention is not limited to this example. For example, the working vehicle in the first embodiment should only be a vehicle that is restricted from traveling without work in the unworked area 61 within the agricultural field 60, and be a vehicle that is allowed to perform traveling without work in the worked area 62 within the agricultural field 60.

Second Embodiment

The first embodiment mentioned above has described an example that the working vehicle is the combine 1 that is restricted from traveling without work in the unworked area 61 within the agricultural field 60, but the present invention is not limited to this example. For example, in a second embodiment, the working vehicle may be a vehicle, such as a tractor 101 or a rice planter, that is restricted from traveling without work in the worked area 62 within the agricultural field 60, in other words, may be a vehicle that is allowed to perform traveling without work in the unworked area 61 within the agricultural field 60. As the second embodiment of the working vehicle, the tractor 101 will be described with reference to FIG. 27 and other drawings. With regard to the tractor 101 in the second embodiment, the same explanation as that of the combine 1 in the first embodiment will be omitted.

Figure 27:
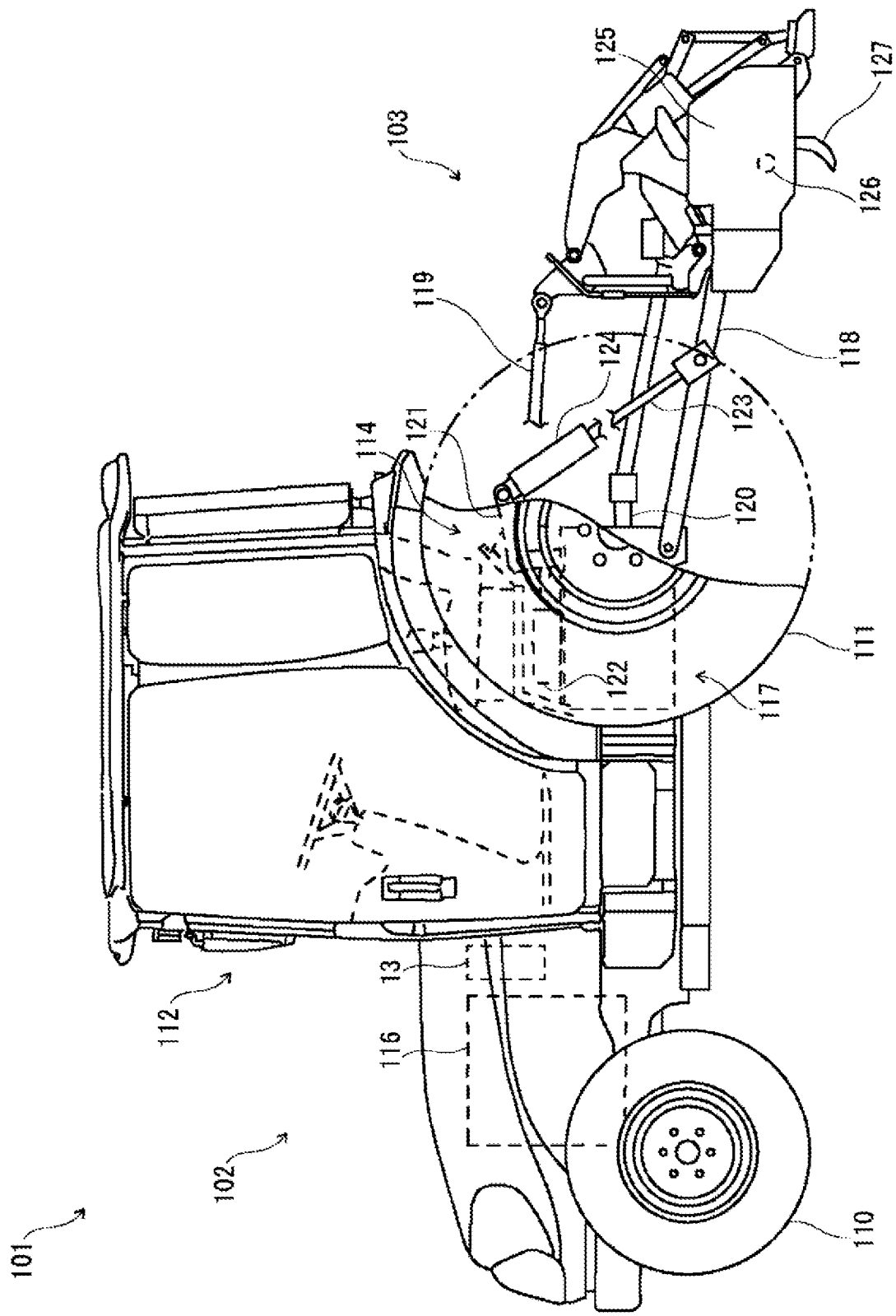
FIG. 27 is a side view of a tractor according to a second embodiment of the present invention.

As depicted in FIG. 27, the tractor 101 includes a vehicle body 102 and a working machine 103, and is configured so as to perform work, such as tilling, by the working machine 103, with traveling by the vehicle body 102. In the tractor 101, the working machine 103 to perform a variety of works, such as a rotary, a harrow, a loader, a plough, and a box scraper, are mounted on the vehicle body 102 as appropriate.

The tractor 101 is set to a traveling mode of either a manual traveling mode or an automatic traveling mode. When a manual traveling mode is set, the tractor 101 performs manual traveling in response to an operation of a variety of operative tools (a handle, an axel pedal, or a shift lever) by a worker. When an automatic traveling mode is set, the tractor 101 controls a vehicle speed and steering by a control device 130 so as to perform automatic traveling along the work route 63. The tractor 101 performs automatic traveling having a traveling pattern such as shuttle traveling to shuttle on a plurality of the straight routes 67 in the unworked area 61 in the agricultural field 60, revolving traveling to repeat a revolution on the straight routes 67 with shifting from the center to the outer of the unworked area 61, or another traveling. The straight route 67 may also be a curved straight route.

The lower front of the vehicle body 102 has a left-and-right-pair of front wheels 110, and the lower rear of the vehicle body 102 has a left-and-right-pair of rear wheels 111. The upper of the vehicle body 102 has a cabin 112 to be ridden by an operator, and the inside of the cabin 112 has a driving seat, a variety of operative tools, and another component. Operative tools for maneuvering traveling of the tractor 101 include a handle to direct turn of the machine body of the tractor 101, a main gearshift lever and a secondary gearshift lever to direct speed alteration for back and forth motion of the tractor 101, and another appliance. The vehicle body 102 also has a power part 113, a working machine lifting mechanism 114, a positioning unit 115 (see FIG. 28), and a control device 130.

The power part 113 includes an engine 116, a gearshift device 117, and another component, and power of the engine 116 is gear shifted by the gearshift device 117 and transmitted to each of the front wheels 110 and each of the rear wheels 111. The rear of the gearshift device 117 has connection to a left-and-right-pair of lower links 118, a top link 119, and a PTO shaft 120, and the working machine 103 is joined to the rear ends of each of the lower links 118, the top link 119, and the PTO shaft 120, and driven by the PTO shaft 120.

The working machine lifting mechanism 114 includes a left-and-right-pair of lift arms 121, and a lift cylinder 122 configured of a hydraulic cylinder. A tip of one of the lift arms 121 is joined to one of the lower links 118 via a linking member 123, and a tip of the other of the lift arms 121 is joined to the other of the lower links 118 via a rolling cylinder 124. The working machine lifting mechanism 114 drives the lift cylinder 122, and thereby can change a height of the working machine 103 supported by the vehicle body 102. The working machine lifting mechanism 114 lowers the working machine 103 to a work position when work is performed and raises the working machine 103 to a non-work position when work is not performed.

The working machine 103 includes e.g., a rotary, and has a tilling cover 125 extending in left and right directions. The tilling cover 125 has rotatable attachment of a tilling rotary shaft 126 having a rotary shaft extending in left and right directions, and the tilling rotary shaft 126 rotates by power transmitted from the PTO shaft 120. The tilling rotary shaft 126 also has a plurality of tilling claws 127 at intervals in left and right directions. The working machine 103 is configured such that the tilling claw 127 together with the tilling rotary shaft 126 rotates against and tills soil of the agricultural field 60.

The positioning unit 115 is configured to use a satellite positioning system such as GNSS to acquire position information (positioning point) of the tractor 101, and receives a positioning signal from a positioning satellite via a positioning antenna, and acquires position information of the positioning unit 115, i.e., position information of the tractor 101, based on the positioning signal. The positioning unit 115 may be configured of a quantum compass instead of a positioning antenna.

Figure 28:
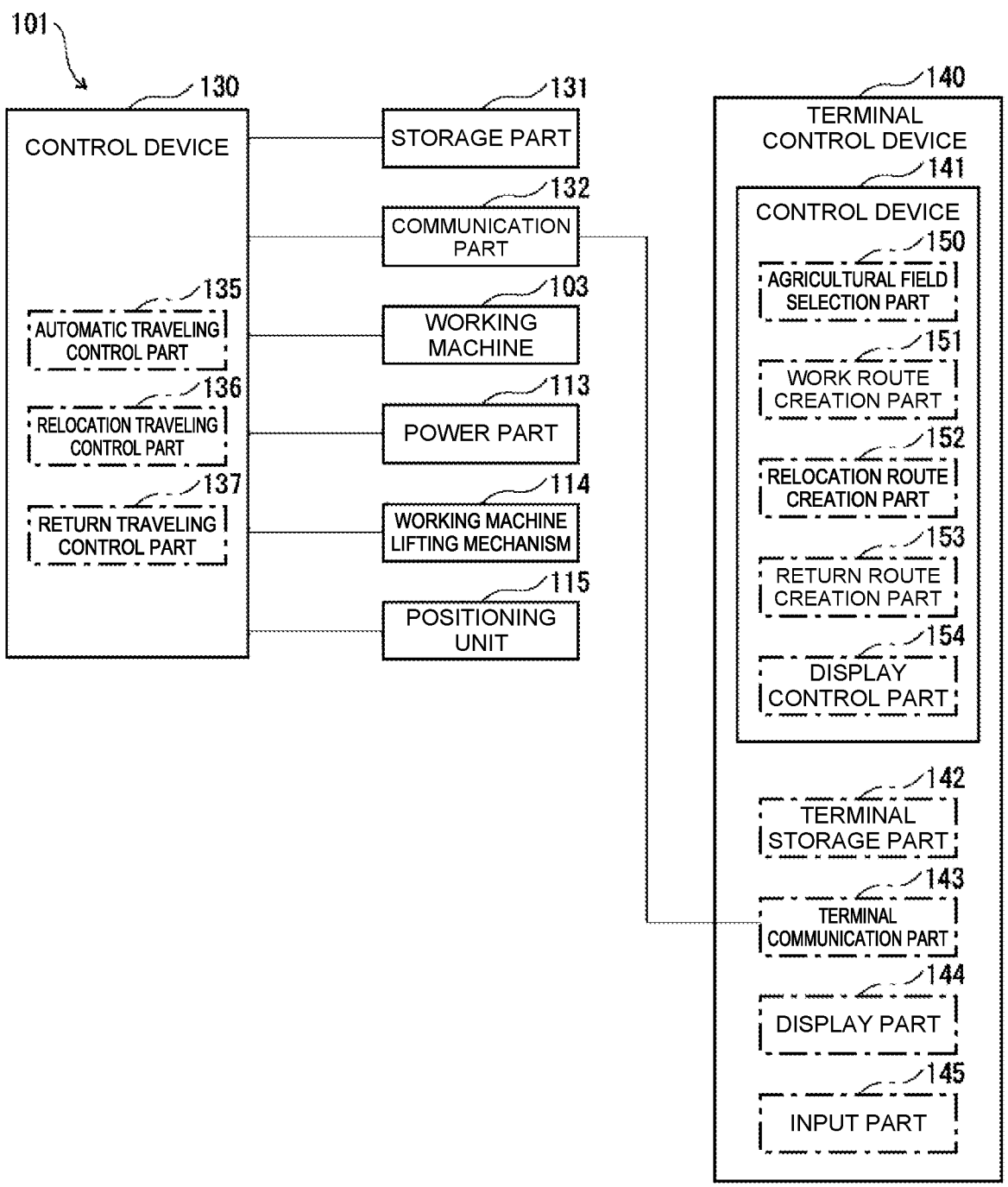
FIG. 28 is a block diagram of the tractor according to the second embodiment of the present invention.

Next, a control device 130 will be described. The control device 130 has a similar function to the control device 30 in the combine 1, is configured of a computer such as a CPU, and connected to a storage part 131 such as a ROM, a RAM, a hard disk drive, or a flash memory, a communication part 132 that communicates with an external instrument, and other components, as depicted in FIG. 28.

The storage part 131 stores program, data, and the like to control a variety of components and a variety of functionalities of the tractor 101, and the control device 130 executes arithmetic processing based on the program, data, and the like stored in the storage part 131, and thereby controls a variety of components and a variety of functionalities. For example, the control device 130 acquires from the positioning unit 115 a position of the tractor 101 itself.

The communication part 132 is capable of wireless communication with an external instrument, such as a mobile terminal 140, carried by a worker, via a wireless communication antenna. The control device 130 controls the communication part 132 to perform wireless communication with a mobile terminal 140, and sends and receives a variety of information to and from the mobile terminal 140.

Figure 29:
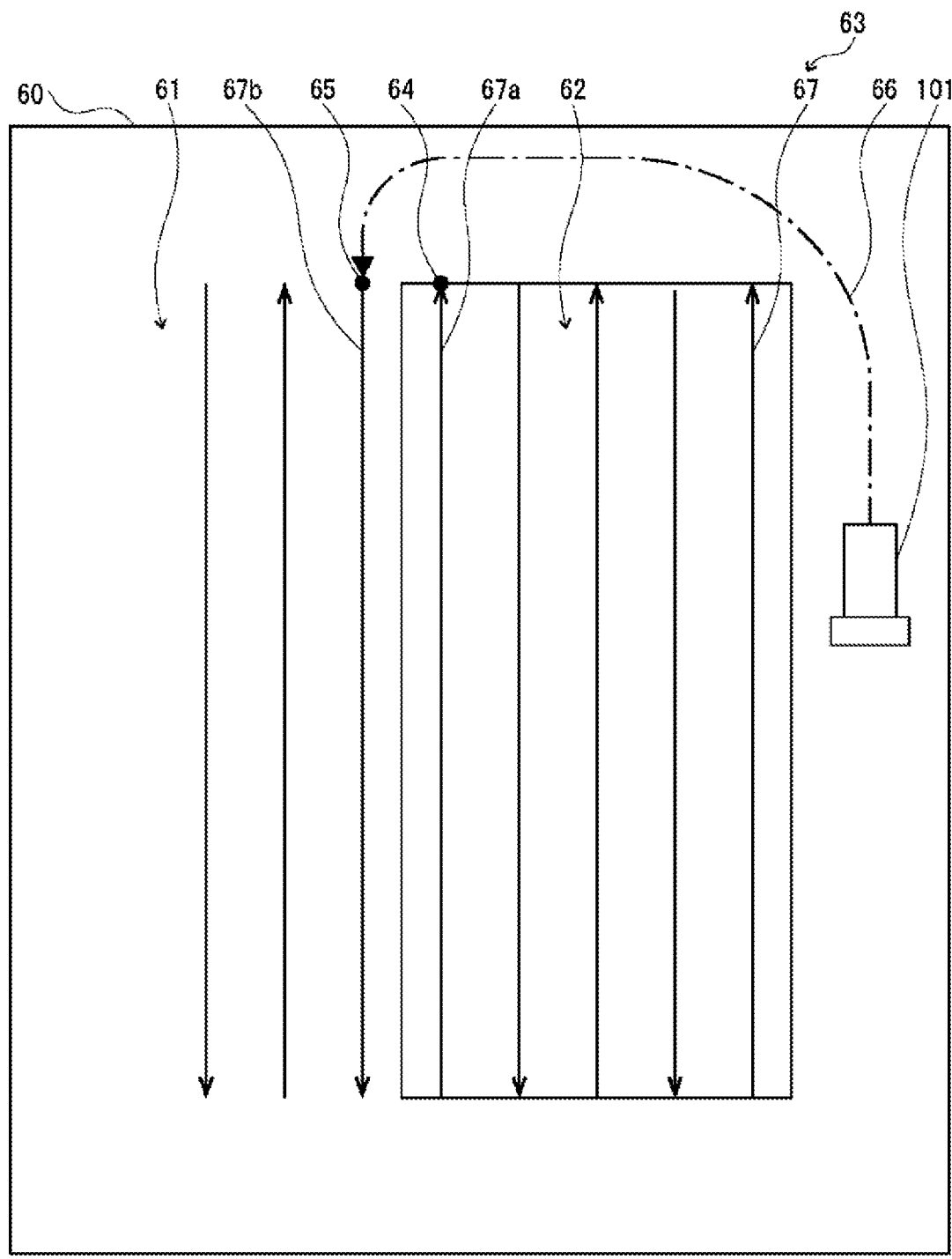
FIG. 29 is a plan view illustrating an eleventh example of return traveling in the tractor according to the second embodiment of the present invention.
Figure 30:
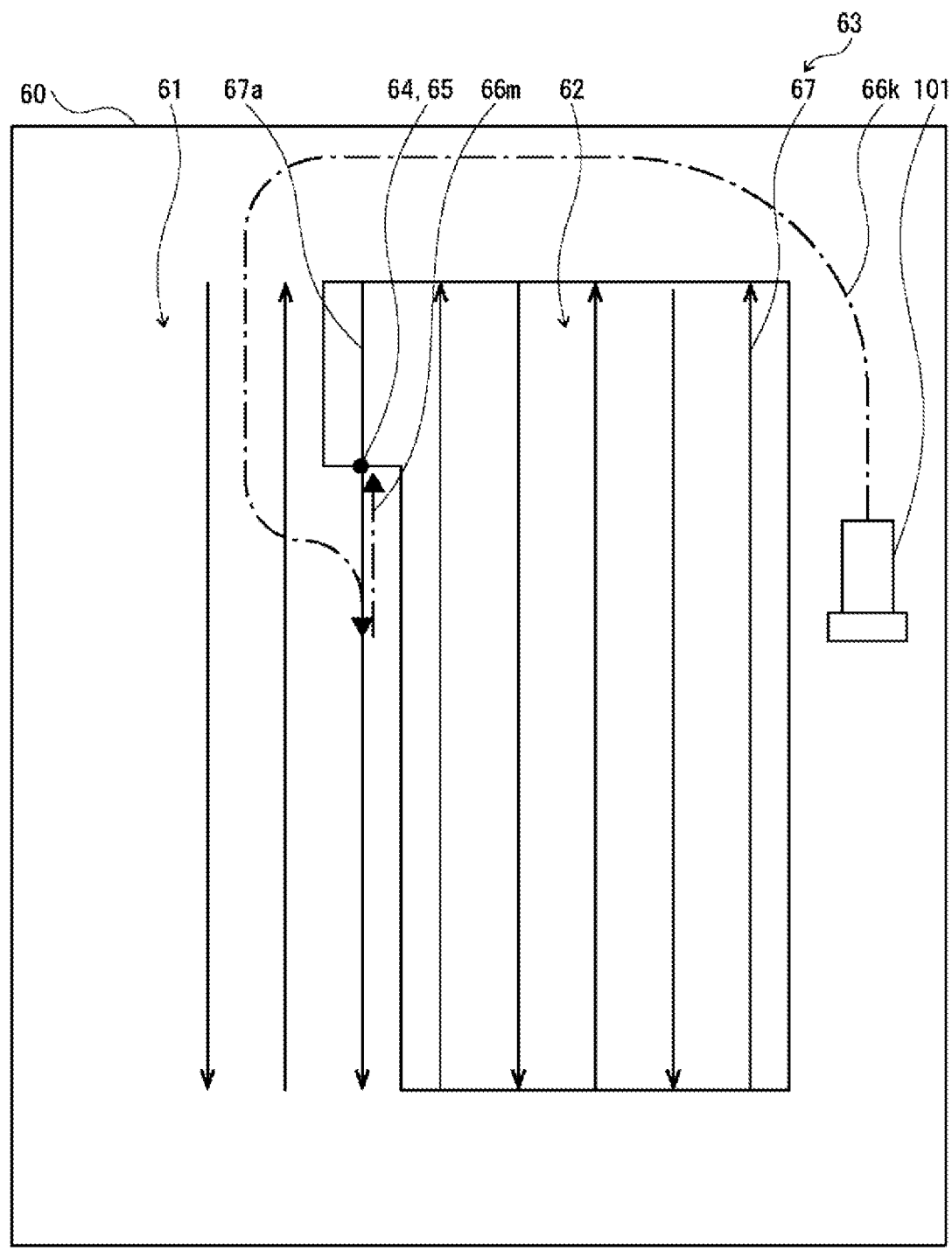
FIG. 30 is a plan view illustrating a twelfth example of return traveling in the tractor according to the second embodiment of the present invention.
Figure 31:
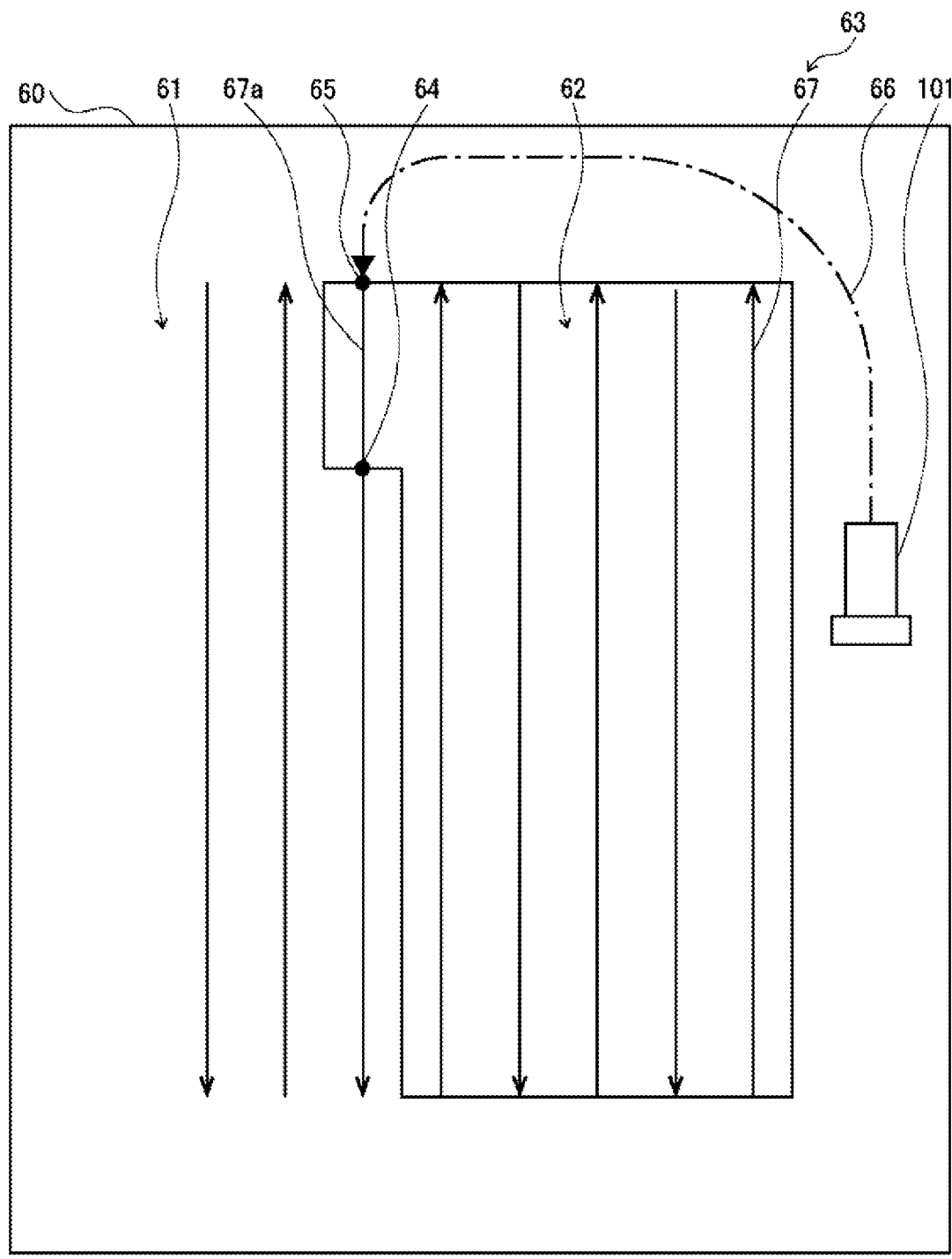
FIG. 31 is a plan view illustrating a thirteenth example of return traveling in the tractor according to the second embodiment of the present invention.

The control device 130 receives agricultural field information, a work route 63, and the like set for the agricultural field 60, which is a work subject of the tractor 101, as depicted in FIG. 29 to FIG. 31, via the communication part 132 from the mobile terminal 140, and stores them in the storage part 131.

The control device 130 also executes a program stored in the storage part 131, and thereby works as an automatic traveling control part 135, a relocation traveling control part 136, and a return traveling control part 137. Note that the automatic traveling control part 135, the relocation traveling control part 136, and the return traveling control part 137 achieve an automatic traveling step, a relocation traveling step, and a return traveling step in the automatic traveling method according to the present invention.

The automatic traveling control part 135 is a unit that has a similar function to the automatic traveling control part 35 in the combine 1, and controls automatic traveling of the tractor 101 under setting an automatic traveling mode. Upon start of automatic traveling, the automatic traveling control part 135 acquires from the positioning unit 115 a position of the tractor 101 itself, and controls the power part 113, and a steering device (not depicted) and the working machine 103 such that the tractor 101 performs automatic traveling along the work route 63 based on a position of the tractor 101 itself, agricultural field information, and the work route 63. When performing automatic traveling, the automatic traveling control part 135 starts operation of the working machine 103 and lowers the working machine 103 to the work position.

The automatic traveling control part 135 also temporarily pauses automatic traveling in midway of the work route 63, in response to a predetermined pause operation using an operative tool in the cabin 112, the mobile terminal 140, or another unit, or when meeting a predetermined pause condition based on a state of work of the tractor 101. At that time, the automatic traveling control part 135 stops operation of the working machine 103 and raises the working machine 103 to the non-work position. When the tractor 101 pausing automatic traveling breaks away from the work route 63 by automatic driving or manual operation, the automatic traveling control part 135 stores a breakaway position 64 in the storage part 131, and sends it to the mobile terminal 140 via the communication part 132. Furthermore, the automatic traveling control part 135 resumes automatic traveling temporarily paused, in response to a predetermined resume operation with an operative tool in the cabin 112, the mobile terminal 140, or another unit, or when meeting a predetermined resume condition based on a state of work of the tractor 101.

The relocation traveling control part 136 is a unit that has a similar function to the relocation traveling control part 36 in the combine 1 and controls relocation traveling to move the tractor 101 breaking away at the breakaway position 64 predetermined on the work route 63, to a midway work position away from the work route 63, and performs relocation traveling by automatic driving or manual operation. For example, when the tractor 101 temporarily pauses automatic traveling by the automatic traveling control part 135, the relocation traveling control part 136 stops operation of the working machine 103 and raises the working machine 103 to the non-work position, and performs relocation traveling of the tractor 101 in response to a predetermined relocation operation with an operative tool in the cabin 112, the mobile terminal 140, or another unit, or when meeting a predetermined relocation condition based on a state of work of the tractor 101.

The return traveling control part 137 has a similar function to the return traveling control part 37 in the combine 1, and makes the tractor 101 automatically perform return traveling toward the work route 63 in response to a return operation for the tractor 101 within the agricultural field 60, when the tractor 101 breaks away from the work route 63. For example, after the tractor 101 breaks away from the work route 63, the return traveling control part 137 acquires from the mobile terminal 140, the return route 66 from a position of the tractor 101 itself to the return position 65 predetermined on the work route 63, in response to a return operation using an operative tool in the cabin 112, the mobile terminal 140, or another unit; and controls the power part 113 and a steering device (not depicted) so as to perform return traveling to travel to the return position 65 along the return route 66 by automatic driving along, in a state where operation of the working machine 103 is stopped and the working machine 103 is raised to the non-work position. In a case where the return traveling control part 137 stops return traveling when the return position 65 is reached and then shifts to automatic traveling, the return traveling control part 137 starts deceleration before the return position 65 by a predetermined distance so that the vehicle speed becomes zero at the return position 65. At that time, in order to preparation for automatic traveling, the return traveling control part 137 may lower the working machine 103 to the work position automatically or in response to manual operation when the return position 65 is reached, or may automatically lower the working machine 103 to the work position with deceleration traveling. Alternatively, when continuously shifting from return traveling to automatic traveling, the return traveling control part 137 may start changing the vehicle speed before the return position 65 by a predetermined distance and set the vehicle speed to a set vehicle speed for automatic traveling at the return position 65 or right before the return position 65.

The mobile terminal 140 is one of components of the tractor 101, has a similar function to the mobile terminal 40 in the combine 1, represents a terminal capable of remote operation of the tractor 101, and is configured of, e.g., a tablet terminal including a touch panel or a laptop personal computer. An operation device similar to the mobile terminal 140 may be included in the cabin 112. In the present invention, the automatic traveling system includes the tractor 101, the mobile terminal 140, and another device.

As depicted in FIG. 28, the mobile terminal 140 includes a terminal control device 141 configured of a computer such as a CPU, and the terminal control device 141 is connected to a terminal storage part 142 such as a ROM, a RAM, a hard disk drive, or a flash memory, a terminal communication part 143 that communicates with an external instrument, and another part. The mobile terminal 140 also includes a display part 144, such as a touch panel or a monitor, for displaying various information to output to a worker, and further includes an input part 145, such as a touch panel or an operation key, for accepting an input operation of various information from a worker.

The terminal storage part 142 stores program, data, and the like to control a variety of components and a variety of functionalities of the mobile terminal 140, and the terminal control device 141 executes arithmetic processing based on the program, data, and the like stored in the terminal storage part 142, and thereby controls a variety of components and a variety of functionalities of the mobile terminal 140. The terminal storage part 142 stores agricultural field information of the agricultural field 60, which is a work subject of the tractor 101.

The terminal communication part 143 is communicably connected to the communication part 132 in the tractor 101 via a wireless communication antenna. The terminal control device 141 controls the terminal communication part 143 to perform wireless communication with the tractor 101, and sends and receives a variety of information to and from the tractor 101.

The terminal control device 141 of the mobile terminal 140 executes a program stored in the terminal storage part 142, and thereby works as an agricultural field selection part 150, a work route creation part 151, a relocation route creation part 152, a return route creation part 153, and a display control part 154. Note that the agricultural field selection part 150, the work route creation part 151, the relocation route creation part 152, and the return route creation part 153 achieve an agricultural field selection step, a work route creation step, a relocation route creation step, and a return route creation step in the automatic traveling method according to the present invention.

The agricultural field selection part 150 is a unit that has a similar function to the agricultural field selection part 50 in the combine 1, and selects manually or automatically the agricultural field 60 to be a work subject of automatic traveling of the tractor 101.

The work route creation part 151 is a unit that has a similar function to the work route creation part 51 in the combine 1, and creates the work route 63, where the tractor 101 performs work with traveling; for example, the work route creation part 151 creates the work route 63 for automatic traveling in the agricultural field 60 selected by the agricultural field selection part 150 (see FIG. 29 to FIG. 31) and stores it in the terminal storage part 142, and sends it to the tractor 101 via the terminal communication part 143. For example, the work route creation part 151 creates the work route 63 for shuttle traveling to shuttle on a plurality of the straight routes 67 in the unworked area 61 inside the agricultural field 60.

The relocation route creation part 152 is a unit that has a similar function to the relocation route creation part 52 in the combine 1, and creates a relocation route where the tractor 101 performs relocation traveling from the breakaway position 64 to a midway work position. The relocation route includes traveling information on traveling, and the traveling information includes a traveling direction, a set vehicle speed, and the like at each traveling position, in addition to a traveling position in the agricultural field 60. The set vehicle speed for the relocation route may be set higher than a set vehicle speed for the work route 63 of automatic traveling. Upon creating a relocation route, the relocation route creation part 152 stores it in the terminal storage part 142 and sends it to the tractor 101 via the terminal communication part 143.

The return route creation part 153 is a unit that has a similar function to the return route creation part 53 in the combine 1 and creates the return route 66 to return to the work route 63, the tractor 101 pausing automatic traveling and breaking away from the work route 63, and sets the return position 65 on the work route 63, creates the return route 66 to perform return traveling by automatic driving from a position of the tractor 101 itself to the return position 65, stores this return route 66 in the terminal storage part 142, and sends it to the tractor 101 via the communication part 132. The return route 66 includes traveling information on traveling, and the traveling information includes a traveling direction, a set vehicle speed, and the like at each traveling position, in addition to a traveling position in the agricultural field 60. The set vehicle speed for the return route 66 may be set higher than the set vehicle speed for the work route 63 of automatic traveling. In response to a predetermined creation operation using an operative tool in the cabin 112, the mobile terminal 140, or another unit, the return route creation part 153 acquires a position of the tractor 101 itself of the creation operation from the positioning unit 115 in the tractor 101, and creates the return route 66 from the position of the tractor 101 itself to the return position 65. The return route creation part 153 may create the return route 66 such that the return position 65 is reached by traveling straight at least a predetermined distance in the same direction as the traveling direction of the work route 63, in other words, the return route creation part 153 may set a straight route of at least a predetermined distance at a terminal end of the return route 66.

The return route creation part 153 is capable of creating the return route 66 similar to e.g., those in the first to seventeenth examples in the first embodiment; particularly, in the second embodiment, the return route creation part 153 creates the return route 66 e.g., such that the tractor 101 moves in the shortest distance with keeping off the worked area 62; in other words, the return route creation part 153 creates the return route 66 such that the tractor 101 performs return traveling in the unworked area 61. In application of any of the first to seventeenth examples, the return route creation part 153 creates the return route 66 by combining a straight route and a turning route e.g., such that the tractor 101 moves from its own position at creation operation to the return position 65 in the shortest distance with keeping off the worked area 62.

Eighteenth Example

For example, as depicted in FIG. 29, in an eighteenth example similar to the first example, when the tractor 101 defines as the breakaway route 67a, the straight route 67 predetermined and included in the work route 63, pauses automatic traveling at the breakaway position 64 at a terminal end of this breakaway route 67a and breaks away from the work route 63, the return route creation part 153 defined as the next route 67b, the straight route 67 connected next to this breakaway route 67a, and sets the return position 65 at a starting end of this next route 67b. At that time, the return route creation part 153 creates the return route 66 such that the tractor 101 travels from its own position at creation operation to the return position 65 at a starting end of the next route 67b with keeping off the worked area 62. In FIG. 29, an example is shown in which the work route 63 of shuttle working to shuttle on a plurality of the straight routes 67 is created for the unworked area 61 in the agricultural field 60. As another example of the eighteenth example, even when the work route 63 of revolving working is created, the return route creation part 153 may similarly define as the next route 67b, the straight route 67 connected next to the breakaway route 67a and set the return position 65 at a starting end of that next route 67b.

Nineteenth Example

Additionally, as depicted in FIG. 30, in a nineteenth example similar to the second example, when the tractor 101 defines as the breakaway route 67a, the straight route 67 predetermined included in the work route 63, and pauses automatic traveling at the breakaway position 64 in midway of this breakaway route 67a and breaks away the work route 63, the return route creation part 153 preferably sets the return position 65 on this breakaway position 64. At that time, the return route creation part 153 creates a first return route 66k such that the tractor 101 travels with keeping off the worked area 62, from a position of the tractor 101 itself at creation operation to a position apart from the breakaway position 64 on the opposite side of the worked area 62 on the breakaway route 67a. The return route creation part 153 further creates a second return route 66m to travel backward from a terminal end of the first return route 66k to the return position 65 on the breakaway position 64. The return route creation part 153 may take a partial route of the breakaway route 67a as the second return route 66m. Then, the return route creation part 153 creates the return route 66 having the first return route 66k and the second return route 66m.

When the worked area 62 is present between a position of the tractor 101 itself at creation operation and the breakaway position 64, the return route creation part 153 may create the return route 66 having the first return route 66k and the second return route 66m as described above. By contrast, when the worked area 62 is absent between a position of the tractor 101 itself and the breakaway position 64, the return route creation part 153 may create the return route 66 to travel in the shortest distance with keeping off the worked area 62 from the position of the tractor 101 itself to the breakaway position 64. In the nineteenth example, as depicted in FIG. 30, an example is shown in which the work route 63 of shuttle working to shuttle on a plurality of the straight routes 67 is created for the unworked area 61 in the agricultural field 60. As another example of the nineteenth example, even when the work route 63 of revolving working is created, the return route creation part 153 may similarly set the return position 65 on the breakaway route 67a.

Twentieth Example

Alternatively, as depicted in FIG. 31, in a twentieth example similar to the second example, when the tractor 101 defines as breakaway route 67a, the straight route 67 predetermined and included in the work route 63, and pauses automatic traveling at the breakaway position 64 in midway of this breakaway route 67a and breaks away from the work route 63, the return route creation part 153 may set the return position 65 at a starting end of this breakaway route 67a. At that time, the return route creation part 153 creates the return route 66 such that the tractor 101 travels with keeping off the worked area 62 from a position of the tractor 101 itself at creation operation to the return position 65 at a starting end of the breakaway route 67a. The tractor 101 may also perform return traveling to the return position 65 at a starting end of the breakaway route 67a, and then perform automatic traveling along with tilling work or may perform automatic traveling without tilling work, based on the work route 63 from the return position 65 to the breakaway position 64.

When the worked area 62 is present between a position of the tractor 101 itself at creation operation and the breakaway position 64, the return route creation part 153 may create the return route 66 toward a starting end of the breakaway route 67a, as described above. By contrast, when the worked area 62 is absent between the position of the tractor 101 itself and the breakaway position 64, the return route creation part 153 may create the return route 66 to travel in the shortest distance with keeping off the worked area 62 from the position of the tractor 101 itself to the breakaway position 64. In the twentieth example, as depicted in FIG. 31, an example is shown in which the work route 63 of shuttle working to shuttle on a plurality of the straight routes 67 is created for the unworked area 61 in the agricultural field 60. As another example of the twentieth example, even when the work route 63 of revolving working is created, the return route creation part 153 may similarly set the return position 65 on the breakaway route 67a. When a distance between a starting end of the breakaway route 67a and the breakaway position 64 is a predetermined spacing threshold or more (i.e., when the length of the worked area 62 on the breakaway route 67a is a predetermined reaping distance or more), the return route creation part 153 may apply the nineteenth example. When a distance between a starting end of the breakaway route 67a to the breakaway position 64 is less than a predetermined spacing threshold (i.e., when the length of the worked area 62 on the breakaway route 67a is less than a predetermined reaping distance), the return route creation part 153 may apply the twentieth example. Alternatively, when a distance from the breakaway position 64 to a terminal end of the breakaway route 67a is less than a predetermined spacing threshold (i.e., when the length of the unworked area 61 on the breakaway route 67a is less than a predetermined unreaped distance), the return route creation part 153 may apply the nineteenth example. When a distance from the breakaway position 64 to a terminal end of the breakaway route 67a is a predetermined spacing threshold or more (i.e., when the length of the unworked area 61 on the breakaway route 67a is a predetermined unreaped distance or more), the return route creation part 153 may apply the twentieth example. Alternatively, the return route creation part 153 may apply either the twelfth example or the thirteenth example corresponding to an operation intended by a worker.

The display control part 154 has a function similar to that of the display control part 54 in the combine 1, and controls so as to display on the display part 144, the work screen 70 (see FIG. 26) for automatic traveling, return traveling, or another action in the agricultural field 60, which is a work subject. The display control part 154 displays at least the map field 71, the traveling start button 72, and the return route creation button 73 on the work screen 70.

The display control part 154 displays an outer shape of the agricultural field 60 in the map field 71 in a similar manner to the first embodiment, and further displays the indication 74 of the tractor 101 itself at a position of the tractor 101 itself positioned by the positioning unit 115 of the tractor 101. The display control part 154 displays the unworked area 61 and the worked area 62, as well as the work route 63 in the map field 71. The display control part 154 also displays the breakaway position 64, the return position 65, the return route 66, and the direction line 75 in the map field 71, as appropriate. In the second embodiment, functions and actions of the work screen 70 (in particular, functions and actions of the map field 71, the traveling start button 72, and the return route creation button 73) are similar to those in the first embodiment, and thus the description thereof will be omitted.

As described above, according to the second embodiment, the tractor 101 is a working vehicle that is restricted from traveling without work in the worked area 62 within an agricultural field 60, and the return traveling control part 137 makes the tractor 101 automatically perform return traveling so as to travel on the unworked area 61 in the agricultural field 60.

Therefore, the tractor 101 can perform return traveling without trampling down the worked area 62, thus providing improved workability.

According to the embodiment, when the tractor 101 breaks away at the breakaway position 64 in midway of the straight route 67 included in the work route 63, the return route creation part 153 creates the return route 66 having the first return route 66k to travel to the unworked area 61 on the straight route 67 apart from the breakaway position 64, and the second return route 66m to travel backward from a terminal end of the first return route 66k to the breakaway position 64.

Therefore, even when breaking away in midway of the breakaway route 67a, the tractor 101 can perform return traveling and smoothly return to the work route 63 without trampling down the worked area 62, thus providing improved workability.

According to the embodiment, when the tractor 101 breaks away at the breakaway position 64 having less than a predetermined spacing distance from a starting end of the straight route 67 in midway of the straight route 67 included in the work route 63, the return route creation part 153 creates the return route 66 to travel to a starting end of the straight route 67.

Therefore, the return route 66 can be created corresponding to a state of work in the agricultural field 60 to allow efficient return traveling, thus providing improved workability.

The second embodiment has described an example that selection operation of the traveling start button 72 is defined as a trigger for start of return traveling, but the present invention is not limited to this example. For example, completion of supplying work of materials and fuel may be a trigger for a start of return traveling, or creation of the return route 66 may be a trigger for start of return traveling.

Furthermore, the second embodiment mentioned above has described an example that the working vehicle is configured of the tractor 101, but the present invention is not limited to this example. For example, the working vehicle in the second embodiment should only be a vehicle that is restricted from traveling without work in the worked area 62 within the agricultural field 60, and be a vehicle that is allowed to perform traveling without work in the unworked area 61 within the agricultural field 60.

The first and second embodiments have respectively described examples in which the combine 1 and the tractor 101 breaking away from the work route 63, set the return position 65 at a predetermined position on the work route 63 and create the return route 66, as in the first to twentieth examples, and automatically perform return traveling along the return route 66 to the work route 63. However, the present invention in not limited to these examples. In other examples, the combine 1 and the tractor 101 may perform manual traveling to the return position 65 in response to a manual operation after setting the return position 65 at a predetermined position on the work route 63 as in the first to twentieth examples.

By the way, in the first and second embodiments described above, respectively, the combine 1 and the tractor 101 include a main gearshift lever and a secondary gearshift lever to direct speed alteration for back and forth motion. The secondary gearshift lever (speed change member) is capable of switching a set vehicle speed between a plurality of steps (e.g., high speed, medium speed, low speed, etc.), while the main gearshift lever is capable of changing the set vehicle speed steplessly according to an operation amount of forward operation or backward operation (e.g., tilt operation amount). In order to ensure safety, the combine 1 and the tractor 101 normally disable the secondary gearshift lever to be switched during the above discharge traveling and return traveling in the middle of work in the agricultural field 60, as well as during relocation traveling without work of the reaping part 3 or the working machine 103, such as discharge traveling at completion of work in the agricultural field 60 or entry or exit traveling to or from the agricultural field 60.

In contrast, in other examples, the combine 1 and the tractor 101 may enable the secondary gearshift lever to be switched even during relocation traveling, according to a predetermined switching condition. The combine 1 and the tractor 101 may enable the secondary gearshift lever to be switched to either a high speed side or a low speed side, and may also enable the secondary gearshift lever to be switched regardless of moving forward or backward. The combine 1 and the tractor 101 may automatically switch the secondary gearshift lever when a switching condition is met, or may switch the secondary gearshift lever in response to manual operation.

For example, the combine 1 and the tractor 101 define, on a relocation route without work of the reaping part 3 or the working machine 103 such as the discharge route 69 or the return route 66, a straight portion (including a gentle curve with a predetermined radius of curvature or more) having a predetermined traveling distance or more as an allowable route, and enable the secondary gearshift lever to be switched. Additionally, the switching condition may also be that a residual length of the allowable route is a predetermined allowable length or more during relocation traveling on that allowable route. When this switching condition is met, the combine 1 and the tractor 101 may switch the secondary gearshift lever to the high speed side. The combine 1 and the tractor 101 may enable the secondary gearshift lever to be switched regardless of whether the allowable route is a route along the work route 63 or not, when the switching condition is met for the allowable route.

When the combine 1 and the tractor 101 create a relocation route by combining a straight portion and a turning portion, the vehicle speed may be set lower in the turning portion than in the straight portion. In this case, since the combine 1 and the tractor 101 need to decelerate at a terminal end side of the straight portion when moving from the straight portion to the turning portion, in a case where the straight portion is set as the allowable route above, the combine 1 and the tractor 101 determine the residual length of the allowable route that does not include a deceleration interval at the terminal end side and disable the secondary gearshift lever to be switched in the deceleration interval.

The combine 1 and the tractor 101 may also set as a switching condition that the reaping part 3 or the working machine 103 stops operation or is at a non-work position during relocation traveling on the allowable route. Furthermore, the combine 1 and the tractor 101 may also set as a switching condition that relocation traveling on the allowable route has continued for a predetermined distance or for a predetermined period of time. When the terminal end of the allowable route is reached, the combine 1 and the tractor 101 may automatically undo the switching of the secondary gearshift lever performed during relocation traveling on the allowable route.

When the secondary gearshift lever is operated when the switching condition is not met, the combine 1 and the tractor 101 notify the operator by display, sound, buzzer, or other means that the secondary gearshift lever is not switchable. The combine 1 and the tractor 101 may notify the operator by display, sound, buzzer, or other means that the secondary gearshift lever is switchable when the switching condition is met. The combine 1 and the tractor 101 may notify the operator by display, sound, buzzer, or other means of deceleration when moving from a straight portion to a turning portion on a relocation route and of undoing the switching of the secondary gearshift lever.

Note that the present invention can be appropriately changed unless contrary to gist or spirit of the present invention that can be read out from the claims and the whole specification, and an automatic traveling method, a working vehicle, and an automatic traveling system accompanied by such a change are also included in the spirit of the present invention.

SUPPLEMENTARY NOTES OF THE
INVENTION

Supplementary notes will now be provided for summary of the invention extracted from the aforementioned embodiments. Each component and each processing function described in the following supplementary notes can be subjected to selection and freely combined.

Supplementary Note 1

An automatic traveling method of a working vehicle that performs automatic traveling on a work route preset in an agricultural field, the automatic traveling method including:
 a return traveling step to make the working vehicle automatically perform return traveling toward the work route in response to a return operation for the working vehicle that is within the agricultural field during breakaway of the working vehicle from the work route.

Supplementary Note 2

The automatic traveling method set forth in supplementary note 1, further including a return route creation step to create a return route to the work route based on a position of the working vehicle itself, in response to a creation operation for the working vehicle, wherein the return traveling step makes the working vehicle automatically perform return traveling based on the return route.

Supplementary Note 3

The automatic traveling method set forth in supplementary note 1 or 2, wherein when a distance between a return position disposed on an end of a straight route included in the work route, and a position of the working vehicle itself at the return operation is a predetermined spacing threshold or more, the return traveling step makes the working vehicle automatically perform return traveling toward the work route.

Supplementary Note 4

The automatic traveling method set forth in any of supplementary notes 1 to 3, wherein when a distance between a breakaway position of the working vehicle at breakaway in midway of a straight route included in the work route, and a position of the working vehicle itself at the return operation is a predetermined spacing threshold or more, the return traveling step makes the working vehicle automatically perform return traveling toward the breakaway position.

Supplementary Note 5

The automatic traveling method set forth in any of supplementary notes 1 to 4, wherein when the working vehicle is a vehicle restricted from traveling without work in a worked area in the agricultural field, the return traveling step makes the working vehicle automatically perform return traveling so as to travel in an unworked area in the agricultural field.

Supplementary Note 6

The automatic traveling method set forth in any of supplementary notes 2 to 4, wherein when the working vehicle is a vehicle restricted from traveling without work in a worked area in the agricultural field and breaks away at a breakaway position in midway of a straight route included in the work route, the return route creation step creates the return route having a first return route to travel to an unworked area on the straight route apart from the breakaway position and a second return route to travel backward from a terminal end of the first return route to the breakaway position.

Supplementary Note 7

The automatic traveling method set forth in any of supplementary notes 2 to 4, wherein when the working vehicle is a vehicle restricted from traveling without work in a worked area in the agricultural field and breaks away at a breakaway position having a distance less than a predetermined spacing distance from a starting end of a straight route included in the work route, in midway of the straight route, the return route creation step creates the return route to travel to the starting end of the straight route.

Supplementary Note 8

The automatic traveling method set forth in any of supplementary notes 2 to 4, wherein when the working vehicle is a vehicle restricted from traveling without work in an unworked area in the agricultural field and breaks away at a breakaway position in midway of a straight route included in the work route, the return route creation step creates the return route having a first return route to travel to a starting end of the straight route and a second return route to travel from a starting end to the breakaway position in the straight route.

Supplementary Note 9

The automatic traveling method set forth in any of supplementary notes 2 to 4, having a work route creation step to create the work route including one or more straight routes and an automatic traveling step to make the working vehicle perform automatic traveling along the work route; wherein when the straight route predetermined is defined as a breakaway route and the working vehicle breaks away at a terminal end of the breakaway route, and when the straight route next to the breakaway route is defined as a next route and the working vehicle is apart in a direction perpendicular to the next route, the return route creation step defines as an entry corner part, a corner part of an unworked area in the agricultural field closest to a position of the working vehicle itself, and creates the return route to travel to the entry corner part so as to face the entry corner part in the perpendicular direction; and wherein when the return route creation step creates the return route to face the entry corner part in the perpendicular direction, the work route creation step recreates the work route so as to include a straight route to travel in the perpendicular direction from the entry corner part.

Supplementary Note 10

The automatic traveling method set forth in any of supplementary notes 2 to 4, wherein when a predetermined straight route is defined as a breakaway route among one or more straight routes included in the work route and the working vehicle breaks away at a predetermined breakaway position in midway of the breakaway route, the return route creation step creates the return route to travel to a starting end of the straight route next to the breakaway route or of the straight route adjacent to the breakaway route.

Supplementary Note 11

The automatic traveling method set forth in any of supplementary notes 1 to 4, wherein when a predetermined straight route is defined as a breakaway route among one or more straight routes included in the work route and the working vehicle breaks away at a predetermined breakaway position in midway of the breakaway route, the return traveling step makes the working vehicle perform return traveling to a starting end of the straight route adjacent to the breakaway route, further allows the working vehicle to perform traveling and work up to a terminal end of the straight route adjacent to the breakaway route, and makes the working vehicle perform return traveling to the breakaway position.

Supplementary Note 12

The automatic traveling method set forth in any of supplementary notes 1 to 11, wherein switching of a speed change member capable of switching a set vehicle speed between a plurality of steps is normally disabled during relocation traveling without work, while the switching is enabled according to a predetermined switching condition in a straight portion, of a relocation route without work, having a predetermined traveling distance or more.

Supplementary Note 13

A working vehicle that performs automatic traveling on a work route preset in an agricultural field, the working vehicle including: a return traveling control part to make the working vehicle automatically perform return traveling toward the work route in response to a return operation for the working vehicle that is within the agricultural field during breakaway of the working vehicle from the work route.

Supplementary Note 14

The working vehicle set forth in supplementary note 13, further including a return route creation part to create a return route to the work route based on a position of the working vehicle itself, in response to a creation operation for the working vehicle, wherein the return traveling control part makes the working vehicle automatically perform return traveling based on the return route.

Supplementary Note 15

The working vehicle set forth in supplementary note 13 or 14, wherein when a distance between a return position disposed on an end of a straight route included in the work route, and a position of the working vehicle itself at the return operation is a predetermined spacing threshold or more, the return traveling control part makes the working vehicle automatically perform return traveling toward the work route.

Supplementary Note 16

The working vehicle set forth in any of supplementary notes 13 to 15, wherein when a distance between a breakaway position of the working vehicle at breakaway in midway of a straight route included in the work route, and a position of the working vehicle itself at the return operation is a predetermined spacing threshold or more, the return traveling control part makes the working vehicle automatically perform return traveling toward the breakaway position.

Supplementary Note 17

The working vehicle set forth in any of supplementary notes 13 to 16, wherein when the working vehicle is a vehicle restricted from traveling without work in a worked area in the agricultural field, the return traveling control part makes the working vehicle automatically perform return traveling so as to travel in an unworked area in the agricultural field.

Supplementary Note 18

The working vehicle set forth in any of supplementary notes 14 to 16, wherein when the working vehicle is a vehicle restricted from traveling without work in a worked area in the agricultural field and breaks away at a breakaway position in midway of a straight route included in the work route, the return route creation part creates the return route having a first return route to travel to an unworked area on the straight route apart from the breakaway position and a second return route to travel backward from a terminal end of the first return route to the breakaway position.

Supplementary Note 19

The working vehicle set forth in any of supplementary notes 14 to 16, wherein when the working vehicle is a vehicle restricted from traveling without work in a worked area in the agricultural field and breaks away at a breakaway position having a distance less than a predetermined spacing distance from a starting end of a straight route included in the work route, in midway of the straight route, the return route creation part creates the return route to travel to the starting end of the straight route.

Supplementary Note 20

The working vehicle set forth in any of supplementary notes 14 to 16, wherein when the working vehicle is a vehicle restricted from traveling without work in an unworked area in the agricultural field and breaks away at a breakaway position in midway of a straight route included in the work route, the return route creation part creates the return route having a first return route to travel to a starting end of the straight route and a second return route to travel from a starting end to the breakaway position in the straight route.

Supplementary Note 21

The working vehicle set forth in any of supplementary notes 14 to 16, having a work route creation part to create the work route including one or more straight routes and an automatic traveling control part to make the working vehicle perform automatic traveling along the work route; wherein when the straight route predetermined is defined as a breakaway route and the working vehicle breaks away at a terminal end of the breakaway route, and when the straight route next to the breakaway route is defined as a next route and the working vehicle is apart in a direction perpendicular to the next route, the return route creation part defines as an entry corner part, a corner part of an unworked area in the agricultural field closest to a position of the working vehicle itself, and creates the return route to travel to the entry corner part so as to face the entry corner part in the perpendicular direction; and wherein when the return route creation part creates the return route to face the entry corner part in the perpendicular direction, the work route creation part recreates the work route so as to include a straight route to travel in the perpendicular direction from the entry corner part.

Supplementary Note 22

The working vehicle set forth in any of supplementary notes 14 to 16, wherein when a predetermined straight route is defined as a breakaway route among one or more straight routes included in the work route and the working vehicle breaks away at a predetermined breakaway position in midway of the breakaway route, the return route creation part creates the return route to travel to a starting end of the straight route next to the breakaway route or of the straight route adjacent to the breakaway route.

Supplementary Note 23

The working vehicle set forth in any of supplementary notes 13 to 16, wherein when a predetermined straight route is defined as a breakaway route among one or more straight routes included in the work route and the working vehicle breaks away at a predetermined breakaway position in midway of the breakaway route, the return traveling control part makes the working vehicle perform return traveling to a starting end of the straight route adjacent to the breakaway route, further allows the working vehicle to perform traveling and work up to a terminal end of the straight route adjacent to the breakaway route, and makes the working vehicle perform return traveling to the breakaway position.

Supplementary Note 24

The working vehicle set forth in any of supplementary notes 13 to 23, wherein switching of a speed change member capable of switching a set vehicle speed between a plurality of steps is normally disabled during relocation traveling without work, while the switching is enabled according to a predetermined switching condition in a straight portion, of a relocation route without work, having a predetermined traveling distance or more.

Supplementary Note 25

An automatic traveling system of a working vehicle that performs automatic traveling on a work route preset in an agricultural field, the automatic traveling system including: a return traveling control part to make the working vehicle automatically perform return traveling toward the work route in response to a return operation for the working vehicle that is within the agricultural field during breakaway of the working vehicle from the work route.

Supplementary Note 26

The automatic traveling system set forth in supplementary note 25, further including a return route creation part to create a return route to the work route based on a position of the working vehicle itself, in response to a creation operation for the working vehicle, wherein the return traveling control part makes the working vehicle automatically perform return traveling based on the return route.

Supplementary Note 27

The automatic traveling system set forth in supplementary note 25 or 26, wherein when a distance between a return position disposed on an end of a straight route included in the work route, and a position of the working vehicle itself at the return operation is a predetermined spacing threshold or more, the return traveling control part makes the working vehicle automatically perform return traveling toward the work route.

Supplementary Note 28

The automatic traveling system set forth in any of supplementary notes 25 to 27, wherein when a distance between a breakaway position of the working vehicle at breakaway in midway of a straight route included in the work route, and a position of the working vehicle itself at the return operation is a predetermined spacing threshold or more, the return traveling control part makes the working vehicle automatically perform return traveling toward the breakaway position.

Supplementary Note 29

The automatic traveling system set forth in any of supplementary notes 25 to 28, wherein when the working vehicle is a vehicle restricted from traveling without work in a worked area in the agricultural field, the return traveling control part makes the working vehicle automatically perform return traveling so as to travel in an unworked area in the agricultural field.

Supplementary Note 30

The automatic traveling system set forth in any of supplementary notes 26 to 28, wherein when the working vehicle is a vehicle restricted from traveling without work in a worked area in the agricultural field and breaks away at a breakaway position in midway of a straight route included in the work route, the return route creation part creates the return route having a first return route to travel to an unworked area on the straight route apart from the breakaway position and a second return route to travel backward from a terminal end of the first return route to the breakaway position.

Supplementary Note 31

The automatic traveling system set forth in any of supplementary notes 26 to 28, wherein when the working vehicle is a vehicle restricted from traveling without work in a worked area in the agricultural field and breaks away at a breakaway position having a distance less than a predetermined spacing distance from a starting end of a straight route included in the work route, in midway of the straight route, the return route creation part creates the return route to travel to the starting end of the straight route.

Supplementary Note 32

The automatic traveling system set forth in any of supplementary notes 26 to 28, wherein when the working vehicle is a vehicle restricted from traveling without work in an unworked area in the agricultural field and breaks away at a breakaway position in midway of a straight route included in the work route, the return route creation part creates the return route having a first return route to travel to a starting end of the straight route and a second return route to travel from a starting end to the breakaway position in the straight route.

Supplementary Note 33

The automatic traveling system set forth in any of supplementary notes 26 to 28, having a work route creation part to create the work route including one or more straight routes and an automatic traveling control part to make the working vehicle perform automatic traveling along the work route; wherein when the straight route predetermined is defined as a breakaway route and the working vehicle breaks away at a terminal end of the breakaway route, and when the straight route next to the breakaway route is defined as a next route and the working vehicle is apart in a direction perpendicular to the next route, the return route creation part defines as an entry corner part, a corner part of an unworked area in the agricultural field closest to a position of the working vehicle itself, and creates the return route to travel to the entry corner part so as to face the entry corner part in the perpendicular direction; and wherein when the return route creation part creates the return route to face the entry corner part in the perpendicular direction, the work route creation part recreates the work route so as to include a straight route to travel in the perpendicular direction from the entry corner part.

Supplementary Note 34

The automatic traveling system set forth in any of supplementary notes 26 to 28, wherein when a predetermined straight route is defined as a breakaway route among one or more straight routes included in the work route and the working vehicle breaks away at a predetermined breakaway position in midway of the breakaway route, the return route creation part creates the return route to travel to a starting end of the straight route next to the breakaway route or of the straight route adjacent to the breakaway route.

Supplementary Note 35

The automatic traveling system set forth in any of supplementary notes 25 to 28, wherein when a predetermined straight route is defined as a breakaway route among one or more straight routes included in the work route and the working vehicle breaks away at a predetermined breakaway position in midway of the breakaway route, the return traveling control part makes the working vehicle perform return traveling to a starting end of the straight route adjacent to the breakaway route, further allows the working vehicle to perform traveling and work up to a terminal end of the straight route adjacent to the breakaway route, and makes the working vehicle perform return traveling to the breakaway position.

Supplementary Note 36

The automatic traveling system set forth in any of supplementary notes 25 to 35, wherein switching of a speed change member capable of switching a set vehicle speed between a plurality of steps is normally disabled during relocation traveling without work, while the switching is enabled according to a predetermined switching condition in a straight portion, of a relocation route without work, having a predetermined traveling distance or more.

REFERENCE SIGNS LIST

1: combine (working vehicle)
2: traveling part
3: reaping part 30 control device
35: automatic traveling control part
37: return traveling control part
40 mobile terminal
41: terminal control device
44: display part
51: work route creation part
53: return route creation part
54: display control part
60 agricultural field
61: unworked area
62: worked area
63: work route
64: breakaway position
65 return position
66: return route
70 work screen
73: return route creation button
101: tractor
102: vehicle body
103: working machine
130: control device
135: automatic traveling control part
137: return traveling control part
140: mobile terminal
141: terminal control device
144: display part
151: work route creation part
153: return route creation part
154: display control part

The invention claimed is:

1. An automatic traveling method of a working vehicle that performs automatic traveling on a work route preset in an agricultural field, the automatic traveling method comprising:
a return traveling step to make the working vehicle automatically perform return traveling toward the work route in response to a return operation for the working vehicle that is within the agricultural field during breakaway of the working vehicle from the work route; and
a return route creation step to create a return route to the work route based on a position of the working vehicle, the return route being created in response to a creation operation for the working vehicle, wherein, when the working vehicle is restricted from traveling without work in a worked area of the agricultural field and breaks away at a breakaway position midway of a straight route included in the work route, the return route comprises a first return route to travel to an unworked area on the straight route apart from the breakaway position and a second return route to travel backward from a terminal end of the first return route to the breakaway position, and,
wherein the return traveling step makes the working vehicle automatically perform return traveling based on the return route.

2. The automatic traveling method according to claim 1, wherein, when a distance between a return position disposed on an end of the straight route and a position of the working vehicle at the return operation is a predetermined spacing threshold or more, the return traveling step makes the working vehicle automatically perform return traveling toward the work route.

3. The automatic traveling method according to claim 1, wherein when a distance between the breakaway position and a position of the working vehicle itself at the return operation is a predetermined spacing threshold or more, the return traveling step makes the working vehicle automatically perform return traveling toward the breakaway position.

4. The automatic traveling method according to claim 1, wherein return traveling is performed in an unworked area in the agricultural field.

5. The automatic traveling method according to claim 1, wherein, when the breakaway position has a distance less than a predetermined spacing distance from a starting end of the straight route the return route created by the return route creation step includes travel to the starting end of the straight route.

6. The automatic traveling method according to claim 1, wherein, in route, the first return route includes travel to a starting end of the straight route and the second return route includes travel from the starting end to the breakaway position.

7. The automatic traveling method according to claim 1, further comprising:
a work route creation step to create the work route including one or more straight routes; and
an automatic traveling step to make the working vehicle perform automatic traveling along the work route, wherein the straight route is part of one or more straight routes included in the work route, a predetermined straight route of the one or more straight routes is defined as the breakaway route, the breakaway position is at a terminal end of the breakaway route, and a straight route to be travelled next after the breakaway route is defined as a next route, and wherein, when the working vehicle is apart in a perpendicular direction perpendicular to the next route, the return route creation step defines, as an entry corner part, a corner part of an unworked area in the agricultural field closest to a position of the working vehicle itself, and creates the return route to travel to the entry corner part so as to face the entry corner part in the perpendicular direction; and wherein when the return route creation step creates the return route to face the entry corner part in the perpendicular direction, the work route creation step recreates the work route so as to include a straight route to travel in the perpendicular direction from the entry corner part.

8. The automatic traveling method according to claim 1, wherein the straight route is part of one or more straight routes included in the work route and when a predetermined straight route of the one or more straight routes is defined as a breakaway route and the breakaway position is predetermined, the return route creation step creates the return route to travel to a starting end of a next straight route to be travelled next after the breakaway route or to a starting end of an adjacent straight route adjacent to the breakaway route.

9. The automatic traveling method according to claim 1, wherein the straight route is part of one or more straight routes included in the work route and when a predetermined straight route of the one or more straight routes is defined a breakaway route and the breakaway position is predetermined, the return traveling step makes the working vehicle perform return traveling to a starting end of an adjacent straight route adjacent to the breakaway route, further allows the working vehicle to perform traveling and work up to a terminal end of the adjacent straight route, and makes the working vehicle perform return traveling to the breakaway position.

10. The automatic traveling method according to claim 1, further comprising:

a relocation route creation step that creates a relocation route for relocation travelling of the work vehicle, wherein during relocation traveling of the working vehicle when not performing work:
a speed change member is enabled according to a predetermined switching condition on a straight portion of a relocation route having at least a predetermined traveling distance, and
disabled at other portions of the relocation route.

11. A working vehicle that performs automatic traveling on a work route preset in an agricultural field, the working vehicle comprising:
   a return traveling control part to make the working vehicle automatically perform return traveling toward the work route in response to a return operation for the working vehicle that is within the agricultural field during breakaway of the working vehicle from the work route; and
   a return route creation part to create a return route to the work route based on a position of the working vehicle, in response to a creation operation for the working vehicle, wherein when the working vehicle is restricted from traveling without work in a worked area of the agricultural field and breaks away at a breakaway position midway of a straight route included in the work route, the return route comprises a first return route to travel to an unworked area on the straight route apart from the breakaway position and a second return route to travel backward from a terminal end of the first return route to the breakaway position, and,
   wherein the return traveling part makes the working vehicle automatically perform return traveling based on the return route.

12. An automatic traveling system of a working vehicle that performs automatic traveling on a work route preset in an agricultural field, the automatic traveling system comprising:
   a return traveling control part to make the working vehicle automatically perform return traveling toward the work route in response to a return operation for the working vehicle that is within the agricultural field during breakaway of the working vehicle from the work route; and
   a return route creation part to create a return route to the work route based on a position of the working vehicle, in response to a creation operation for the working vehicle, wherein when the working vehicle is restricted from traveling without work in a worked area of the agricultural field and breaks away at a breakaway position midway of a straight route included in the work route, the return route comprises a first return route to travel to an unworked area on the straight route apart from the breakaway position and a second return route to travel backward from a terminal end of the first return route to the breakaway position, and,
   wherein the return traveling part makes the working vehicle automatically perform return traveling based on the return route.

* * * * *